(12) United States Patent
Ikeda et al.

(10) Patent No.: US 11,815,689 B2
(45) Date of Patent: Nov. 14, 2023

(54) ELECTRONIC DEVICE

(71) Applicant: Semiconductor Energy Laboratory Co., Ltd., Atsugi (JP)

(72) Inventors: Hisao Ikeda, Zama (JP); Yoshiyuki Kurokawa, Sagamihara (JP); Hiromichi Godo, Isehara (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 17/715,321

(22) Filed: Apr. 7, 2022

(65) Prior Publication Data
US 2022/0350150 A1    Nov. 3, 2022

(30) Foreign Application Priority Data

Apr. 30, 2021  (JP) .................................. 2021-077330

(51) Int. Cl.
*G02B 27/01*      (2006.01)

(52) U.S. Cl.
CPC .... *G02B 27/0172* (2013.01); *G02B 2027/014* (2013.01); *G02B 2027/0178* (2013.01); *G02B 2027/0187* (2013.01)

(58) Field of Classification Search
None
See application file for complete search history.

(56) References Cited

U.S. PATENT DOCUMENTS

| 5,953,985 A | 9/1999 | Kobayashi |
| 6,120,338 A | 9/2000 | Hirano et al. |
| 10,698,481 B1 * | 6/2020 | Najafi Shoushtari .. G06V 40/19 |

(Continued)

FOREIGN PATENT DOCUMENTS

| JP | 2000-036385 A | 2/2000 |
| JP | 2003-059663 A | 2/2003 |

(Continued)

OTHER PUBLICATIONS

Zakhidov.A et al., "Orthogonal processing: A new strategy for organic electronics", Chem. Sci. (Chemical Science), Apr. 7, 2011, vol. 2, No. 6, pp. 1178-1182.

(Continued)

*Primary Examiner* — Andre L Matthews
(74) *Attorney, Agent, or Firm* — ROBINSON INTELLECTUAL PROPERTY LAW OFFICE; Eric J. Robinson

(57) ABSTRACT

A downsized electronic device with an eye tracking function is provided. The electronic device with an eye tracking function includes a display device, an infrared light source, and an optical system. The display device includes a display element and a light-receiving element; the infrared light source has a function of emitting infrared light; the light-receiving element has a function of detecting the infrared light reflected by an eyeball; and the optical system includes a first optical element positioned on an optical path through which an image from the display element enters the eyeball and a second optical element positioned on an optical path through which the reflected infrared light enters the light-receiving element. The light-receiving element is integrated with the display device and thus, the electronic device can have a reduced size.

17 Claims, 26 Drawing Sheets

(56) References Cited

U.S. PATENT DOCUMENTS

| | | | |
|---|---|---|---|
| 11,073,903 B1* | 7/2021 | Ouderkirk | G02B 27/0093 |
| 2002/0072139 A1 | 6/2002 | Kashiwabara | |
| 2011/0148290 A1 | 6/2011 | Oota | |
| 2012/0256204 A1 | 10/2012 | Yoshizumi et al. | |
| 2012/0273804 A1 | 11/2012 | Hatano | |
| 2012/0276484 A1 | 11/2012 | Izumi et al. | |
| 2013/0084531 A1 | 4/2013 | Hamaguchi et al. | |
| 2013/0084664 A1 | 4/2013 | Yoshitoku et al. | |
| 2013/0084666 A1 | 4/2013 | Oshige | |
| 2013/0280839 A1 | 10/2013 | Sonoda et al. | |
| 2013/0295705 A1 | 11/2013 | Sonoda et al. | |
| 2014/0004640 A1 | 1/2014 | Hamaguchi et al. | |
| 2014/0004642 A1 | 1/2014 | Otsuka et al. | |
| 2015/0060826 A1 | 3/2015 | Matsumoto et al. | |
| 2015/0069360 A1 | 3/2015 | Sato | |
| 2015/0076476 A1 | 3/2015 | Odaka et al. | |
| 2016/0172595 A1 | 6/2016 | Malinowski et al. | |
| 2016/0315133 A1 | 10/2016 | Sato | |
| 2017/0141167 A1 | 5/2017 | Naganuma | |
| 2017/0256754 A1 | 9/2017 | Defranco et al. | |
| 2018/0190908 A1 | 7/2018 | Ke et al. | |
| 2020/0203662 A1 | 6/2020 | Mollard et al. | |
| 2021/0165213 A1* | 6/2021 | Balachandreswaran | G02B 27/0172 |
| 2022/0173174 A1 | 6/2022 | Hatsumi et al. | |

FOREIGN PATENT DOCUMENTS

| | | | |
|---|---|---|---|
| JP | 2008-098106 A | 4/2008 | |
| JP | 2008-147072 A | 6/2008 | |
| JP | 2008-251270 A | 10/2008 | |
| JP | 2012-160473 A | 8/2013 | |
| JP | 2014-120218 A | 6/2014 | |
| JP | 2014-135251 A | 7/2014 | |
| JP | 2014-232568 A | 12/2014 | |
| JP | 2015-115178 A | 6/2015 | |
| JP | 2016-197494 A | 11/2016 | |
| JP | 2019-512726 | 5/2019 | |
| JP | 2019-179696 A | 10/2019 | |
| JP | 2020-160305 A | 10/2020 | |

OTHER PUBLICATIONS

Malinowski.P et al., "High resolution photolithography for direct view active matrix organic light-emitting diode augmented reality displays", J. Soc. Inf. Display (Journal of the Society for Information Display), Apr. 2, 2018, vol. 26, No. 3, pp. 128-136.

Malinowski.P et al., "Photolithographic patterning of organic photodetectors with a non-fluorinated photoresist system", Organic Electronics, Jul. 12, 2014, vol. 15, No. 10, pp. 2355-2359.

Malinowski.P et al., "Multicolor 1250 ppi OLED Arrays Patterned by Photolithography", SID Digest '16 : SID International Symposium Digest of Technical Papers, May 22, 2016, vol. 47, No. 1, pp. 1009-1012.

Papadopoulos.N et al., "AMOLED Displays with In-Pixel Photodetector", Liquid Crystals and Display Technology, Jul. 9, 2020, pp. 1-19.

Ke.T et al., "Technology Developments in High-Resolution FMM-free OLED and BEOL IGZO TFTs for Power-Efficient Microdisplays", SID Digest '21 : SID International Symposium Digest of Technical Papers, May 1, 2021, vol. 52, No. 1, pp. 127-130.

Malinowski.P et al., "Integration of additional functionalities into the frontplane of AMOLED displays", SID Digest '20 : SID International Symposium Digest of Technical Papers, Aug. 1, 2020, vol. 51, No. 1, pp. 646-649.

Malinowski.P et al., "Organic photolithography for displays with integrated fingerprint scanner", SID Digest '19 : SID International Symposium Digest of Technical Papers, May 29, 2019, vol. 50, No. 1, pp. 1007-1010.

Ke.T et al., "Island and Hole Fabrication on OLED Stack for High-Resolution Sensor in Display Application", IDW '20 : Proceedings of the 27th International Display Workshops, Dec. 9, 2020, vol. 27, pp. 902-905.

Gather.M et al., "Solution-Processed Full-Color Polymer-OLED Displays Fabricated by Direct Photolithography", SID Digest '06 : SID International Symposium Digest of Technical Papers, Jun. 1, 2006, vol. 37, No. 1, pp. 909-911.

Malinowski.P et al., "Photolithography as Enabler of AMOLED Displays Beyond 1000 ppi", SID Digest '17 : SID International Symposium Digest of Technical Papers, May 1, 2017, vol. 48, No. 1, pp. 623-626.

* cited by examiner

ELECTRONIC DEVICE

BACKGROUND OF THE INVENTION

1. Field of the Invention

One embodiment of the present invention relates to an electronic device, particularly an electronic device with an eye tracking function.

Note that one embodiment of the present invention is not limited to the above technical field. Examples of the technical field of one embodiment of the present invention disclosed in this specification and the like include a semiconductor device, a display device, a light-emitting apparatus, a power storage device, a memory device, an electronic device, a lighting device, an input device, an input/output device, a method for driving any of them, and a method for manufacturing any of them. A semiconductor device generally means a device that can function by utilizing semiconductor characteristics.

2. Description of the Related Art

In recent years, electronic devices for virtual reality (also referred to as VR) or augmented reality (also referred to as AR) have been attracting attention. Furthermore, VR or AR electronic devices with an eye tracking function have been under development. Such VR or AR electronic devices with an eye tracking function can be used for analysis of consumer behavior, image processing, avatar creation, and an operation using gaze, for example.

For example, Patent Document 1 discloses a head-mounted display that performs eye tracking by utilizing an image of light from an infrared light source reflected by the cornea.

REFERENCE

[Patent Document 1] Japanese Translation of PCT International Application No. 2019-512726

SUMMARY OF THE INVENTION

In the above head-mounted display performing eye tracking, an optical sensor and an electronic display are provided separately, which causes the head-mounted display to be large in size. In addition, an optical system to be positioned between the display and the eyeball is used for both viewing the display and detection by the optical sensor, causing difficulty in bringing the display into focus or difficulty in detection by the optical sensor.

In view of the above problems, an object of one embodiment of the present invention is to provide a downsized electronic device with an eye tracking function. In view of the above problems, another object of one embodiment of the present invention is to provide an electronic device with an eye tracking function including a novel optical system.

Another object of one embodiment of the present invention is to provide a low power consuming electronic device with an eye tracking function. Another object of one embodiment of the present invention is to provide an electronic device with an eye tracking function that is mounted with a high-resolution display device.

Note that the description of these objects does not preclude the existence of other objects. Moreover, these objects should be construed as being independent of each other and the present invention does not need to achieve all the objects. Other objects can be derived from the description of the specification and the like.

One embodiment of the present invention is an electronic device with an eye tracking function which includes a display device, an infrared light source, and an optical system and in which the display device includes a display element and a light-receiving element, the infrared light source has a function of emitting infrared light, the light-receiving element has a function of detecting the infrared light reflected by an eyeball, and the optical system includes a first optical element positioned on an optical path through which an image from the display element enters the eyeball and a second optical element positioned on an optical path through which the reflected infrared light enters the light-receiving element.

Another embodiment of the present invention is an electronic device with an eye tracking function which includes a display device, an infrared light source, and an optical system and in which the display device includes a display element and a light-receiving element, the infrared light source has a function of emitting infrared light, the light-receiving element has a function of detecting the infrared light reflected by an eyeball, the optical system includes a first optical element positioned on an optical path through which an image from the display element enters the eyeball and a second optical element positioned on an optical path through which the reflected infrared light enters the light-receiving element, and the second optical element includes at least a mirror.

Another embodiment of the present invention is an electronic device with an eye tracking function which includes a display device, an infrared light source, and an optical system and in which the display device includes a display element and a light-receiving element, the infrared light source has a function of emitting infrared light, the light-receiving element has a function of detecting the infrared light reflected by a right eyeball or a left eyeball, the optical system includes a first optical element positioned on an optical path through which an image from the display element enters the right eyeball or the left eyeball and a second optical element positioned on an optical path through which the reflected infrared light enters the light-receiving element, and the position of the first optical element for detection of the infrared light reflected by the right eyeball is different from the position of the second optical element for detection of the infrared light reflected by the left eyeball.

Another embodiment of the present invention is an electronic device with an eye tracking function which includes a display device, an infrared light source, an optical system, and a driving mechanism and in which the display device includes a display element and a light-receiving element, the infrared light source has a function of emitting infrared light, the light-receiving element has a function of detecting the infrared light reflected by a right eyeball or a left eyeball, the optical system includes a first optical element positioned on an optical path through which an image from the display element enters the right eyeball or the left eyeball and a second optical element positioned on an optical path through which the reflected infrared light enters the light-receiving element, and the driving mechanism has a function of moving or rotating one or both of the first optical element and the second optical element.

In another embodiment of the present invention, it is preferable that the display device include an image processing portion and the image processing portion have a function of identifying the position of gaze in accordance with data obtained by the light-receiving element.

In another embodiment of the present invention, it is preferable that the electronic device further include a control portion and the control portion have a function of performing image processing.

In another embodiment of the present invention, it is preferable that the image processing include processing for enhancing an image in a region including gaze.

In another embodiment of the present invention, it is preferable that the infrared light source include a light-emitting element emitting infrared light and the light-emitting element emitting infrared light be provided in the display device.

According to one embodiment of the present invention, a downsized electronic device with an eye tracking function can be provided. According to one embodiment of the present invention, an electronic device with an eye tracking function including a novel optical system can be provided. According to one embodiment of the present invention, a low power consuming electronic device with an eye tracking function can be provided. According to one embodiment of the present invention, an electronic device with an eye tracking function that is mounted with a high-resolution display device can be provided.

Note that the description of these effects does not preclude the existence of other effects. Moreover, these effects should be construed as being independent of each other and the present invention does not need to have all the effects. Other effects can be derived from the description of the specification and the like.

BRIEF DESCRIPTION OF THE DRAWINGS

FIGS. 5A, 5B1, and 5B2 show a display device included in an electronic device.

FIGS. 6A, 6B1, and 6B2 show a display device included in an electronic device.

DETAILED DESCRIPTION OF THE INVENTION

Figure 1:
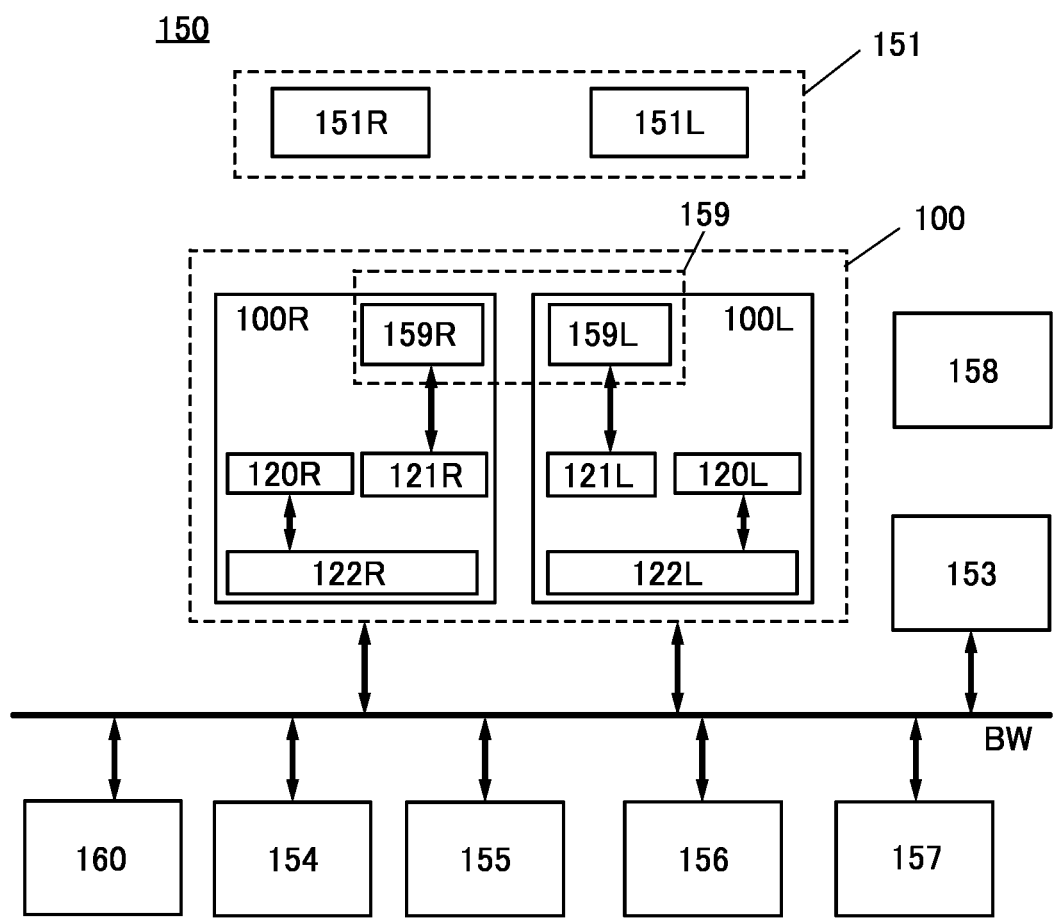
FIG. 1 shows a configuration example of an electronic device.

Embodiments will be described below with reference to the drawings. Note that the embodiments can be implemented with various modes, and it will be readily appreciated by those skilled in the art that modes and details can be changed in various ways without departing from the spirit and scope of the present invention. Therefore, the present invention should not be construed as being limited to the description of embodiments and the like below.

Note that in the structures of the invention described below, the same portions or portions having similar functions are denoted by the same reference numerals in different drawings, and description of such portions is not repeated. The same hatching pattern is used for portions having similar functions, and the portions are not denoted by specific reference numerals in some cases.

In this specification and the like, ordinal numbers such as "first" and "second" are used in order to avoid confusion among components, and the terms do not limit the components numerically.

In the case where the expression "B over A" or "B under A" is used in this specification and the like, for example, A and B do not always need to include a region where they are in contact with each other.

In this specification and the like, the terms "film" and "layer" can be interchanged with each other. For example, in some cases, the terms "conductive layer" and "conductive film" can be interchanged with each other and the terms "insulating layer" and "insulating film" can be interchanged with each other.

In this specification and the like, a light-emitting layer refers to a layer that is provided between a pair of electrodes of a light-emitting element and contains at least a light-emitting substance.

In this specification and the like, a display panel that is one mode of a display device has a function of displaying (outputting) an image or the like on (to) a display surface. Thus, the display panel is one mode of an output device.

In this specification and the like, the terms "source" and "drain" of a transistor interchange with each other depending on the polarity of the transistor and the levels of potentials applied to the terminals. In general, in an n-channel transistor, a terminal to which a lower potential is applied is called a source, and a terminal to which a higher potential is applied is called a drain. In a p-channel transistor, a terminal to which a lower potential is applied is called a drain, and a terminal to which a higher potential is applied is called a source. Although the terms "source" and "drain" sometimes interchange with each other in reality depending on the above-described relation of potentials, a source and a drain are fixed for convenience in the description of connection relation of a transistor in this specification and the like.

In this specification and the like, the terms "first electrode" and "second electrode" are sometimes used in description of a source and a drain of a transistor.

A "source" of a transistor in this specification and the like means a source region that is part of a semiconductor layer functioning as an active layer or a source electrode connected to the semiconductor layer. Similarly, a "drain" of a transistor means a drain region that is part of the semiconductor layer or a drain electrode connected to the semiconductor layer. A gate of a transistor means a gate electrode.

In this specification and the like, a state in which transistors are connected in series means, for example, a state in which only one of a source and a drain of a first transistor is connected to only one of a source and a drain of a second transistor. In addition, a state in which transistors are connected in parallel means a state in which one of a source and a drain of a first transistor is connected to one of a source and a drain of a second transistor and the other of the source and the drain of the first transistor is connected to the other of the source and the drain of the second transistor.

In this specification and the like, connection is sometimes referred to as electrical connection and may refer to a state where a current, a voltage, or a potential can be supplied or transmitted. Accordingly, connection may refer to connection via an element such as a wiring, a resistor, a diode, or a transistor. Electrical connection may refer to direct connection without via an element such as a wiring, a resistor, a diode, or a transistor.

In this specification and the like, a conductive layer sometimes has a plurality of functions such as those of a wiring and an electrode. In this specification and the like, the phrase "a wiring is connected to an electrode" may be used in the case where one conductive layer having the above two functions is provided.

In this specification and the like, a light-emitting element is sometimes referred to as a light-emitting device.

In this specification and the like, a device in which a light-emitting layer is formed using a metal mask (MM) is sometimes referred to as a light-emitting device having a metal mask structure (MM structure). A metal mask may be referred to as a fine metal mask (FMM) depending on the minuteness of its opening portions. In this specification and the like, a device in which a light-emitting layer is formed without using a metal mask or a fine metal mask is sometimes referred to as a light-emitting device having a metal maskless structure (MML structure).

In this specification and the like, a structure in which light-emitting layers of light-emitting elements for multiple colors (e.g., red (R), green (G), and blue (B)) are separately formed is sometimes referred to as a side-by-side (SBS) structure. In this specification and the like, a light-emitting element capable of emitting white light is referred to as a white-light-emitting element in some cases. Note that a combination of such a white-light-emitting element with coloring layers enables providing a full-color display device. Color filters or the like can be used as the coloring layers.

The light-emitting elements can be roughly classified into those having a single structure and those having a tandem structure. In the single structure, one light-emitting unit is provided between a pair of electrodes. The light-emitting unit preferably includes one or more light-emitting layers. A light-emitting element with the single structure can emit white light when one light-emitting unit includes two or more light-emitting layers having complementary emission colors. For example, the emission colors of a first light-emitting layer and a second light-emitting layer are made complementary, so that the whole light-emitting element can emit white light. A light-emitting element including three or more light-emitting layers can also emit white light when the light-emitting layers emit light of complementary colors.

It is preferable that a light-emitting element having the tandem structure include two or more light-emitting units between a pair of electrodes and each light-emitting unit include one or more light-emitting layers. In the light-emitting element having the tandem structure, an intermediate layer such as a charge-generation layer is preferably provided between the plurality of light-emitting units. For the light-emitting element having the tandem structure to emit white light, the structure is made such that the combination of light from light-emitting layers of two or more light-emitting units is white light. In the structure capable of white light emission, light of complementary colors is emitted as in the single structure.

When the above-described white-light-emitting element (including the single structure or the tandem structure) and a light-emitting element having the SBS structure are compared, the light-emitting element having the SBS structure consumes lower power than the white-light-emitting element. To reduce power consumption, the light-emitting element having the SBS structure is preferably used. In contrast, the white-light-emitting element is preferable in terms of lower manufacturing cost or higher manufacturing yield because a process for manufacturing the white-light-emitting element is easier than that for the light-emitting element having the SBS structure.

Embodiment 1

In this embodiment, a configuration example of an electronic device of one embodiment of the present invention and the like will be described.

<Electronic Device and Display Device>

FIG. 1 shows a configuration example of an electronic device 150 of one embodiment of the present invention. The electronic device 150 is preferably a device to be worn on the user's body, e.g., the user's head, like a head-mounted display. The user wearing the electronic device 150 on the head can view an image on a display device 100 of the electronic device 150. In this specification and the like, a display device includes a display module. A display module refers to a display panel with a substrate that is equipped with a connector such as a flexible printed circuit (FPC) or a tape carrier package (TCP) or mounted with an IC by a chip on glass (COG) method or the like.

A single or multiple display devices 100 may be included. When the single display device 100 is included, the display device 100 can be used in a smartphone or the like. Furthermore, when the single display device 100 is included, the display device can be shared by the right eye and the left eye. FIG. 1 shows the case of including a display device 100R for the right eye and a display device 100L for the left eye as the display devices 100. The electronic device 150 including two display devices may include a microlens array sheet or the like that can make the interface between the display device 100R and the display device 100L less visible.

The display devices 100R and 100L each include a display panel, which includes at least a pixel portion. The pixel portion includes at least a light-emitting element. Specifically, the pixel portion preferably includes two or more light-emitting elements capable of exhibiting different emission colors. The different emission colors refer to emission colors different from each other selected from the colors of visible light. For example, at least light-emitting elements exhibiting red (R), green (G), and blue (B) are preferably included to enable full color display.

The light-emitting elements are preferably organic EL elements (sometimes referred to as organic electroluminescence elements). An organic EL element has a stacked-layer structure including a pair of electrodes and a light-emitting layer positioned between the pair of electrodes. The light-emitting elements can exhibit the respective emission colors by including the respective light-emitting substances (also referred to as light-emitting materials) in their light-emitting layers. The light-emitting element can have the single structure or the tandem structure. Moreover, the light-emitting element can have the SBS structure. Details of the single structure, the tandem structure, and the SBS structure will be described later.

Using the light-emitting element having the MML structure makes it possible to provide a high-resolution display device and in turn, an electronic device mounted with the display device. Note that details of the MML structure will be described later.

In this specification and the like, an element used for display, such as a light-emitting element, is sometimes referred to as a display element.

The display devices 100R and 100L each preferably include a driver circuit portion, an image processing portion, a frame memory, and a light-receiving element in addition to the pixel portion. One or more selected from these components may be integrated with the display device, or may be formed separately from the display device with the use of an IC or the like. For example, integration of the light-receiving element with the display device can reduce the number of components, including the above IC, to further downsize the electronic device. The structure and the like of the light-receiving element that can be integrated with the display device will be described later.

In the example shown in FIG. 1, the display device 100R includes a driver circuit portion 120R, an image processing portion 121R, a frame memory 122R, and a light-receiving element 159R, and the display device 100L includes a driver circuit portion 120L, an image processing portion 121L, a frame memory 122L, and a light-receiving element 159L.

Note that the display device 100L does not need to have the same configuration as the display device 100R. Components to be included in one display device can be selected independently of those in the other display device. For example, only the display device for the eyeball that is to be tracked may be provided with the light-receiving element 159, depending on the use. In other words, the light-receiving element 159 may be provided only in the display device 100R for the right eye or only in the display device 100L for the left eye.

In the case where the single display device 100 is provided, part of the display device 100 can serve as a display region for the right eye and the remaining part of the display device 100 can serve as a display region for the left eye. In this case, the display region for the right eye and that for the left eye can share one or more components selected from the driver circuit portion 120, the image processing portion 121, and the frame memory 122 of the display device 100, so that sometimes the components for the right eye cannot be clearly distinguished from those for the left eye.

<Driver Circuit Portion>

The driver circuit portion at least includes one or more selected from a source driver and a gate driver. Each of the driver circuit portion 120R and the driver circuit portion 120L at least includes one or more selected from a source driver and a gate driver.

<Image Processing Portion>

The image processing portion has a function of processing image data. Thus, the image processing portion preferably includes an arithmetic circuit having a function of performing a product-sum operation. Furthermore, the arithmetic circuit preferably includes a transistor including a metal oxide in a channel formation region.

The image processing portion has a function of converting the analog data obtained with the light-receiving element 159 into digital data. Furthermore, the image processing portion has a function of identifying the position of the user's gaze from the obtained data and can generate digital data on the gaze, thereby enabling eye tracking. The image processing portion 121R and the image processing portion 121L each have a function of converting the analog data obtained with the light-receiving element 159 into digital data and a function of identifying the position of the user's gaze from the obtained data and can generate digital data on the gaze, thereby enabling eye tracking.

<Frame Memory>

The frame memory has a function of storing image data; for example, video signals of pixels can be stored in a memory cell. The frame memory has a function of retaining the image data even while power supply to the frame memory is stopped. The frame memory 122R and the frame memory 122L each have a function of storing image data, e.g., storing video signals of pixels in a memory cell, and each of the frame memories has a function of retaining image data even while power supply to the frame memory is stopped.

<Light-Receiving Element>

In the electronic device 150 of one embodiment of the present invention, as shown in FIG. 1, the display device 100R and the display device 100L include the light-receiving element 159R and the light-receiving element 159L, respectively. Although two separate light-receiving elements 159 (one for the right eye and the other for the left eye) are provided in the example shown in FIG. 1, the number of the light-receiving elements 159 may be one or three or more. When one or more light-receiving elements 159 are shared by the display device for the right eye and the display device for the left eye, an optical element for the right eye and an optical element for the left eye cannot be clearly distinguished from each other in some cases.

In the description of the structures of the light-receiving element 159R and the light-receiving element 159L in this specification and the like, the term "light-receiving element 159" is used when these light-receiving elements do not need to be distinguished from each other. The light-receiving element 159 is sometimes referred to as a light-receiving device or a photoelectric conversion device. The light-receiving element 159 can convert received light into an electrical signal; for example, the electronic device 150 including the light-receiving element 159 has a function of detecting infrared light and converting the infrared light into an electrical signal. By processing the electrical signal that has been obtained from the detected infrared light, the electronic device 150 can generate an image. An image is sometimes referred to as an infrared image, and a function of generating an image is sometimes referred to as an image-capturing function. To carry out an image-capturing function efficiently, a plurality of light-receiving elements 159 are preferably provided in the display device 100. Providing the plurality of light-receiving elements 159 increases the image-capturing performance of the electronic device 150.

In this specification and the like, infrared light is sometimes referred to as infrared rays. Light with a wavelength of greater than or equal to 780 nm and less than or equal to 3000 nm is referred to as infrared light and light with a wavelength of greater than or equal to 800 nm and less than or equal to 2500 nm is referred to as near-infrared light in some cases. These wavelengths are out of the visible light wavelength range. Note that the light-receiving element 159 does not necessarily have the above structure and may have a function of detecting visible light in addition to infrared light, for example.

As shown in FIG. 1, the light-receiving element 159R and the light-receiving element 159L are integrated with the display device 100R and the display device 100L, respectively, for example. Integration of the light-receiving element 159 with the display device 100 can reduce the number of components and downsize the electronic device 150. A reduction in the number of components also leads to a reduction in the weight of the electronic device 150 and the like. Moreover, a reduction in the number of components yields savings in space in the electronic device 150, which allows a battery 158 to have a larger size, for example.

The light-receiving element 159R can be formed separately from the display device 100R, and the light-receiving element 159L can be formed separately from the display device 100L.

<Infrared Light Source>

The electronic device 150 of one embodiment of the present invention includes an infrared light source 160 in addition to the above components. As the infrared light source 160, which has a function of emitting light with a wavelength of greater than or equal to 780 nm and less than or equal to 3000 nm, preferably greater than or equal to 800 nm and less than or equal to 2500 nm, a light-emitting diode (sometimes referred to as an LED) can be used, for example. Light with such a wavelength is preferred because it does not adversely affect image visibility. Although the infrared light source 160 is often described as being configured to emit infrared light, the infrared light source 160 may emit near-infrared light and preferably emits light with a wavelength of greater than or equal to 830 nm and less than or equal to 870 nm during eye tracking. The infrared light source 160 is preferably formed separately from the display device 100 as shown in FIG. 1. When formed separately from the display device 100, the infrared light source 160 can be easily positioned near the eyeball, in which case highly accurate gaze detection can be performed.

Although a single infrared light source 160 is provided in FIG. 1, two infrared light sources (one for the right eye and the other for the left eye) may be provided. Alternatively, three or more infrared light sources 160 may be provided. When one or more infrared light sources 160 are shared by the display device for the right eye and the display device for the left eye, the optical element for the right eye and the optical element for the left eye cannot be clearly distinguished from each other in some cases.

The infrared light from the infrared light source 160 can be detected by the light-receiving element 159. Specifically, the infrared light reflected by the eyeball, or at least the cornea, can be detected by the light-receiving element 159. The infrared light reflected by the cornea is sometimes referred to as reflected light. Note that the infrared light and the like can also be reflected by the cornea of the user who wears contact lenses or the like.

The infrared light source 160 may be a light-emitting element having a function of emitting infrared light, instead of an LED, and the light-emitting element can be integrated with the display device 100. For example, a light-emitting element (IR) having a function of emitting infrared light can be formed as the infrared light source 160 in the pixel portion of the display device 100. A plurality of light-emitting elements (IR) may be formed in the pixel portion.

In the case where the light-emitting element (IR) having a function of emitting infrared light is formed in the display device, the electronic device 150 can be downsized and reduced in weight, for example. Moreover, space savings are achieved in the electronic device 150, which allows the battery 158 to have a larger size, for example.

By including the above-described display device 100, light-receiving element 159, and infrared light source 160, for example, the electronic device 150 of one embodiment of the present invention can have an eye tracking function. The electronic device 150 of one embodiment of the present invention may employ any eye tracking method, examples of which include a pupil centre corneal reflection method and a bright/dark pupil effect method. The electronic device 150 of one embodiment of the present invention may employ a combination of a pupil centre corneal reflection method, a bright/dark pupil effect method, and the like.

An electronic device having an eye tracking function can make a count of blinks. That is, the electronic device 150 of one embodiment of the present invention can have a blink detection function. Since the number of blinks increases with accumulation of fatigue, the fatigue can be determined from the number of blinks. Accordingly, the electronic device 150 of one embodiment of the present invention can have a fatigue detection function.

When mounted with a sensor portion, the electronic device of one embodiment of the present invention can measure one or more selected from the number of blinks, the body temperature, the pulse, and the blood oxygen saturation of the user to sense the user's fatigue and health conditions, for example. The electronic device 150 of one embodiment of the present invention can sense the user's fatigue and health conditions, for example, and display an alert or the like on the display device 100.

Since the electronic device 150 of one embodiment of the present invention utilizes infrared light, its eye tracking function is sometimes referred to as an eye tracking function utilizing infrared light. Infrared light is invisible and thus is preferred because eye tracking can be performed without blocking an image on the display device 100 of one embodiment of the present invention from view.

The electronic device 150 shown in FIG. 1 includes an optical system 151 (optical systems 151R and 151L), a motion detection portion 153, an audio 154, a camera 155, a control portion 156, a communication portion 157, and the battery 158, besides the display device 100. Owing to the novel optical system 151, which forms the optical path of the above-described reflected light, the electronic device 150 of one embodiment of the present invention has a novel configuration.

<Optical System 1>

The optical system forming the optical path of the reflected light is described. Although two optical systems 151 (the optical system 151R for the right eye and the optical system 151L for the left eye) are provided in FIG. 1, the number of optical systems may be one or three or more. In some cases, the optical system 151 can function as both the optical system for the right eye and that for the left eye and its function cannot be easily determined. In description of the structures of the optical system 151R and the optical system 151L in this specification and the like, the optical system 151R is referred to when these optical systems do not need to be distinguished from each other.

Figure 2A:
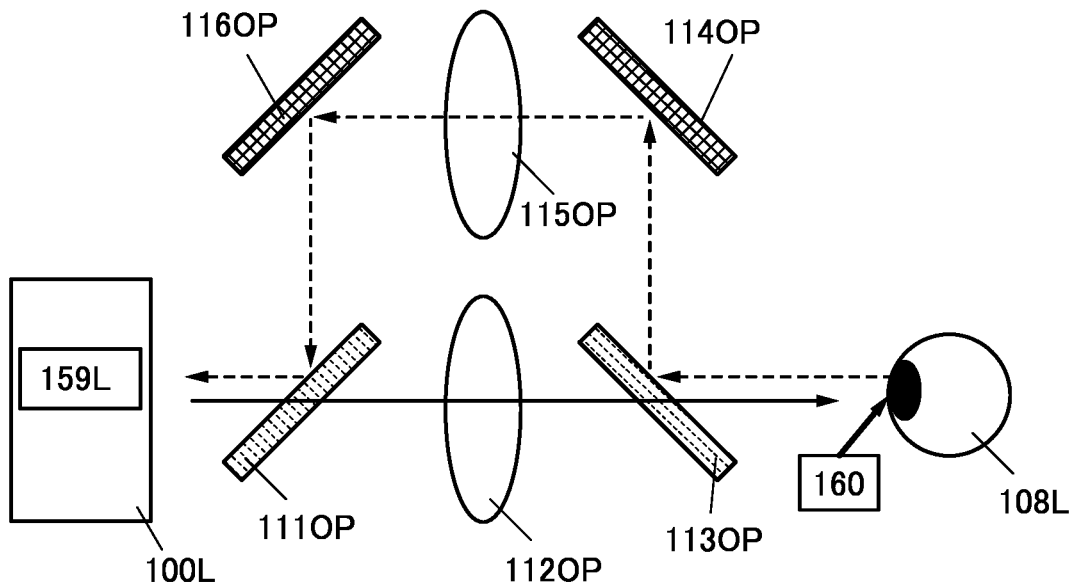
FIGS. 2A and 2B each show an optical system of an electronic device.

The optical system 151 is described. FIG. 2A is a top view of the electronic device 150 and illustrates the optical system 151L which can be used as the optical system for the left eye. Note that an optical system similar to that in FIG. 2A can be used as the optical system 151R for the right eye, and part or the whole of the optical system may serve as both the optical system for the left eye and the optical system for the right eye.

FIG. 2A shows the display device 100L included in the electronic device 150 and an eyeball 108L of the user viewing an image on the display device 100L. The electronic device 150 further includes the optical system 151L between the display device 100L and the eyeball 108L. The optical system 151L includes a first optical element 111OP, a second optical element 112OP, and a third optical element 113OP, through which visible light from the display device 100L is sequentially transmitted to reach the eyeball 108L. The optical system 151L further includes a fourth optical element 114OP, a fifth optical element 115OP, and a sixth optical element 116OP, which are not positioned on the optical path of the visible light. The optical path of the visible light is denoted with the solid line in FIG. 2A. Note that the display device 100L is positioned not to block the gaze of the user in the case where the user wearing the electronic device 150 would view the surroundings. The visible light from the display device 100L positioned not to block the gaze can enter the optical system 151L with the use of a reflecting mirror (sometimes referred to as a mirror) or the like. The visible light reflectivity of the reflecting mirror is preferably higher than or equal to 90%, further preferably higher than or equal to 95%, still further preferably higher than or equal to 98%.

As each of the optical elements, one or more selected from a lens, a prism, a mirror, a half mirror, a filter, and a diffraction grating can be used.

For example, the first optical element 111OP and the third optical element 113OP are each preferably a filter, further preferably an IR cut filter. An IR cut filter has a function of cutting off infrared light while transmitting visible light. The IR cut filter preferably has a visible light transmittance of higher than or equal to 80%, further preferably higher than or equal to 90%. The wavelength of the infrared light to be cut off is preferably greater than or equal to 780 nm, further preferably greater than or equal to 800 nm and less than or equal to 2500 nm.

The second optical element 112OP is preferably a lens, further preferably a biconvex lens. The maximum value of the thickness of the lens is preferably greater than or equal to 10 mm and less than or equal to 20 mm. The second optical element 112OP preferably has a function of adjusting the focus of the eyeball 108L.

FIG. 2A also illustrates the state where infrared light from the infrared light source 160 is reflected by the eyeball 108L; the optical path of the reflected light is denoted with the dotted lines. The reflected light is reflected by the third optical element 113OP, reflected by the fourth optical element 114OP, transmitted through the fifth optical element 115OP, reflected by the sixth optical element 116OP, and reflected by the first optical element 111OP to reach the display device 100L. That is, the reflected light passes through an optical path partly different from the optical path of the visible light, to enter the light-receiving element 159L of the display device 100L. Note that the optical elements are merely examples and the reflected light, the optical path of which is preferably partly different from that of the visible light, may reach the display device 100L with the use of components other than the above-described optical elements.

Since the light-receiving element 159L is integrated with the display device 100L, the reflected light can pass through the same optical path as the visible light to enter the light-receiving element 159L; however, when the reflected light passes through the same optical path as the visible light, the user cannot easily see the visible light. Specifically, the user has difficulty in focusing his/her eye and an image looks blurred in some cases. Thus, the optical system 151L is provided such that the reflected light passes through an optical path partly different from the optical path of the visible light. The optical system 151L preferably includes a first group of optical elements positioned on the optical path through which an image on the display device 100L enters the eyeball 108L, and a second group of optical elements positioned on the optical path through which the reflected light enters the light-receiving element 159L. Some or all of the first group of optical elements may be positioned on the optical path through which the reflected light enters the light-receiving element 159R. In other words, some or all of the first group of optical elements can also serve as the second group of optical elements, in which case the number of optical elements can be reduced.

As already described above, for example, the reflected light is reflected by the third optical element 113OP, reflected by the fourth optical element 114OP, transmitted through the fifth optical element 115OP, reflected by the sixth optical element 116OP, and reflected by the first optical element 111OP to enter the light-receiving element 159L of the display device 100L. One or more light-receiving elements 159L are preferably provided. Providing two or more light-receiving elements 159L in the display device 100L makes it possible to generate infrared images as in cameras.

The fifth optical element 115OP preferably has a function of adjusting the optical distance between the fourth optical element 114OP and the sixth optical element 116OP. Note that the fifth optical element 115OP does not need to be provided as long as the reflected light can enter the light-receiving element 159L of the display device 100L.

The fourth optical element 114OP, the fifth optical element 115OP, and the sixth optical element 116OP are included as the optical elements for the optical path that is partly different from the optical path of the visible light. As described above, the fifth optical element 115OP is not necessarily provided.

As already described above, the first optical element 111OP and the third optical element 113OP are each preferably a filter, further preferably an IR cut filter in order to transmit visible light. Furthermore, since the first optical element 111OP and the third optical element 113OP have a function of reflecting infrared light, one surface of the filter or IR cut filter is provided with a member reflecting infrared light. It is needless to say that the other surface of the filter or IR cut filter transmits visible light. In other words, one surface and the other surface of the filter or IR cut filter are preferably provided with different members. In order that one surface and the other surface can be provided with different members, the filter or IR cut filter preferably has a multilayer structure.

The fourth optical element 114OP and the sixth optical element 116OP are each preferably a filter or a mirror, further preferably an IR cut filter or an IR mirror. An IR mirror has a function of reflecting infrared light. An IR mirror preferably has an infrared light reflectivity of higher than or equal to 90%, further preferably higher than or equal to 95%.

The fifth optical element 115OP is preferably a lens, further preferably a biconvex lens. The maximum value of the thickness of the lens is preferably greater than or equal to 10 mm and less than or equal to 20 mm.

Forming the above-described optical paths makes it possible to adjust the focus of visible light independently of the optical path of reflected light, which inhibits defocus in videos and the like.

<Optical System 2>

Figure 2B:
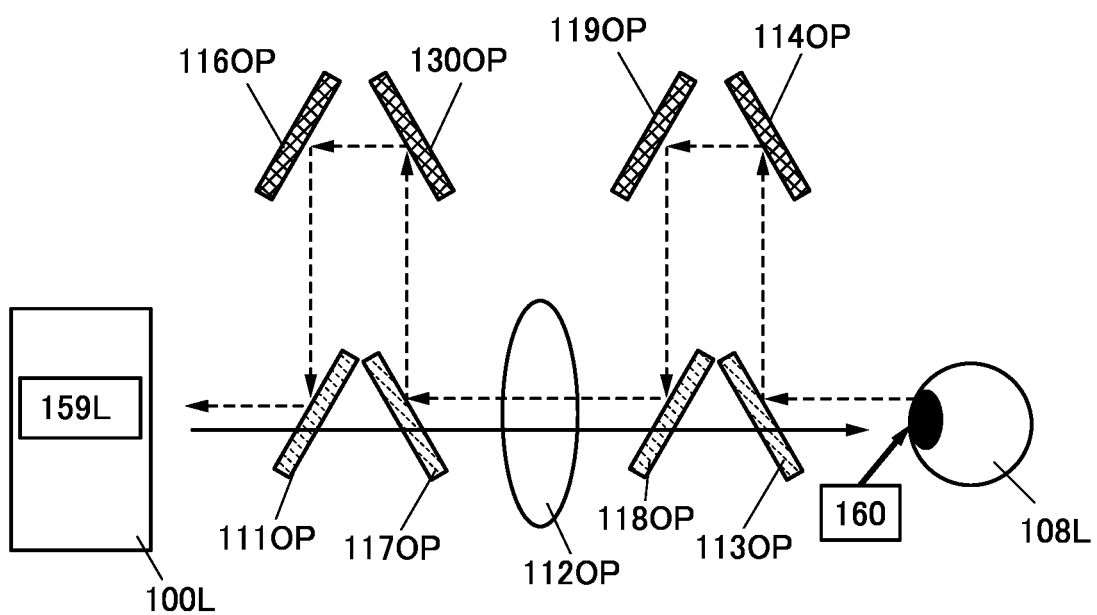

FIG. 2B illustrates the optical system 151L for the left eye which is different from that illustrated in FIG. 2A. FIG. 2B is a top view of the electronic device 150 and illustrates the optical system 151L which can be used as the optical system for the left eye. Note that an optical system similar to that in FIG. 2B can be used as the optical system 151R for the right eye, and part or the whole of the optical system may serve as both the optical system for the left eye and the optical system for the right eye.

Owing to the optical system 151L shown in FIG. 2B, visible light from the display device 100L is transmitted through the first optical element 111OP, a seventh optical element 117OP, the second optical element 112OP, an eighth optical element 118OP, and the third optical element 113OP to reach the eyeball 108L. The optical path of the visible light is denoted with the solid line in FIG. 2B.

The seventh optical element 117OP and the eighth optical element 118OP are each preferably a filter, further preferably an IR cut filter.

FIG. 2B also illustrates the state where infrared light from the infrared light source 160 is reflected by the eyeball 108L; the optical path of the reflected light is denoted with the dotted lines. The reflected light passes through an optical path partly different from the optical path of the visible light, to enter the display device 100L.

The reflected light is reflected by the third optical element 113OP, reflected by the fourth optical element 114OP, reflected by a ninth optical element 119OP, reflected by the eighth optical element 118OP, transmitted through the second optical element 112OP, reflected by the seventh optical element 117OP, reflected by a tenth optical element 130OP, reflected by the sixth optical element 116OP, and reflected by the first optical element 111OP to enter the light-receiving element 159L of the display device 100L.

The fourth optical element 114OP, the ninth optical element 119OP, the tenth optical element 130OP, and the sixth optical element 116OP are included as the optical elements for the optical path that is partly different from the optical path of the visible light.

The seventh optical element 117OP and the eighth optical element 118OP are each preferably a filter, further preferably an IR cut filter. Furthermore, since the seventh optical element 117OP and the eighth optical element 118OP have a function of reflecting infrared light, one surface of the filter or IR cut filter is provided with a member reflecting infrared light. It is needless to say that the other surface of the filter or IR cut filter transmits visible light. In other words, one surface and the other surface of the filter or IR cut filter are preferably provided with different members. In order that one surface and the other surface can be provided with different members, the filter or IR cut filter preferably has a multilayer structure.

The ninth optical element 119OP and the tenth optical element 130OP are each preferably a filter or a mirror, further preferably an IR cut filter or an IR mirror.

Forming the above-described optical paths makes it possible to adjust the focus of visible light independently of the optical path of reflected light and to optimize the optical distance of the optical path of visible light, which inhibits defocus in videos and the like.

<Optical System 3>

Figure 3A:
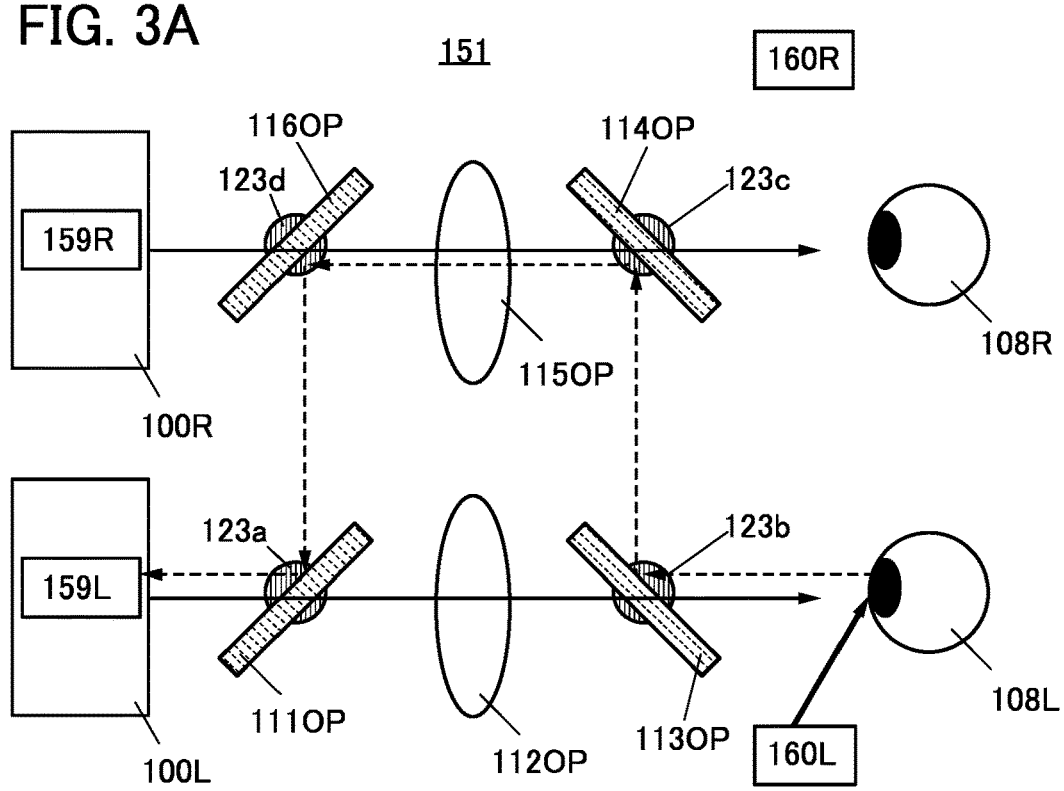
FIGS. 3A and 3B show an optical system of an electronic device.
Figure 3B:
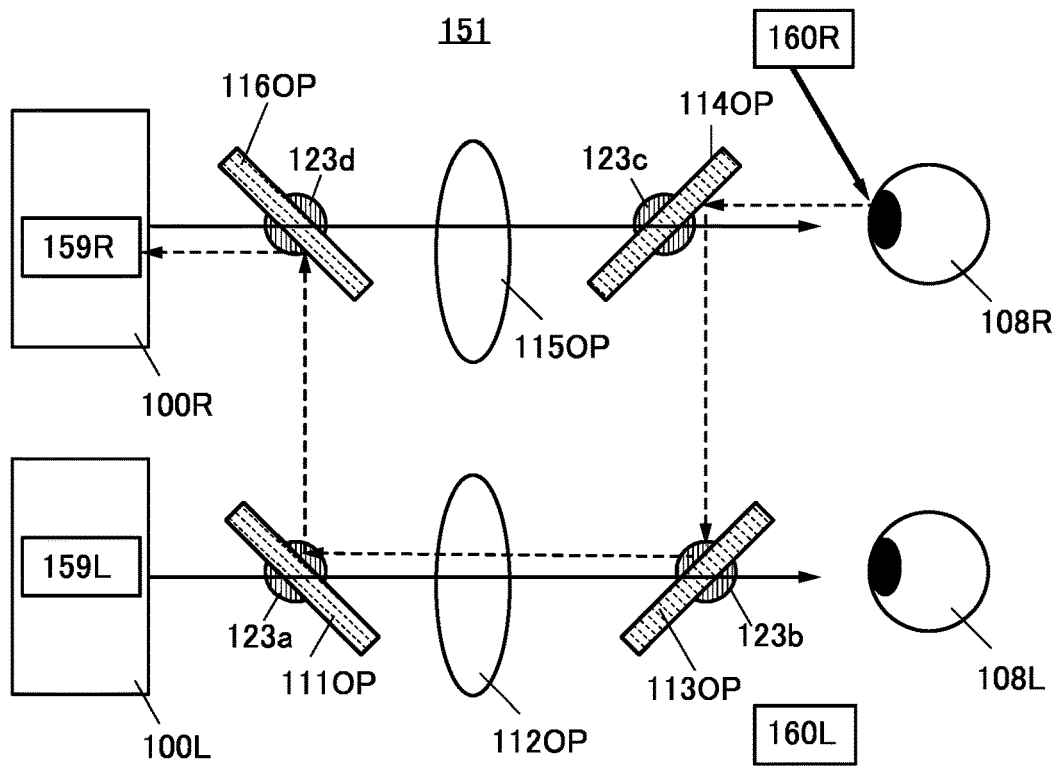

FIGS. 3A and 3B show an example in which optical elements include driving mechanisms 123a to 123d unlike in the optical system 1 or optical system 2. FIGS. 3A and 3B are top views of the electronic device 150. The optical system 151 including the driving mechanisms is used as an optical system for both eyes (an eyeball 108R and the eyeball 108L). An optical system for both eyes refers to an optical system part or the whole of which serves as both the optical system for the left eye and the optical system for the right eye.

In FIGS. 3A and 3B, the display device 100R for the right eye and the display device 100L for the left eye are provided. Alternatively, the display device 100R and the display device 100L may be replaced with one display device, in which case the left part of the display device is used as the display device 100L and the right part thereof is used as the display device 100R.

In FIGS. 3A and 3B, the optical paths of visible light are denoted with the solid lines and those of reflected light are denoted with the dotted lines. In order that the position of the left eyeball 108L can be tracked, in FIG. 3A, infrared light from the infrared light source 160L is reflected by the eyeball 108L and then reflected by the optical elements as denoted by the dotted lines to enter the light-receiving element 159L of the display device 100L. Thus, gaze tracking (eye tracking) can be performed. This optical system has a structure similar to that shown in FIG. 2A.

Next, in order that the position of the right eyeball 108R can be tracked, the driving mechanisms 123a to 123d are provided in FIG. 3B to allow the optical elements to reflect the infrared light that has been reflected by the right eyeball 108R. Each of the driving mechanisms has one or both of a function of moving the optical element and a function of rotating the optical element. For example, the driving mechanisms 123a to 123d are used to rotate the optical elements. Accordingly, as denoted with the dotted lines in FIG. 3B, the reflected light is reflected by the optical elements to enter the light-receiving element 159R of the display device 100R. Thus, gaze tracking (eye tracking) can be performed.

The optical elements are provided with the driving mechanisms as appropriate, whereby eye tracking can be performed for both eyes.

The optical systems 1 to 3 as described above are each preferably fitted in a housing when provided in the electronic device 150. An optical system fitted in a housing is sometimes referred to as a lens unit. In order that the positions of the optical elements in the lens unit can be adjusted corresponding to the user, the electronic device 150 preferably includes a position adjustment mechanism for the lens unit.

<Motion Detection Portion>

The motion detection portion 153 in FIG. 1 includes an inertial sensor and has a function of sensing the motion of the user's body. Note that the inertial sensor here refers to a sensor for sensing the acceleration and angular velocity of an object. In the case where there is no need to sense the motion of the user's body, the electronic device 150 does not necessarily include the motion detection portion 153.

<Audio>

The audio 154 in FIG. 1 includes, for example, one or more of a microphone and a speaker. The electronic device 150 does not necessarily include the audio 154.

<Camera>

The camera 155 in FIG. 1 has a function of an information input device and can be, for example, a digital camera. The electronic device 150 does not necessarily include the camera 155.

<Control Portion>

The control portion 156 in FIG. 1 includes a central processing unit (CPU), a graphics processing unit (GPU), and a memory.

<Communication Portion>

The communication portion 157 in FIG. 1 can transmit and receive data to and from another terminal or a server on a network through wireless communication. The electronic device 150 does not necessarily include the communication portion 157.

Note that the control portion 156 and the communication portion 157 may be provided separately from the electronic device 150 instead of being integrated with the electronic device 150. In that case, the electronic device 150 can be less bulky.

<Battery>

The battery 158 in FIG. 1 can be a lithium ion secondary battery or the like.

<Bus Wiring>

In FIG. 1, the display device 100, the motion detection portion 153, the audio 154, the camera 155, the control portion 156, the communication portion 157, and the infrared light source 160 can transmit and receive various kinds of signals to and from one another through a bus wiring BW.

For example, data on gaze generated by the image processing portion 121R or the image processing portion 121L can be transmitted to the control portion 156 through the bus wiring BW.

<Image Analysis>

The image processing portion 121 in FIG. 1 can perform image analysis and has a function of identifying the position of the user's gaze by utilizing the image analysis. In other words, the image analysis enables the position data of gaze to be constructed from the data on the gaze obtained by the light-receiving element 159. With the use of such image analysis or the like, eye tracking can be performed.

For the above image analysis, a neural network, an arithmetic circuit having a function of performing a product-sum operation, or the like can be used. That is, the image processing portion 121 includes one or both of a processing device capable of executing a program including a neural network and an arithmetic circuit having a function of performing a product-sum operation.

It is particularly preferable that an arithmetic circuit having a function of performing a product-sum operation be used for the above image analysis. The use of the arithmetic circuit enables the image analysis to be performed with low power. That is, it is possible to reduce power consumption of the display device 100 of one embodiment of the present invention or the electronic device 150 including the display device. Note that details of the arithmetic circuit having a function of performing a product-sum operation will be described later.

For the above image analysis, a neural network may be used. For the neural network, deep learning is particularly preferably used. For the deep learning, a convolutional neural network (CNN), a recurrent neural network (RNN), an autoencoder (AE), a variational autoencoder (VAE), random forest, a support vector machine, gradient boosting, a generative adversarial network (GAN), or the like is preferably used, for example.

<Image Processing>

The control portion 156 preferably has a function of performing image processing. It is preferable that the image processing be performed to specify a region with which the user's gaze overlaps in an image viewed by the user. By the above-described image analysis, specifically, a region with which gaze overlaps in the display device 100 can be specified.

Figure 4A:
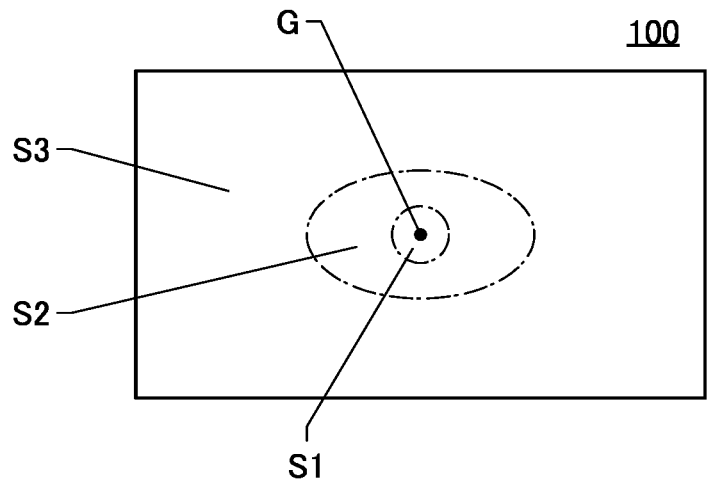
FIGS. 4A and 4B show image processing by an electronic device.

FIG. 4A shows the user's gaze G and the user's visual field which overlap with an image on the display device 100. The user's visual field includes a first region S1 including the gaze G, a second region S2 outside the first region S1, and a third region S3 outside the second region S2. Note that the above first region S1 to third region S3 can be understood also when the display device 100 is rephrased as the display device 100R or the display device 100L.

Figure 4B:
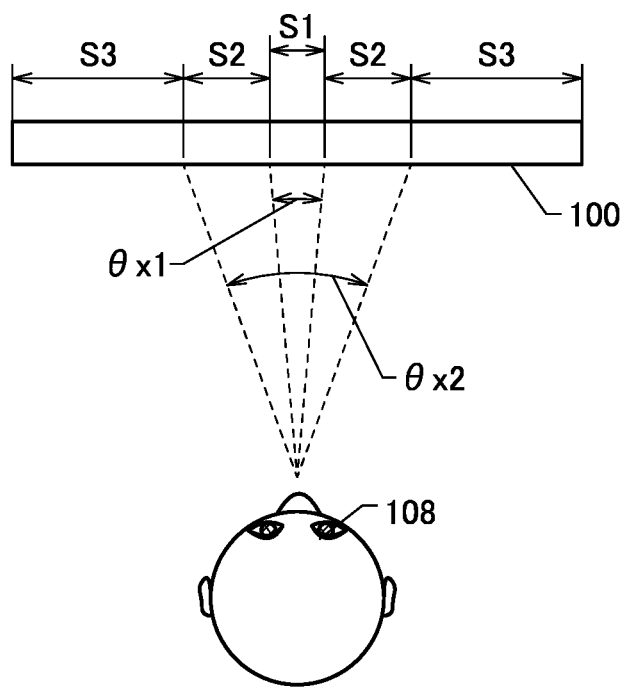

Although varying between individuals, the human visual field is constituted by the discrimination visual field, the effective visual field, the stable gaze visual field, the induced visual field, and the auxiliary visual field. The discrimination visual field is the region where visual performance such as eyesight and color discrimination is the highest. The discrimination visual field refers to the region extending to an angle $\theta \times 1$ of approximately 5° in the vertical direction and the horizontal direction, with the line (hereinafter referred to as line of intersection) which extends from the user's eyeball 108 to intersect with the display device 100 used as the center. FIG. 4B shows the angle $\theta \times 1$ in the horizontal direction of approximately 5°. That is, the discrimination visual field corresponds to the first region S1 in FIG. 4A.

The effective visual field is the region where specific information can be discriminated instantaneously only by the eye movement. The effective visual field refers to the region excluding the discrimination visual field and extending to an angle $\theta \times 2$ of approximately 30° in the horizontal direction and, although not shown in FIG. 4B, to an angle of approximately 20° in the vertical direction, with the line of intersection used as the center. FIG. 4B shows the angle $\theta \times 2$ in the horizontal direction of approximately 30°. That is, the effective visual field corresponds to the second region S2 in FIG. 4A.

The stable gaze visual field is the region where specific information can be discriminated without much difficulty but with head movement. The induced visual field is the region where the presence of a specific object can be perceived but discrimination performance is low. The auxiliary visual field is the region where discrimination performance for a specific object is considerably low and the presence of a stimulus can be perceived. One or more selected from the stable gaze visual field, the induced visual field, and the auxiliary visual field correspond to the third region S3 in FIG. 4A.

From the above, the quality of a video in the discrimination visual field and the effective visual field is important. It is particularly significant to increase the image quality in the discrimination visual field. Accordingly, it is preferable that the control portion 156 perform image processing to increase the image quality in the first region S1 or the first region S1 and the second region S2 shown in FIG. 4A. In other words, the image in the first region S1 or the first region S1 and the second region S2 is preferably enhanced. The image processing includes increasing video resolution by upconversion. Such upconversion makes it possible to provide a highly visible video.

Not only image processing but also speech processing may be performed.

<Image Data Generation>

In the case where the electronic device 150 is installed with software, for example, the control portion 156 can generate image data in accordance with information from the software, information from the camera 155, information on the above image processing, and the like. The image data is transmitted to the display device 100 through the bus wiring BW. The image data is stored in the frame memories 122R and 122L of the display device 100. Subsequently, the source drivers or the like included in the driver circuit portions 120R and 120L control a display portion of the display device 100 to enable display relating to the image data.

<Display Device>

Figure 5A:
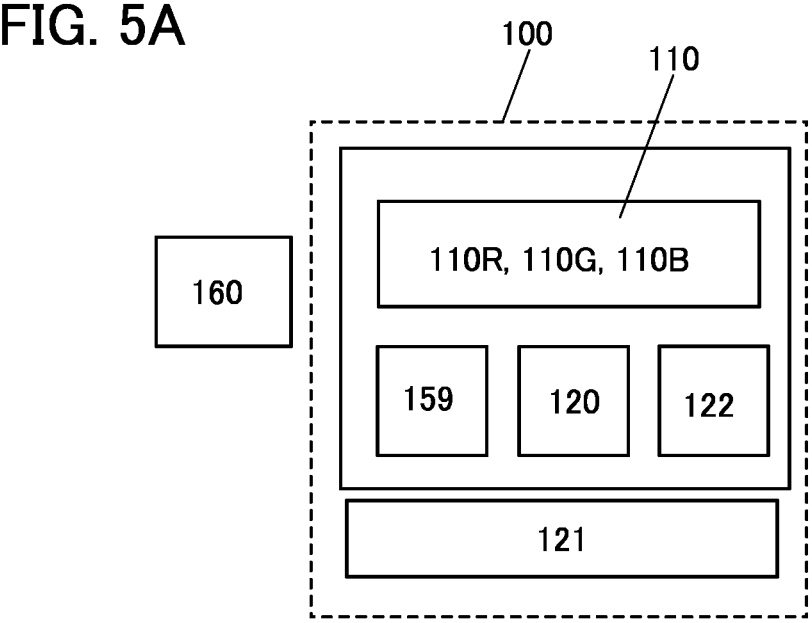
Figure 5A:
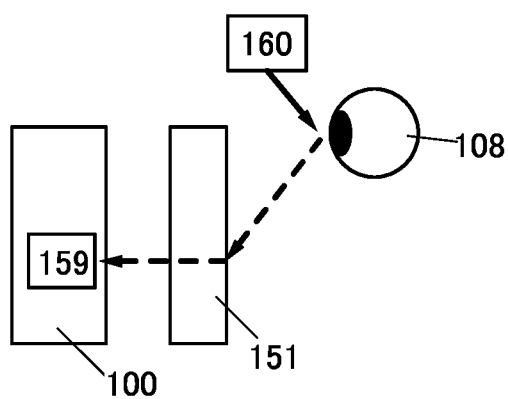
Figure 5A:
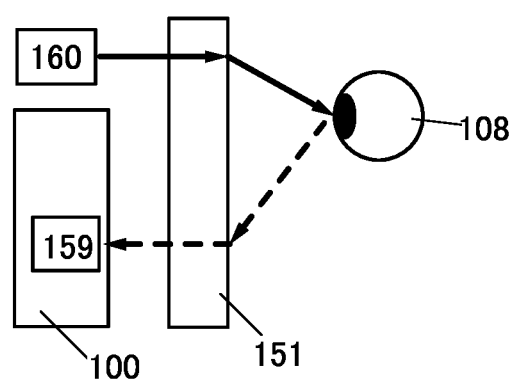

The case is described where the display device 100 includes a light-emitting element 110R, a light-emitting element 110G, and a light-emitting element 110B as shown in FIG. 5A. When the light-emitting elements 110R, 110G, and 110B do not need to be distinguished from each other, the term "light-emitting element 110" is used. Note that the structures of the light-emitting element 110 and the like can be understood also when the display device 100 is rephrased as the display device 100R or the display device 100L.

FIG. 5A shows an example in which the display device 100 includes the driver circuit portion 120, the image processing portion 121, and the frame memory 122.

The electronic device shown in FIG. 5A further includes the infrared light source 160 and the light-receiving element 159. The infrared light source 160 is positioned outside the display device 100, and the light-receiving element 159 is included in the display device 100. The infrared light source 160 may be provided in the display device 100. The light-receiving element 159 may be provided outside the display device 100.

FIG. 5B1 shows an example of arrangement of the infrared light source 160, the display device 100 including the light-receiving element 159, the optical system 151, and the eyeball 108. Infrared light from the infrared light source 160 enters the eyeball 108 without passing through the optical system 151. When passing through the optical system 151, the infrared light output from the infrared light source 160 sometimes has a reduced amount; thus, the infrared light preferably enters the eyeball 108 without passing through the optical system 151. The optical system 151 of the electronic device shown in FIG. 5B1 can be downsized. The structure of the optical system 151 is as already described with reference to FIGS. 2A and 2B, FIGS. 3A and 3B, and the like. Note that the structure of the electronic device can be understood also when the display device 100 is rephrased as the display device 100R or the display device 100L.

In another arrangement example, infrared light from the infrared light source 160 can pass through the optical system 151 to enter the eyeball 108 as shown in FIG. 5B2. The structure of the optical system 151 is as described with reference to FIGS. 2A and 2B, FIGS. 3A and 3B, and the like, and the infrared light from the infrared light source 160 can pass through the optical element positioned on the optical path of reflected light, to enter the eyeball 108. Alternatively, the infrared light from the infrared light source 160 can pass through not only the optical system described above with reference to FIGS. 2A and 2B, FIGS. 3A and 3B, and the like but also an added optical element to enter the eyeball 108. As the added optical element, one or more selected from a lens, a prism, a mirror, a half mirror, a filter, and a diffraction grating can be used. Note that the structure of the electronic device can be understood also when the display device 100 is rephrased as the display device 100R or the display device 100L.

As shown in FIGS. 5B1 and 5B2, the light reflected by the eyeball 108 can pass through the optical system 151 to enter the light-receiving element 159. The structure of the optical system 151 is as already described with reference to FIGS. 2A and 2B, FIGS. 3A and 3B, and the like.

The electronic device 150 of one embodiment of the present invention as described above can have an eye tracking function and inhibit defocus in videos.

Figure 6A:
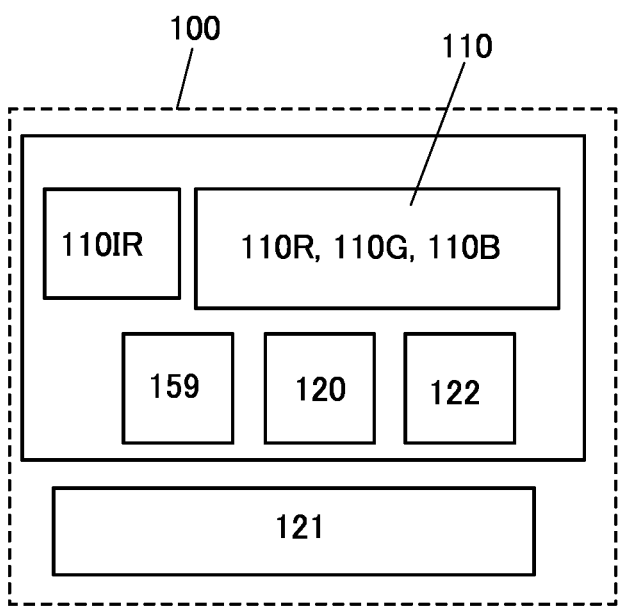
Figure 6A:
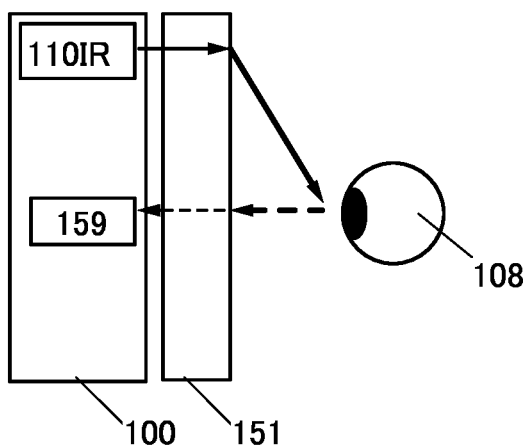
Figure 6A:
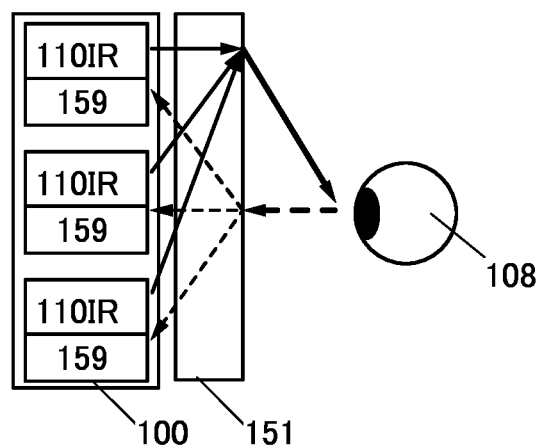

As shown in FIG. 6A, the display device 100 may include a light-emitting element 110IR as an infrared light source, and the light-emitting element 110IR may be integrated with the display device 100. Such a display device is referred to as an infrared light source-integrated display device. Unlike in the display device shown in FIGS. 5A, 5B1, and 5B2 and the like, the light-emitting element 110IR is formed by the same steps as the light-emitting element 110 and the like in the display device 100 shown in FIG. 6A, whereby the electronic device 150 can be downsized. Note that the structure of the electronic device can be understood also when the display device 100 is rephrased as the display device 100R or the display device 100L.

FIG. 6B1 shows an example of arrangement of the display device 100 including the light-emitting element 110IR and the light-receiving element 159, the optical system 151, and the eyeball 108. Infrared light from the light-emitting element 110IR can pass through the optical system 151 to enter the eyeball 108 as shown in FIG. 6B1. The structure of the optical system 151 is as described with reference to FIGS. 2A and 2B, FIGS. 3A and 3B, and the like, and the infrared light from the light-emitting element 110IR can pass through the optical element positioned on the optical path of reflected light, to enter the eyeball 108. Alternatively, the infrared light from the light-emitting element 110IR can pass through not only the optical system described above with reference to FIGS. 2A and 2B, FIGS. 3A and 3B, and the like but also an added optical element to enter the eyeball 108. As the added optical element, one or more selected from a lens, a prism, a mirror, a half mirror, a filter, and a diffraction grating can be used. Note that the structure of the electronic device can be understood also when the display device 100 is rephrased as the display device 100R or the display device 100L.

In another arrangement example, a plurality of light-emitting elements 110IR and a plurality of light-receiving elements 159 may be provided in the display device 100 as shown in FIG. 6B2. This arrangement is preferred because the display device 100 does not increase in size even when including the plurality of light-emitting elements 110IR and the plurality of light-receiving elements 159. Note that the structure of the electronic device can be understood also when the display device 100 is rephrased as the display device 100R or the display device 100L.

As shown in FIGS. 6B1 and 6B2, the light reflected by the eyeball 108 can pass through the optical system 151 to enter the light-receiving elements 159. The structure of the optical system 151 is as already described with reference to FIGS. 2A and 2B, FIGS. 3A and 3B, and the like.

The electronic device in FIGS. 6B1 and 6B2 can obtain information on the infrared light emitted from the light-emitting element 110IR. Accordingly, in detection of reflected light with the light-receiving element 159, the control portion of the electronic device 150 may perform data processing in accordance with the information. Even when the infrared light output from the light-emitting element 110IR has a reduced amount by passing through the optical system 151, for example, the data processing makes it possible to accurately obtain the information on the reflected light.

As described above, the electronic device 150 of one embodiment of the present invention can have an eye tracking function and inhibit defocus in videos.

At least part of this embodiment can be implemented in combination with any of the other embodiments described in this specification, as appropriate.

[Structure Example of Display Device]

Next, structure examples of the display device 100 included in the electronic device of one embodiment of the present invention are described. Although the electronic device includes at least an optical system in addition to the display device 100, the optical system is not shown in the drawings that are referred to in this description of the structure examples of the display device. The optical system is positioned between the display device 100 and the eyeball 108 and can be the optical system that is described above with reference to FIGS. 2A and 2B, FIGS. 3A and 3B, and the like. Note that the structure of the electronic device can be understood also when the display device 100 is rephrased as the display device 100R or the display device 100L.

Figure 7A:
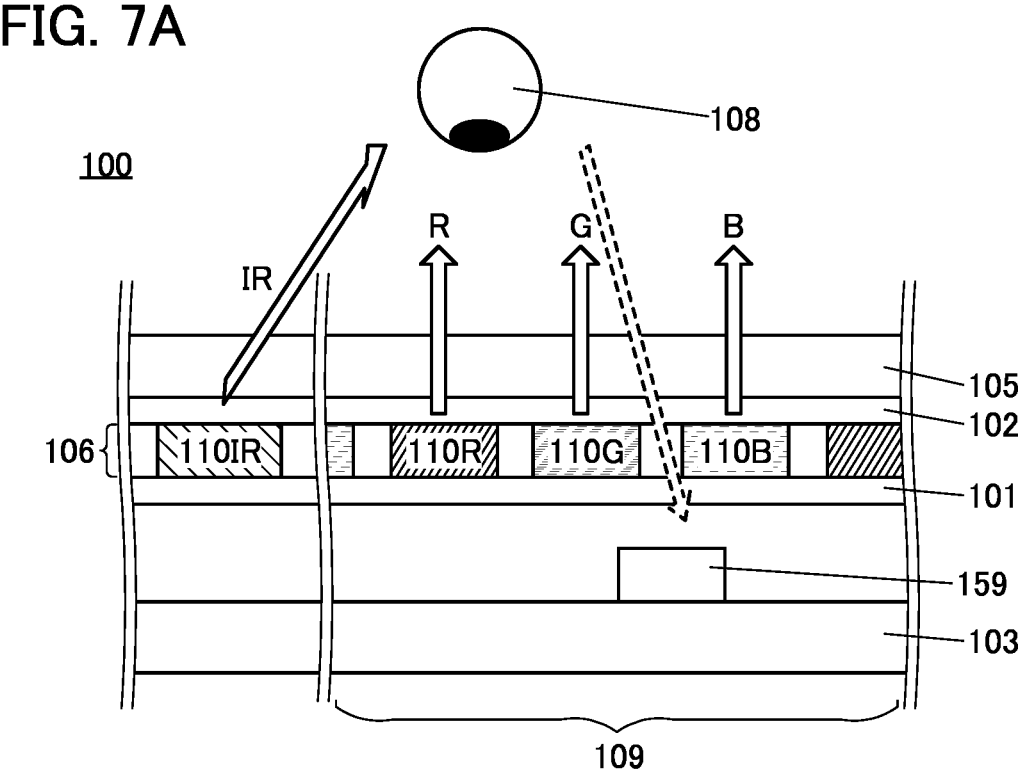
FIGS. 7A and 7B show a display device included in an electronic device.

The display device 100 shown in FIG. 7A is an infrared light source-integrated display device including a substrate 101, a substrate 102, and the light-emitting elements 110R, 110G, 110B, and 110IR that are interposed between the substrate 101 and the substrate 102. The light-emitting elements 110R, 110G, 110B, and 110IR are formed over the substrate 101 through the same steps. Furthermore, the light-emitting elements 110R, 110G, 110B, and 110IR are formed in a layer 106 interposed between the substrate 101 and the substrate 102. The layer 106 may include an electrode (referred to as a common electrode) shared by the light-emitting elements 110R, 110G, 110B, and 110IR. The light-emitting elements 110R, 110G, and 110B function as display elements and the light-emitting element 110IR functions as an infrared light source. The light-emitting elements 110R, 110G, and 110B are positioned in a pixel portion 109 and the light-emitting element 110IR is positioned outside the pixel portion 109.

The light-emitting element 110R emits red light, the light-emitting element 110G emits green light, the light-emitting element 110B emits blue light, and the light-emitting element 110IR emits infrared light. There is no particular limitation on the number of the light-emitting elements 110IR, and one or more light-emitting elements 110IR may be included.

Light emitted by the light-emitting element 110IR preferably includes infrared light, further preferably near-infrared light. For example, it is possible to use infrared light with a wavelength of greater than or equal to 700 nm, preferably near-infrared light having one or more peaks in the wavelength range of 800 nm to 2500 nm.

The display device 100 shown in FIG. 7A includes the light-receiving element 159 below the substrate 101 and a support plate 103 supporting the light-receiving element 159. The light-receiving element 159, which is integrated with the display device 100, is provided to overlap with the pixel portion 109. In addition, a protection member 105 is preferably provided over the substrate 102.

The light-receiving element 159 has a function of detecting infrared light; specifically, the light-receiving element 159 preferably has photosensitivity for the infrared light, preferably near-infrared light, emitted by the light-emitting element 110IR.

As shown in FIG. 7A, an image is displayed on the pixel portion 109 by light emission by the light-emitting elements 110R, 110G, and 110B. Furthermore, the infrared light emitted from the light-emitting element 110IR is reflected by the user's eyeball 108 to be detected by the light-receiving element 159, whereby eye tracking is performed. Thus, the substrate 102 and the protection member 105 need to transmit the visible light from the light-emitting elements 110R, 110G, and 110B, the infrared light emitted by the light-emitting element 110IR, and the infrared light reflected by the eyeball 108. It is thus preferable that the substrate 102 and the protection member 105 have a light-transmitting property with respect to visible light and infrared light. Moreover, the infrared light reflected by the eyeball 108 needs to be transmitted through the substrate 101. It is thus preferable that the substrate 101 have a light-transmitting property with respect to at least infrared light.

For the substrate 101, an insulator such as glass, quartz, ceramic, sapphire, or stabilized zirconia (yttria-stabilized zirconia), an insulating resin, a resin such as a conductive resin, a semiconductor such as silicon, germanium, silicon carbide, silicon germanium, gallium arsenide, indium phosphide, or zinc oxide, a metal, an alloy, or the like can be used. Note that for the substrate 101, a material having a light-transmitting property with respect to infrared light is used.

For the substrate 102, an insulator such as glass, quartz, ceramic, sapphire, or stabilized zirconia (yttria-stabilized zirconia), an insulating resin, a resin such as a conductive resin, a semiconductor such as silicon, germanium, silicon carbide, silicon germanium, gallium arsenide, indium phosphide, or zinc oxide, a metal, an alloy, or the like can be used. Note that for the substrate 102, a material having a property of transmitting visible light and infrared light is used.

When the substrate 101 and the substrate 102 are formed using a flexible material, the display device 100 can have increased flexibility and moreover, the display device 100 can be reduced in weight and thickness.

As such a flexible material, a polyester resin such as polyethylene terephthalate (PET) or polyethylene naphthalate (PEN), a polyacrylonitrile resin, an acrylic resin, a polyimide resin, a polymethyl methacrylate resin, a polycarbonate (PC) resin, a polyethersulfone (PES) resin, a polyamide resin (e.g., nylon or aramid), a polysiloxane resin, a cycloolefin resin, a polystyrene resin, a polyamide-imide resin, a polyurethane resin, a polyvinyl chloride resin, a polyvinylidene chloride resin, a polypropylene resin, a polytetrafluoroethylene (PTFE) resin, an ABS resin, cellulose nanofiber, or the like can be used. An ABS resin refers to a copolymerized synthetic resin of acrylonitrile, butadiene, and styrene.

Glass thin enough to be flexible may be used for one or both of the substrate 101 and the substrate 102; alternatively, one or both of the substrate 101 and the substrate 102 may be a polarizing plate.

Figure 7B:
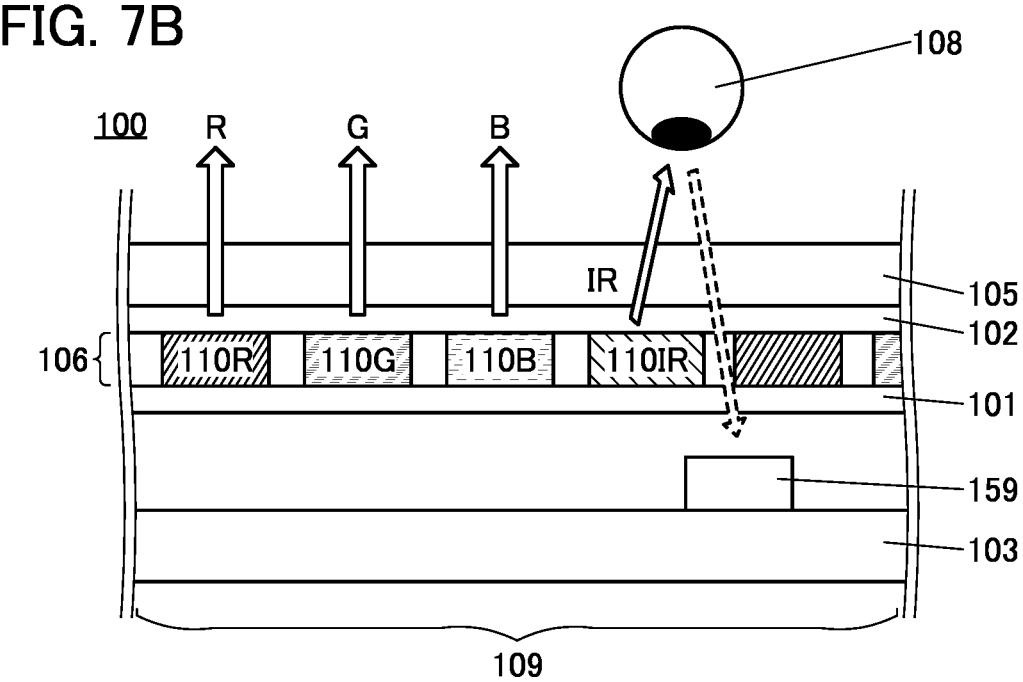

In one embodiment of the present invention, the structure as shown in FIG. 7B may be employed. The display device shown in FIG. 7B is an infrared light source-integrated display device and is different from the display device shown in FIG. 7A in that the light-emitting element 110IR as an infrared light source is provided in the pixel portion 109. Although the light-emitting element 110IR sometimes partly overlaps with the light-receiving element 159 as a result of positioning both the light-emitting element 110IR and the light-receiving element 159 in the pixel portion 109, the light-receiving element 159 can receive reflected light even in such a case. Other components are similar to those in the display device in FIG. 7A and thus, for their details, the above description relating to FIG. 7A or the like can be referred to.

As described above, in each of the display devices 100 shown in FIGS. 7A and 7B, the layer 106 including the light-emitting element 110IR is over and overlaps with the light-receiving element 159 and accordingly the distance between the light-emitting element 110IR and the light-receiving element 159 is relatively small. This can increase the detection sensitivity with respect to the reflected light from the eyeball 108.

Figure 8A:
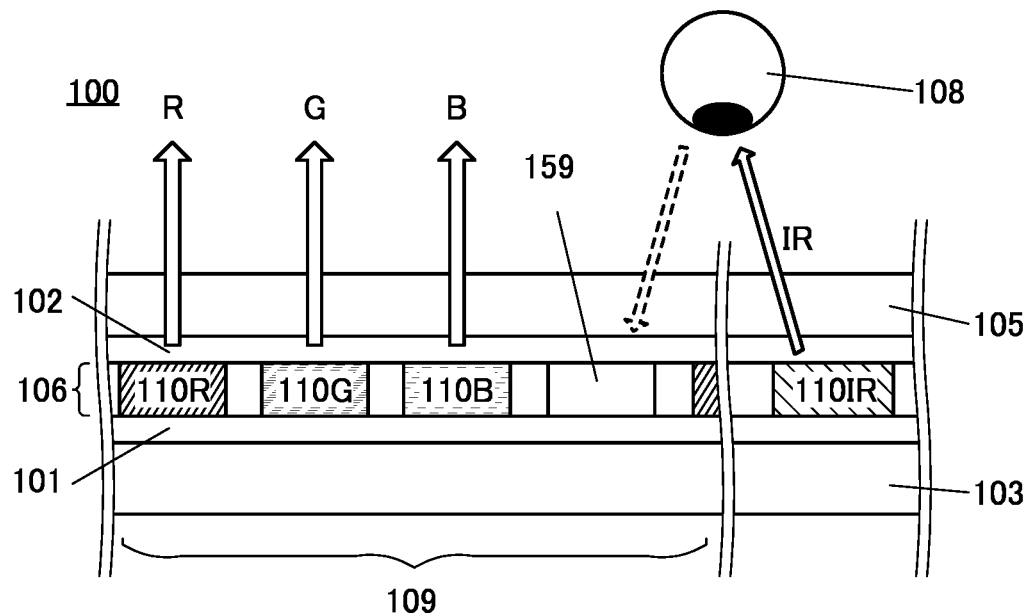
FIGS. 8A and 8B show a display device included in an electronic device.
Figure 8B:
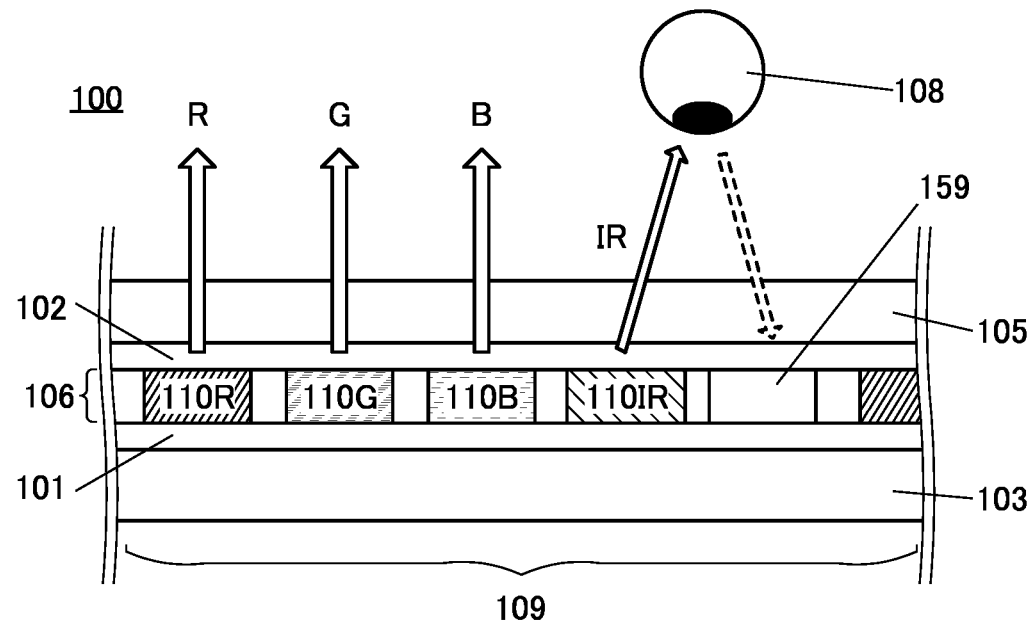

Note that an infrared light source-integrated display device of one embodiment of the present invention is not limited to the above, and the light-receiving element 159 may be provided between the substrate 101 and the substrate 102, e.g., in the layer 106, together with the light-emitting element 110 as shown in FIGS. 8A and 8B. Specifically, the display device 100 shown in FIG. 8A is different from the display device 100 shown in FIG. 7A in that the light-receiving element 159 and the light-emitting element 110 are provided between the substrate 101 and the substrate 102. Furthermore, the display device 100 shown in FIG. 8B is different from the display device 100 shown in FIG. 7B in that the light-receiving element 159 and the light-emitting element 110 are provided between the substrate 101 and the substrate 102. In each of the display devices 100 shown in FIGS. 8A and 8B, since the light-receiving element 159 is provided over the substrate 101, the substrate 101 may have a low light-transmitting property with respect to infrared light or does not need to have a light-transmitting property with respect to infrared light in some cases. Furthermore, the support plate 103 of the display devices 100 shown in FIGS. 8A and 8B may be omitted.

In the display devices 100 shown in FIG. 7A and FIG. 8A, the light-emitting element 110IR as an infrared light source is provided outside the pixel portion 109. In this case, as shown in FIGS. 2A and 2B, FIGS. 3A and 3B, or the like, the optical system 151 is preferably designed such that the optical system 151 provided between the display device 100 and the eyeball 108 is used to irradiate the user's eyeball with the infrared light emitted from the light-emitting element 110IR. The eyeball can be irradiated with the infrared light with the use of the optical element of the optical system 151 which is positioned on the optical path for reflected light or with the use of an added optical element. In the above structure, the infrared light emitted from the light-emitting element 110IR is reflected by the user's eyeball 108 and the reflected light passes through the optical system 151 to be detected by the light-receiving element 159, which enables eye tracking.

Figure 9A:
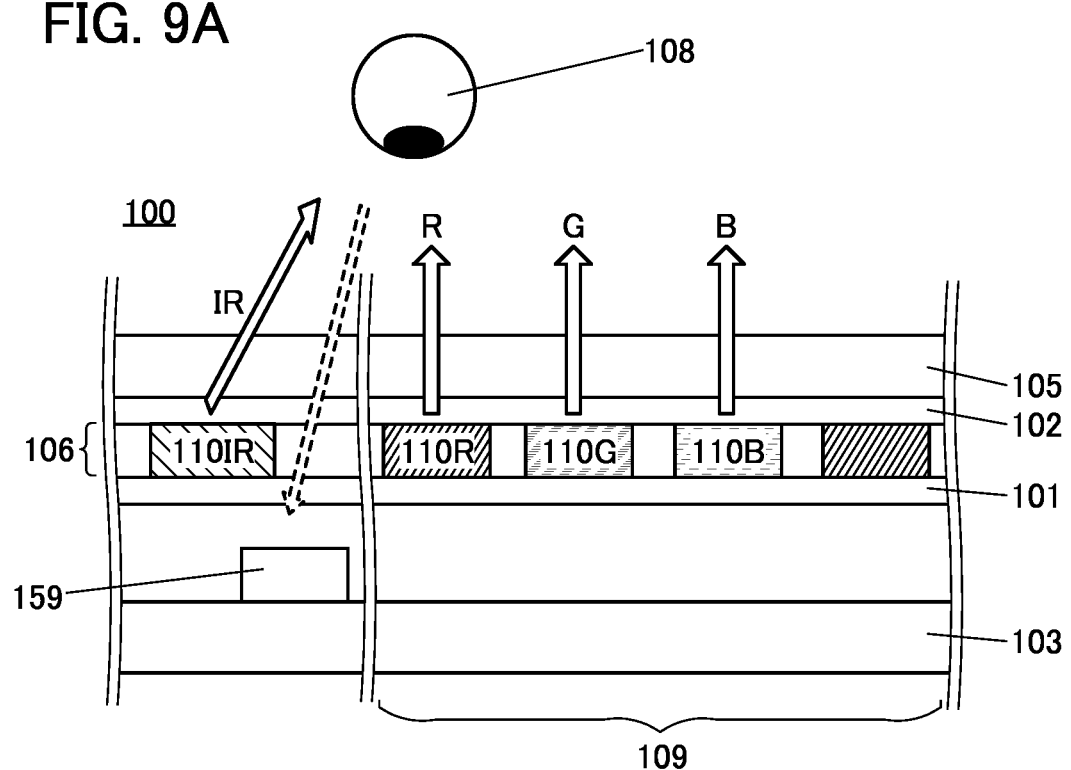
FIGS. 9A and 9B show a display device included in an electronic device.
Figure 9B:
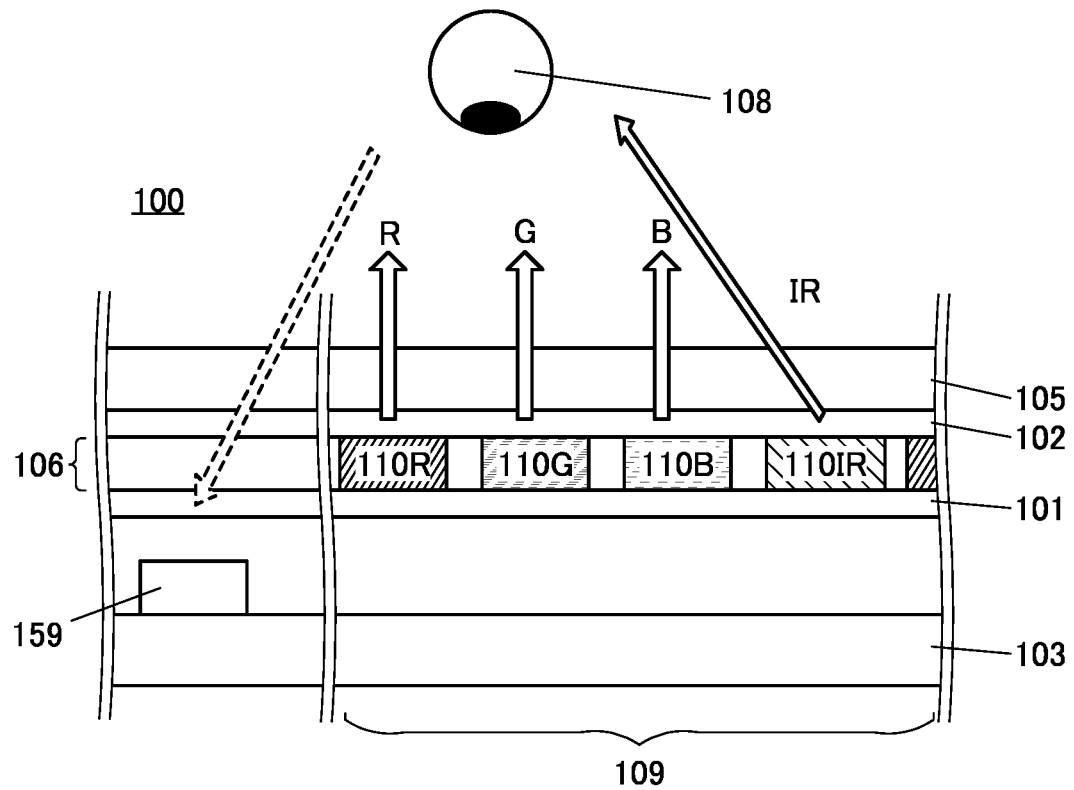

In one embodiment of the present invention, the light-receiving element 159 may be provided outside the pixel portion 109. Specifically, in the display device 100 shown in FIG. 9A, which is an infrared light source-integrated display device, the light-receiving element 159 is provided outside the pixel portion 109 together with the light-emitting element 110IR. The display device 100 shown in FIG. 9B is an infrared light source-integrated display device in which the light-receiving element 159 is provided outside the pixel portion 109 and the light-emitting element 110IR is provided in the pixel portion 109.

Figure 10A:
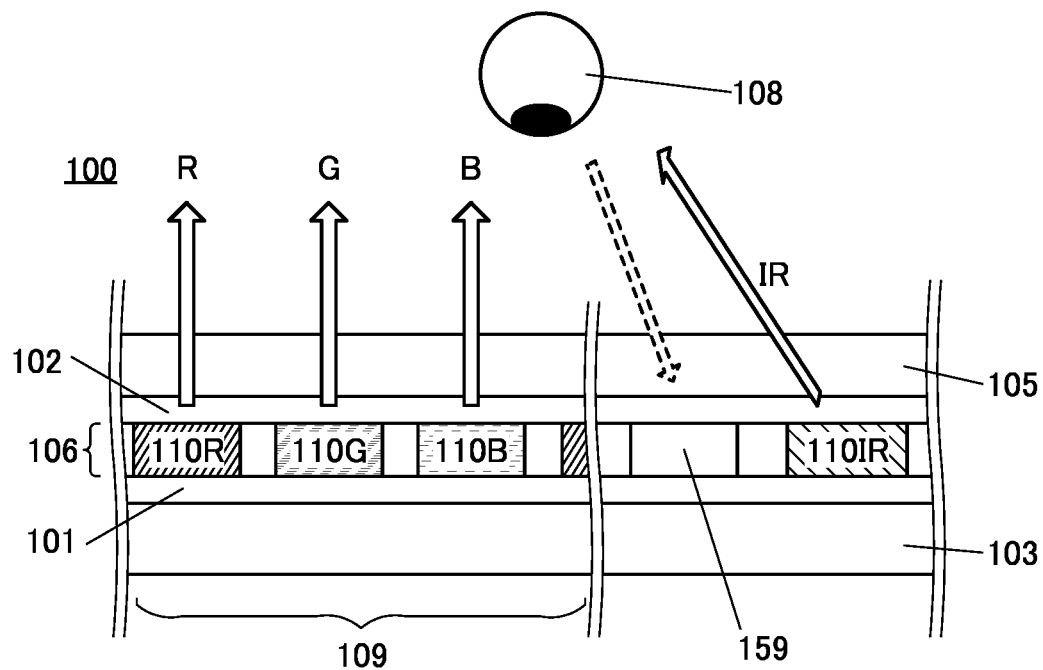
FIGS. 10A and 10B show a display device included in an electronic device.
Figure 10B:
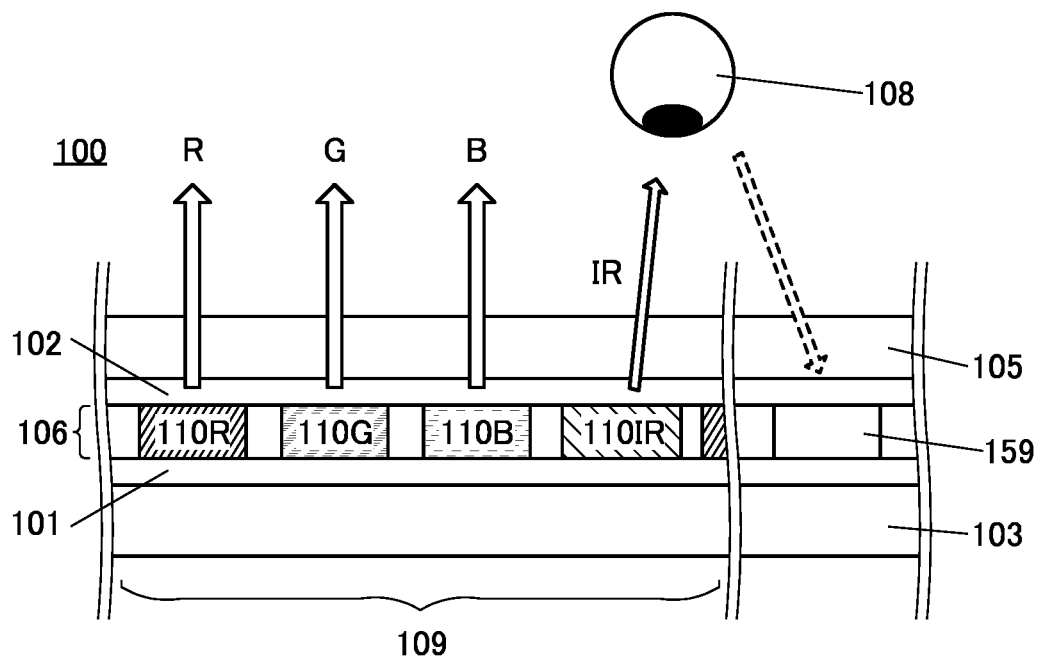

In the display device 100 shown in FIG. 10A, which is an infrared light source-integrated display device, the light-receiving element 159 is provided in the layer 106 outside the pixel portion 109 together with the light-emitting element 110IR. In the display device 100 shown in FIG. 10B, which is an infrared light source-integrated display device, the light-receiving element 159 is provided in the layer 106 together with the light-emitting element 110IR, the light-receiving element 159 is provided outside the pixel portion 109, and the light-emitting element 110IR is provided in the pixel portion 109. Furthermore, the support plate 103 of the display devices 100 shown in FIGS. 10A and 10B may be omitted.

Although a pixel is formed using four kinds of light-emitting elements of the light-emitting element 110R emitting red light, the light-emitting element 110G emitting green light, the light-emitting element 110B emitting blue light, and the light-emitting element 110IR emitting infrared light in the above description, the present invention is not limited to this structure. For example, the light-emitting element 110R may emit light having a peak in each of the red wavelength range and the infrared wavelength range and a pixel may be formed using three kinds of light-emitting elements of the light-emitting element 110R, the light-emitting element 110G, and the light-emitting element 110B.

In the display devices 100 shown in FIGS. 7A and 7B and FIGS. 9A and 9B, the support plate 103 may be replaced with a substrate and the substrate 101 may be replaced with an insulating layer. In this case, the light-receiving element 159 may be provided over the substrate or formed using the substrate. Furthermore, the insulating layer is provided over the light-receiving element 159 and the light-emitting element 110 is provided over the insulating layer. The insulating layer preferably has a light-transmitting property with respect to at least infrared light.

In each of the display devices 100 shown above, the protection member 105 does not need to be provided in some cases.

[Operation Example of Electronic Device]

An operation example of the electronic device of one embodiment of the present invention is described below with reference to a flowchart shown in FIG. 11. This electronic device includes an infrared light source-integrated display device.

Figure 11:
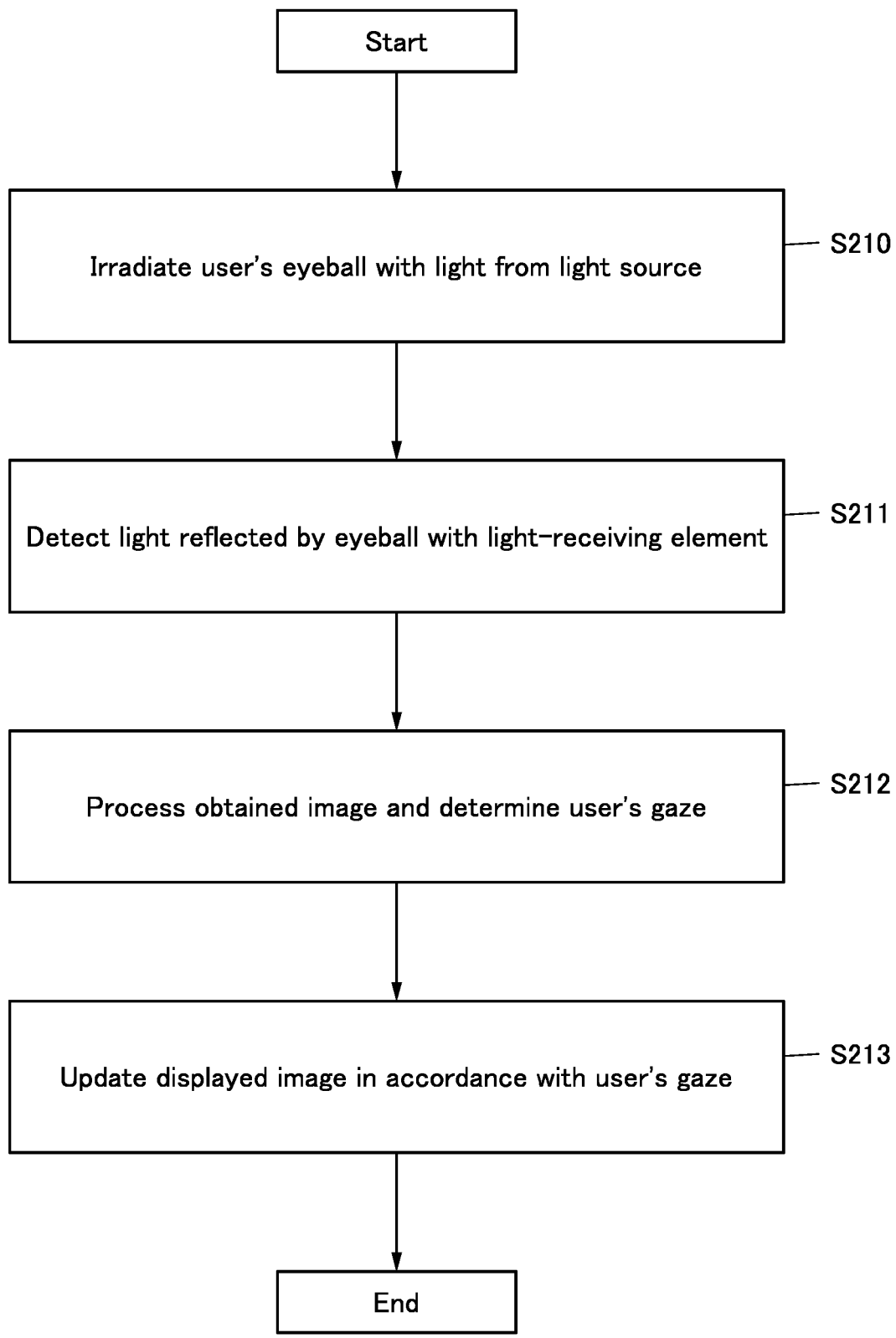
FIG. 11 is a flowchart showing an operation example of an electronic device.

The flowchart shown in FIG. 11 includes Steps S210 to S213. First, in Step S210, the user's eyeball is irradiated with infrared light emitted from the light-emitting element 110IR, which serves as an infrared light source. In this step, the infrared light source 160 may be used. Then, in Step S211, the light reflected by the eyeball 108 is detected by the light-receiving element.

In Step S212, the user's gaze is determined in accordance with information from the light-receiving element. The information from the light-receiving element is preferably subjected to image processing as needed. Then, in Step S213, an image displayed by the display device is updated in accordance with the user's gaze. The update preferably includes image processing for increasing the resolution in the region including the user's gaze as shown in FIGS. 4A and 4B. Owing to the image processing for increasing the resolution only in the region, load imposed on the GPU or the like of the control portion can be reduced.

According to one embodiment of the present invention, the user's gaze can be tracked. Tracking the user's gaze allows determination of the user's attention, for example, in which case the user's action can be analyzed. Furthermore, an avatar can reproduce the motion of the user's eyes. In addition, an operation or menu selection using gaze can be performed.

According to this embodiment, an electronic device having an eye tracking function can be provided.

At least part of any of the structure examples, the drawings corresponding thereto, and the like described in this embodiment can be combined with any of the other structure examples, the other drawings corresponding thereto, and the like as appropriate.

Embodiment 2

In this embodiment, structure examples of an electronic device of one embodiment of the present invention and an electronic device for which a display device of one embodiment of the present invention is used will be described.

Since the display device of one embodiment of the present invention has an eye tracking function and can have high resolution, the display device can be suitably used in a VR or AR electronic device. Alternatively, the display device can be suitably used in a substitutional reality (SR) or mixed reality (MR) electronic device. Examples of the electronic device of one embodiment of the present invention and the electronic device for which the display device of one embodiment of the present invention is used include information terminals (wearable devices) that can be worn on the head such as a head-mounted display, a glasses-type terminal, and a goggle-type terminal. In this specification and the like, an electronic device may be rephrased as a head-mounted display, a glasses-type terminal, a goggle-type terminal, or the like.

Figure 12A:
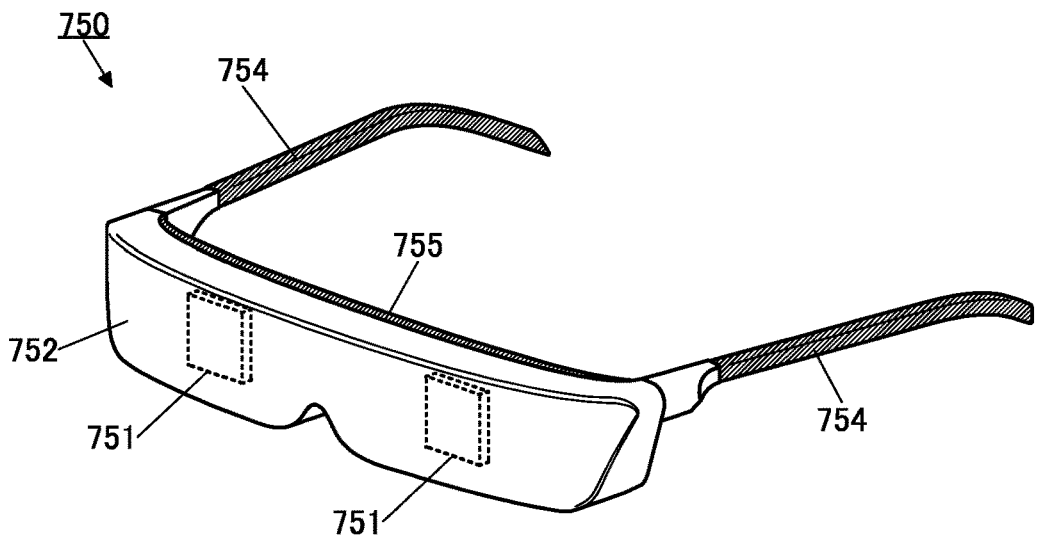
FIGS. 12A to 12C show structure examples of an electronic device.
Figure 12B:
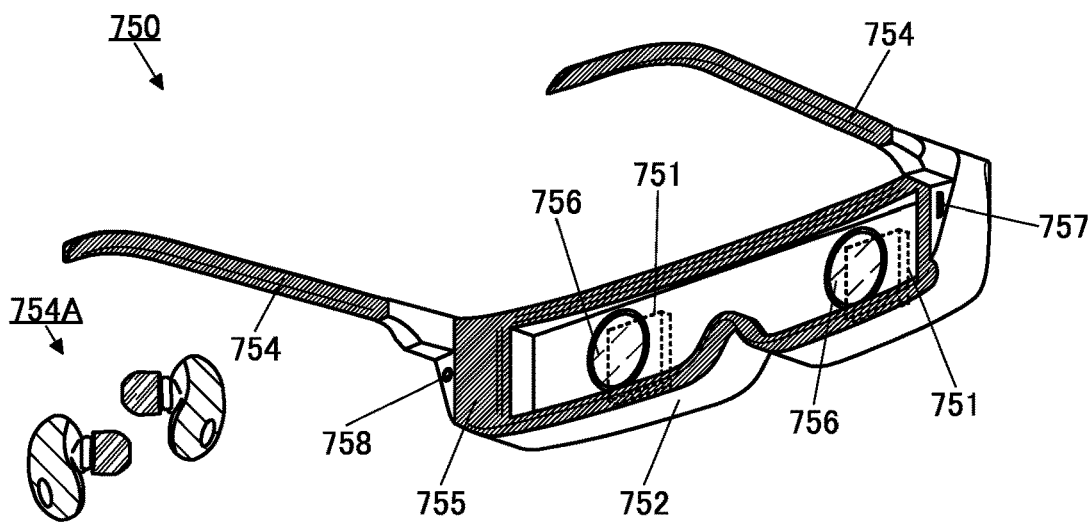
Figure 12C:
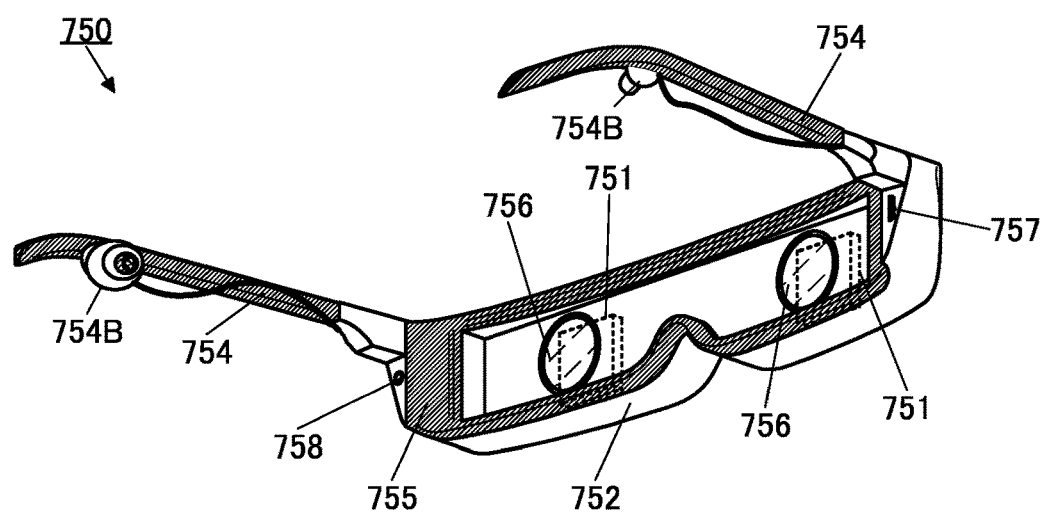

FIGS. 12A to 12C are perspective views of an electronic device 750. The perspective views in FIGS. 12B and 12C each illustrate the structure inside a housing 752.

The electronic device 750 includes a pair of display devices 751, the housing 752, a pair of temples 754, a cushion 755, a pair of lenses 756, and the like. The pair of display devices 751 are positioned inside the housing 752 to be viewed through the lenses 756. Although not shown, in the housing 752 of the electronic device 750 in FIGS. 12A to 12C are provided the optical system 151, the motion detection portion 153, the audio 154, the camera 155, the control portion 156, the communication portion 157, and the battery 158 which are described in Embodiment 1. The optical system 151 is preferably positioned between the lens 756 and the display device 751. The pair of display devices 751 are infrared light source-integrated display devices and can correspond to, for example, the display device 100 shown in FIGS. 6A, 6B1, and 6B2 or the like.

The electronic device 750 is a VR electronic device. The user wearing the electronic device 750 can view an image displayed on the display device 751 through the lens 756. Furthermore, when the pair of display devices 751 display different images, three-dimensional display using parallax can be performed.

An input terminal 757 and an output terminal 758 are provided on the back side of the housing 752. To the input terminal 757, a cable for supplying a video signal from a video output device or the like, power for charging the battery provided in the housing 752, or the like can be connected. The output terminal 758 can function as, for example, an audio output terminal to which earphones, headphones, or the like can be connected.

In addition, the housing 752 preferably includes a mechanism (referred to as a position adjustment mechanism) by which the lateral positions of the lenses 756 and the display devices 751 can be adjusted to the optimal positions in accordance with the positions of the user's eyes. In addition, the housing 752 preferably includes a mechanism for adjusting focus by changing the distance between the lenses 756 and the display devices 751.

The display device of one embodiment of the present invention can be used for the display device 751. Thus, the electronic device 750 capable of extremely high-resolution display can be provided. As a result, the user can experience a high sense of immersion.

The cushion 755 is to be in contact with the user's face (forehead, cheek, or the like). When the cushion 755 is in close contact with the user's face, light leakage can be prevented, which increases the sense of immersion. A soft material is preferably used for the cushion 755 so that the cushion 755 is in close contact with the face of the user wearing the electronic device 750. For example, a material such as rubber, silicone rubber, urethane, or sponge can be used. Furthermore, when a sponge or the like whose surface is covered with cloth, leather (natural leather or synthetic leather), or the like is used, a gap is unlikely to be generated between the user's face and the cushion 755, whereby light leakage can be suitably prevented. Furthermore, using such a material is preferable because it provides a soft texture and the user does not feel cold when wearing the electronic device in a cold season, for example. The member to be in contact with the user's skin, such as the cushion 755 or the temple 754, is preferably detachable, in which case cleaning or replacement can be easily performed.

The electronic device in this embodiment may include earphones 754A shown in FIG. 12B. The earphones 754A include a communication portion (not shown) and has a wireless communication function. The earphones 754A can output audio data with the wireless communication function. The earphones 754A may include a vibration mechanism to function as bone-conduction earphones.

The earphones 754A can be directly connected to or connected with wire to the temple 754 like earphones 754B illustrated in FIG. 12C. The earphones 754B and the temple 754 may each have a magnet. This is preferred because the earphones 754B can be fixed to the temple 754 with magnetic force and thus can be easily housed.

Figure 13A:
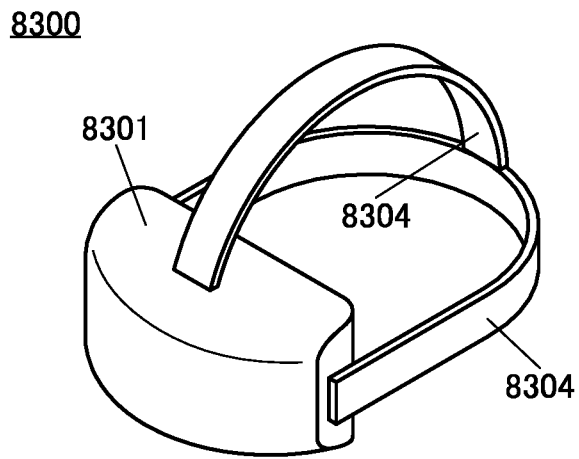
FIGS. 13A to 13E show structure examples of electronic devices.
Figure 13B:
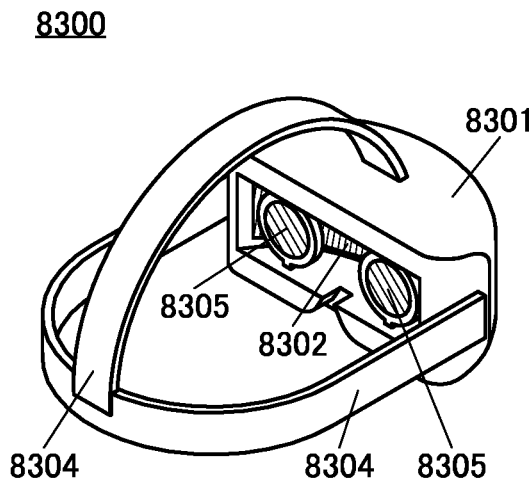
Figure 13C:
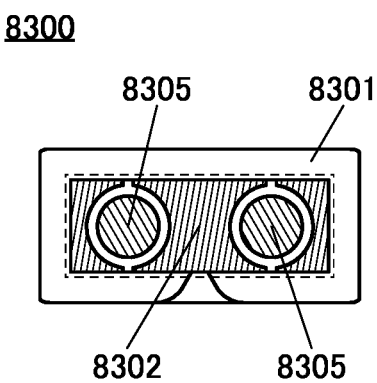

FIGS. 13A to 13C are external views of an electronic device 8300. FIG. 13A is a perspective view of the front side of the electronic device 8300, FIG. 13B is a perspective view of the back side of the electronic device 8300, and FIG. 13C illustrates the inside of a housing 8301 of the electronic device 8300. The electronic device 8300 includes the housing 8301, a display device 8302, a band-like fixing member 8304, and a pair of lenses 8305.

The user can view an image on the display device 8302 through the lenses 8305. The display device 8302 is preferably curved to enable the user to feel high realistic sensation. When another image displayed in another region of the display device 8302 is viewed through the lenses 8305, three-dimensional display using parallax or the like can be performed. Note that the number of the display devices 8302 is not limited to one; two display devices 8302 may be provided so that one display device is provided for one eye of the user.

The display device of one embodiment of the present invention can be used for the display device 8302. The display device of one embodiment of the present invention can have extremely high resolution. For example, a pixel is not easily seen by the user even when the user views display that is magnified by the use of the lenses 8305 as illustrated in FIG. 13C. In other words, a very realistic video can be seen by the user with use of the display device 8302. The optical system 151 is preferably positioned between the lens 8305 and the display device 8302. The display device 8302 is an infrared light source-integrated display device and can correspond to, for example, the display device 100 shown in FIGS. 6A, 6B1, and 6B2 or the like.

Figure 13D:
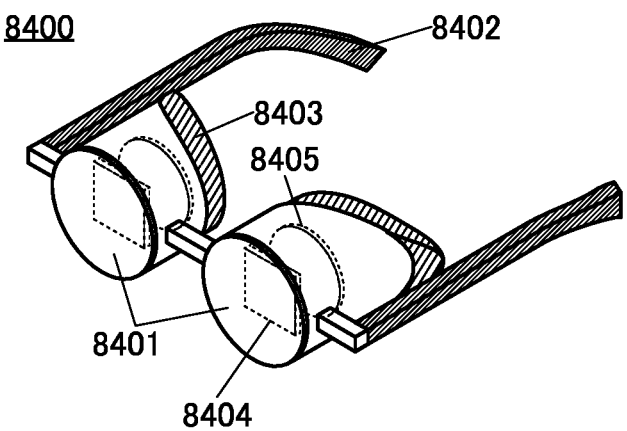

FIG. 13D is a perspective external view of the front side of an electronic device 8400. The electronic device 8400 includes a pair of housings 8401, a temple 8402, and a cushion 8403. A display device 8404 and a lens 8405 are provided in each of the pair of housings 8401. When the pair of display devices 8404 display different images, three-dimensional display using parallax can be performed.

The user can view an image on the display device 8404 through the lens 8405. The lens 8405 has a focus adjustment mechanism and can adjust the position depending on the user. The display device 8404 preferably has a square shape or a horizontal rectangle shape. This can improve a realistic sensation. The optical system 151 is preferably positioned between the lens 8405 and the display device 8404. The pair of display devices 8404 are infrared light source-integrated display devices and can correspond to, for example, the display device 100 shown in FIGS. 6A, 6B1, and 6B2 or the like.

The temple 8402 preferably has flexibility and elasticity so as to be adjusted to fit the size of the user's face and not to slide down. In addition, part of the temple 8402 preferably has a vibration mechanism to function as a bone conduction earphone. In this case, audio devices such as an earphone and a speaker are not necessarily provided separately, and the user can enjoy videos and sounds only by wearing the electronic device 8400. Note that the housing 8401 may have a function of outputting sound data by wireless communication.

The description of the cushion 755 can be referred to for the temple 8402 and the cushion 8403.

Figure 13E:
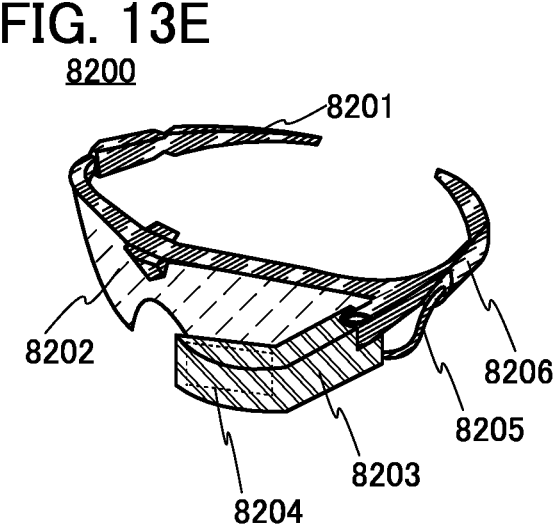

FIG. 13E is a perspective external view of the front side of an electronic device 8200.

The electronic device 8200 includes a temple 8201, a lens 8202, a main body 8203, a display device 8204, a cable 8205, and the like. The temple 8201 includes a battery 8206.

Power is supplied from the battery 8206 to the main body 8203 through the cable 8205. The main body 8203 includes a wireless receiver or the like to receive video data and display it on the display device 8204. The main body 8203 includes a camera, and information on the motion of the eyeballs or the eyelids of the user can be used as an input means.

In addition, a plurality of electrodes may be provided in the temple 8201 in the position where the temple 8201 is to touch the user, to enable a function of monitoring the user's pulse with the use of a current flowing through the electrodes. The temple 8201 may include various sensors such as a temperature sensor, a pressure sensor, and an acceleration sensor so that the user's biological information can be displayed on the display device 8204 and a video displayed on the display device 8204 can be changed in accordance with the motion of the user's head, for example. The optical system 151 is preferably positioned between the lens 8202 and the display device 8204. The display device 8204 is an infrared light source-integrated display device and can have, for example, any of the structures of the display device 100 shown in FIGS. 6A, 6B1, and 6B2 and the like.

Figure 14A:
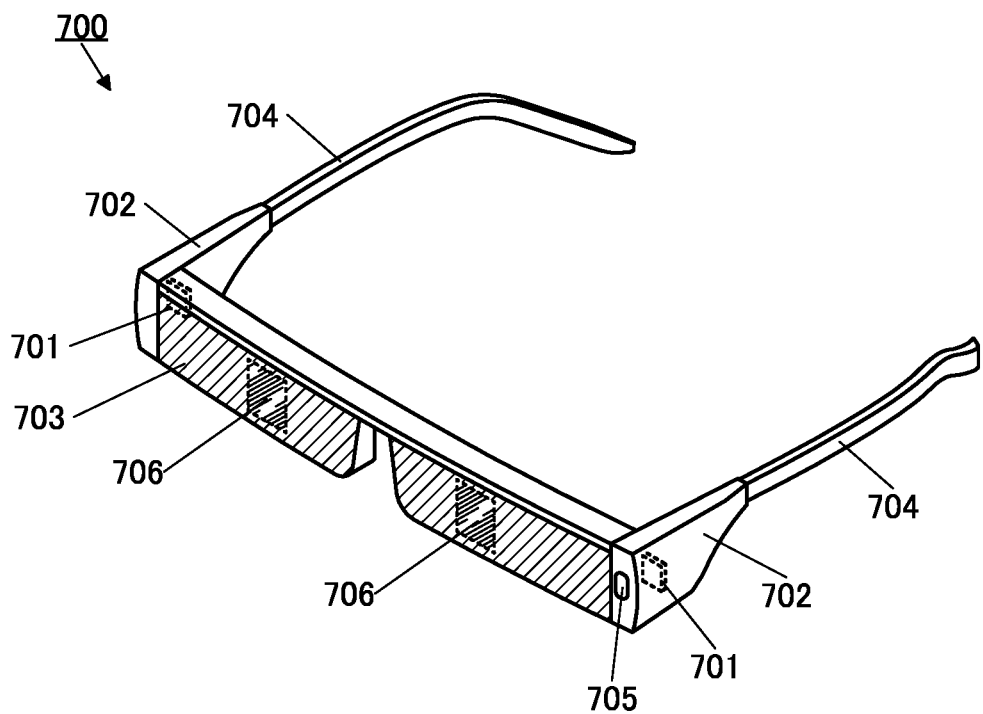
FIGS. 14A and 14B show a structure example of an electronic device.

FIG. 14A is a perspective external view of the front side of an electronic device 700. The electronic device 700 includes a pair of display devices 701, a pair of housings 702, a pair of optical members 703, a pair of temples 704, and the like.

The electronic device 700 can project an image displayed on the display device 701 onto a display region 706 of the optical member 703. Since the optical members 703 have a light-transmitting property, the user can see images displayed on the display regions 706, which are superimposed on transmission images viewed through the optical members 703. Thus, the electronic device 700 is an electronic device capable of AR display.

One of the pair of housings 702 includes a camera 705 capable of taking an image of what lies in front thereof. Although not shown, the pair of housings 702 can be provided with a wireless receiver or a connector to which a cable can be connected. Furthermore, when the pair of housings 702 are provided with an acceleration sensor such as a gyroscope sensor, the orientation of the user's head can be sensed and an image corresponding to the orientation can be displayed on the display region 706. Moreover, the housing 702 is preferably provided with a battery, in which case charging can be performed with or without a wire.

Next, a method for projecting an image on the display region 706 of the electronic device 700 is described with reference to FIG. 14B. The display device 701, a lens 711, and a mirror 712 are provided in the housing 702. A reflective surface 713 functioning as a half mirror is provided in a portion of the optical member 703 which corresponds to the display region 706.

Light 715 emitted from the display device 701 passes through the lens 711 and is reflected by the mirror 712 to the optical member 703 side. In the optical member 703, the light 715 is fully reflected repetitively by end surfaces of the optical member 703 and reaches the reflective surface 713, whereby an image is projected on the reflective surface 713. Accordingly, the user can view both the light 715 reflected by the reflective surface 713 and transmitted light 716 that passes through the optical member 703 (including the reflective surface 713).

As the display device 701, a display device that does not include the light-emitting element (IR) can be used. In that case, the electronic device 700 includes an infrared light source. The infrared light source is preferably provided inside or outside the housing 702, for example.

Figure 14B:
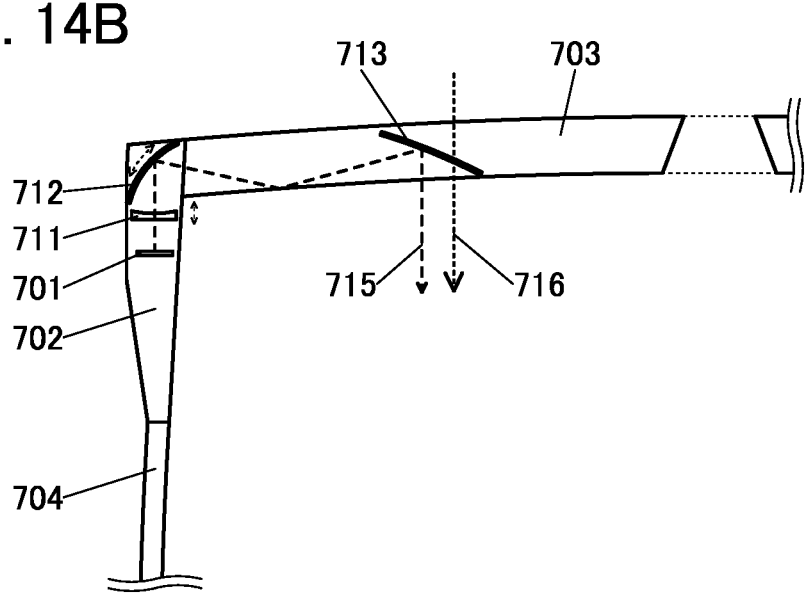

FIG. 14B shows an example in which the mirror 712 and the reflective surface 713 each have a curved surface. This can increase optical design flexibility and reduce the thickness of the optical member 703, compared to the case where they have flat surfaces. Note that the mirror 712 and the reflective surface 713 may be flat.

The mirror 712 can be a component having a mirror surface, and preferably has high reflectivity. As the reflective surface 713, a half mirror utilizing reflection of a metal film may be used, but the use of a prism utilizing total reflection or the like can increase the transmittance of the transmitted light 716.

Here, the housing 702 preferably includes a mechanism for adjusting the distance or angle between the lens 711 and the display device 701. This enables focus adjustment and zooming in/out of images, for example. One or both of the lens 711 and the display device 701 can be configured to be movable in the optical-axis direction, for example.

The housing 702 preferably includes a mechanism capable of adjusting the angle of the mirror 712. The position of the display region 706 where images are displayed can be changed by changing the angle of the mirror 712. Thus, the display region 706 can be placed at the optimal position in accordance with the position of the user's eye.

The display device of one embodiment of the present invention can be used for the display device 701. Thus, the electronic device 700 capable of extremely high-resolution display can be provided.

Note that the display device of one embodiment of the present invention may be used for a display portion of an electronic device having a display function or the like, besides the above-described electronic devices. Examples of such an electronic device include a digital camera, a digital video camera, a digital photo frame, a mobile phone, a portable game machine, a portable information terminal such as a smartphone or a tablet, and an audio reproducing device, in addition to electronic devices with a relatively large screen, such as a television device, a laptop personal computer, a monitor device, digital signage, a pachinko machine, and a game machine.

Specifically, an electronic device such as a portable game machine or a smartphone can be sometimes used as, for example, a VR device when a housing to which the electronic device is attached is worn on the head with the use of a band-like fixing portion, a mounting portion, or the like. Therefore, a display portion of the electronic device may include the display device of one embodiment of the present invention.

The display device of one embodiment of the present invention can have high resolution, and thus may be used for an electronic device having a relatively small display portion. Examples of such an electronic device include watch-type and bracelet-type information terminals (wearable devices).

The resolution of the display device of one embodiment of the present invention is preferably as high as HD (number of pixels: 1280×720), FHD (number of pixels: 1920×1080), WQHD (number of pixels: 2560×1440), WQXGA (number of pixels: 2560×1600), 4K2K (number of pixels: 3840×2160), or 8K4K (number of pixels: 7680×4320). In particular, resolution of 4K2K, 8K4K, or higher is preferable. Furthermore, the pixel density (resolution) of the display device of one embodiment of the present invention is preferably higher than or equal to 300 ppi, further preferably higher than or equal to 500 ppi, still further preferably higher than or equal to 1000 ppi, still further preferably higher than or equal to 2000 ppi, still further preferably higher than or equal to 3000 ppi, still further preferably higher than or equal to 5000 ppi, and yet further preferably higher than or equal to 7000 ppi. By including such a display device with high resolution or high definition, an electronic device can provide higher realistic sensation, sense of depth, and the like in personal use such as portable use and home use.

The electronic device in this embodiment may include an antenna. With the antenna receiving a signal, the electronic device can display an image, information, and the like on a display portion. When the electronic device includes the antenna and a secondary battery, the antenna may be used for contactless power transmission.

The electronic device in this embodiment may include a sensor (a sensor having a function of sensing, detecting, or measuring force, displacement, position, speed, acceleration, angular velocity, rotational frequency, distance, light, liquid, magnetism, temperature, a chemical substance, sound, time, hardness, electric field, current, voltage, electric power, radiation, flow rate, humidity, gradient, oscillation, a smell, or infrared rays).

The electronic device in this embodiment can have a variety of functions. For example, the electronic device can have a function of displaying a variety of information (a still image, a moving image, a text image, and the like) on the display portion, a touch panel function, a function of displaying a calendar, date, time, and the like, a function of executing a variety of software (programs), a wireless communication function, and a function of reading out a program or data stored in a recording medium.

At least part of any of the structure examples, the drawings corresponding thereto, and the like described in this embodiment can be combined with any of the other structure examples, the other drawings corresponding thereto, and the like as appropriate.

Embodiment 3

An arithmetic circuit of one embodiment of the present invention is described. The arithmetic circuit can be used as an arithmetic circuit having a function of performing a product-sum operation, for example. Note that an arithmetic circuit having a function of performing a product-sum operation can be rephrased as an arithmetic circuit of a neural network.

Configuration Example 1 of Arithmetic Circuit

First, configuration examples of an arithmetic circuit of one embodiment of the present invention are described. The arithmetic circuit can be used for the image processing portion 121 described in the above embodiment.

Figure 15:
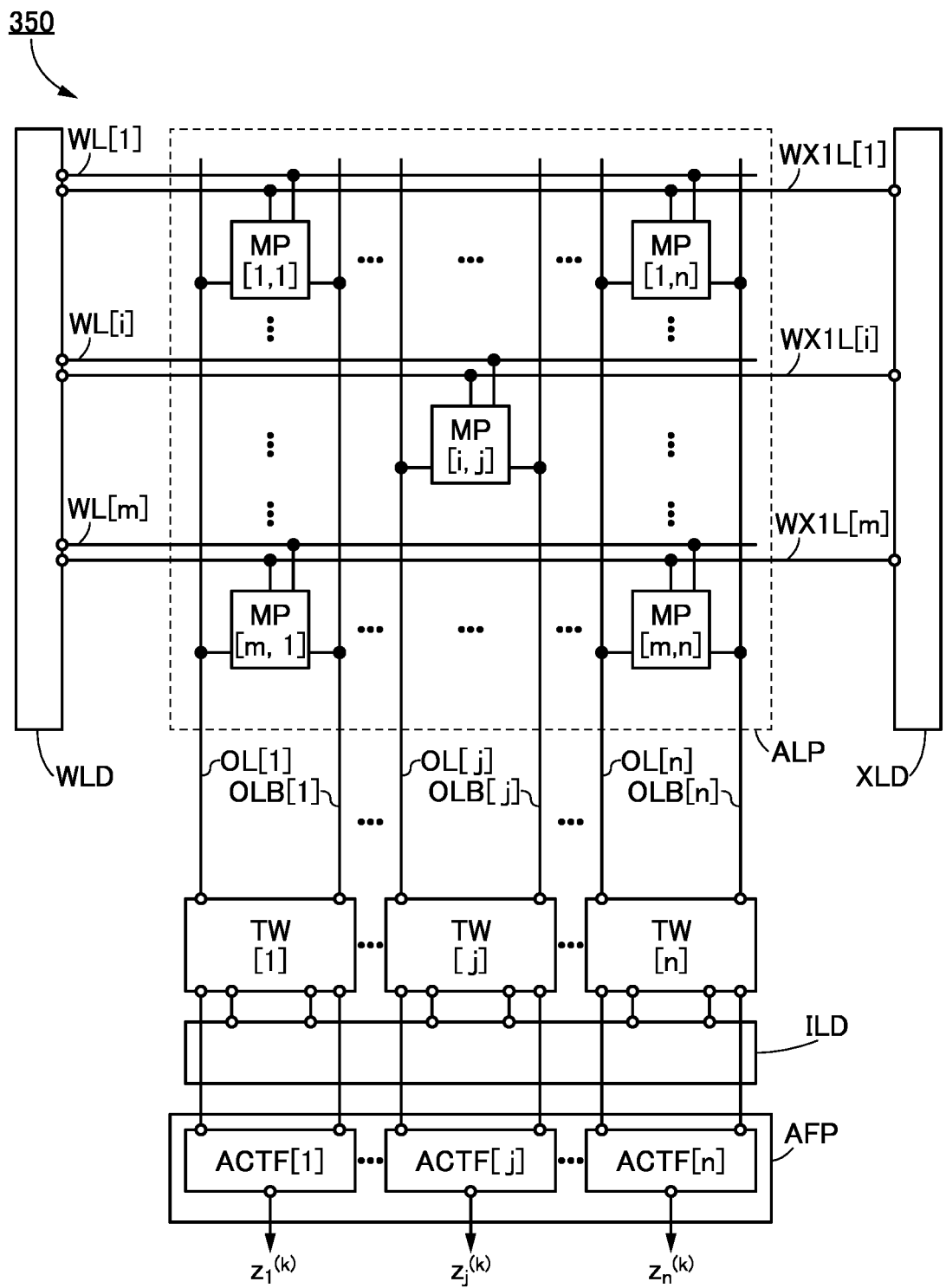
FIG. 15 shows a configuration example of an arithmetic circuit of a neural network.

An arithmetic circuit 350 in FIG. 15 includes an array portion ALP, a circuit ILD, a circuit WLD, a circuit XLD, a circuit AFP, and circuits TW[1] to TW[n], for example.

The circuit ILD and the circuit AFP are electrically connected to wirings OL[1] to OL[n] and wirings OLB[1] to OLB[n] through the circuits TW[1] to TW[n].

The circuits TW[1] to TW[n] function as switching circuits. In the circuits TW[1] to TW[n], switching between inputting output signals of the wirings OL[1] to OL[n] and the wirings OLB[1] to OLB[n] to the circuit AFP and inputting output signals of the circuit ILD to the wirings OL[1] to OL[n] and the wirings OLB[1] to OLB [n] can be performed.

The circuit WLD is electrically connected to wirings WL[1] to WL[m] and wirings WX1L[1] to WX1L[m]. The circuit XLD is electrically connected to the wirings WX1L[1] to WX1L[m].

The arithmetic circuit 350 in FIG. 15 includes the array portion ALP in which circuits MP are arranged in a matrix of m×n. In FIG. 15, a circuit MP[i, j] represents the circuit MP in the i-th row and the j-th column (here, i is an integer greater than or equal to 1 and less than or equal to m, and j is an integer greater than or equal to 1 and less than or equal to n). Note that FIG. 15 illustrates only circuits MP[1, 1], MP[1, n], MP[i, j], MP[m, 1], and MP[m, n] and does not illustrate the other circuits MP.

The circuit MP[i, j] is electrically connected to the wiring WL[i], the wiring WX1L[i], the wiring OL[j], and the wiring OLB[j].

The circuit MP[i,j] has a function of retaining a weight coefficient (also referred to as first data), for example. The weight coefficient is also referred to as a weighted value.

Specifically, the circuit MP[i, j] retains information corresponding to a weight coefficient input from the wiring OL[j] and the wiring OLB[j].

The circuit ILD has a function of outputting information corresponding to the first data, which is a weight coefficient, to the wirings OL[1] to OL[n] and the wirings OLB[1] to OLB[n].

As the information corresponding to a weight coefficient, for example, a potential, a resistance, or a current value can be used. In the case where a current value is used as information corresponding to a weight coefficient, a current to be input can be generated using a current output digital-to-analog converter (IDAC).

The circuit MP[i, j] has a function of outputting the product of an input value input from the wiring WX1L[i] (also referred to as second data) and a weight coefficient (first data). For a specific example, the circuit MP[i, j] outputs a current corresponding to the product of the first data and the second data to the wiring OL[j] and the wiring OLB[j] when the second data is input to the circuit MP[i, j] from the wiring WX1L[i]. Note that although FIG. 15 illustrates the example in which the wiring OL[j] and the wiring OLB[j] are provided, one embodiment of the present invention is not limited thereto. Only one of the wiring OL[j] and the wiring OLB[j] may be provided.

The circuit XLD has a function of supplying the second data, which is an input value, to the wirings WX1L[1] to WX1L[m].

Information corresponding to the input value can be, for example, a potential, a current value, or the like. In the case where a current value is used as information corresponding to an input value, a current to be input can be generated using a current output digital-to-analog converter.

Currents corresponding to the products of the first data and the second data output from the circuits MP[1, j] to MP[m, j] are added and the sum of the currents is output to the wiring OL[j] and the wiring OLB[j]. In this manner, the arithmetic circuit can perform a product-sum operation with the weight coefficients and the input values.

The circuit XLD and the circuit WLD each have a function of selecting the circuit MP to which information corresponding to the first data input from the circuit ILD is to be written. In the case where information is written to the circuits MP[i, 1] to MP[i, n] positioned in the i-th row of the array portion ALP, the circuit XLD supplies, to the wiring WX1L[i], a potential (also referred to as signal) for turning on or off first writing switching elements included in the circuits MP[i, 1] to MP[i, n], and supplies, to the other wirings WX1L, a potential for turning off first writing switching elements included in the circuits MP in rows other than the i-th row, for example. In addition, the circuit WLD supplies, to the wiring WL[i], a potential for turning on or off second writing switching elements included in the circuits MP[i, 1] to MP[i, n], and supplies, to the other wirings WL, a potential for turning off second writing switching elements included in the circuits MP in rows other than the i-th row, for example.

The circuit AFP includes circuits ACTF[1] to ACTF[n]. The circuit ACTF[j] is electrically connected to the wiring OL[j] and the wiring OLB[j] through the circuit TW[j] having a switching function. The circuit ACTF[j] can generate a signal that corresponds to information (e.g., a potential or a current value) corresponding to the results of product-sum operations input from the wiring OL[j] and the wiring OLB[j], and can output the signal as $z_j^{(k)}$. The circuit AFP can compare information (e.g., a potential or a current value) corresponding to the results of product-sum operations that are input from the wirings OL[1] to OL[n] and the wirings OLB[1] to OLB[n], generate signals corresponding to the comparison results, and output the signals as $z_1^{(k)}$ to $z_n^{(k)}$.

<Circuit MP>

Figure 16:
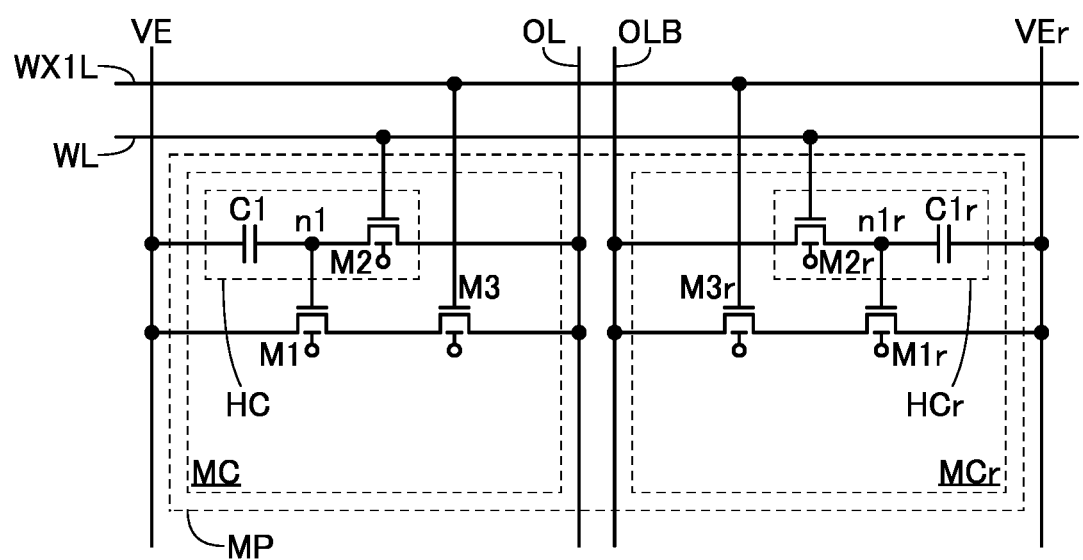
FIG. 16 shows a configuration example of an arithmetic circuit of a neural network.

Next, the circuit MP is described. FIG. 16 illustrates a circuit configuration example that can be used for the circuit MP[i, j]. The circuit MP includes a circuit MC and a circuit MCr. The circuit MC includes a transistor M1, a transistor M2, and a transistor M3, and a capacitor C1. For example, a retaining portion HC includes the transistor M2 and the capacitor C1.

In the circuit MP in FIG. 16, the circuit MCr has substantially the same circuit configuration as the circuit MC. Thus, "r" is added to the reference numerals of the circuit elements and the like included in the circuit MCr to differentiate them from the circuit elements and the like included in the circuit MC.

The transistors M1 to M3 illustrated in FIG. 16 are each an n-channel transistor having a multi-gate structure including gates over and under a channel, and the transistors M1 to M3 each include a first gate and a second gate.

The transistors that are included in the arithmetic circuit 350 described in this embodiment may have the aforementioned multi-gate structure or another structure (e.g., a single-gate structure). In FIG. 16, the back gates of the transistors M1 to M3 are illustrated. The connection structures of the back gates are not illustrated, and the destinations to which the back gates are electrically connected can be determined at the design stage. For example, in a transistor including a back gate, a gate and the back gate may be electrically connected to each other to increase the on-state current of the transistor. In other words, the gate and the back gate of the transistor M2 may be electrically connected to each other, for example. Alternatively, for example, in a transistor including a back gate, a wiring electrically connected to an external circuit or the like may be provided and a potential may be supplied to the back gate of the transistor with the external circuit or the like to change the threshold voltage of the transistor or to reduce the off-state current of the transistor. Note that the same applies to a transistor described in other parts of the specification and a transistor illustrated in other drawings, not only to that in FIG. 16.

The transistors that are included in the semiconductor device of one embodiment of the present invention may have a multi-gate structure or a single-gate structure. It is also possible that some transistors include back gates and the other transistors do not include back gates. Note that the same applies to a transistor described in other parts of the specification and a transistor illustrated in other drawings, not only to that in the circuit diagram shown in FIG. 16.

In this specification and the like, transistors with a variety of structures can be used as a transistor. There is no limitation on the type of transistors. For example, a transistor including single crystal silicon or a non-single-crystal semiconductor film typified by amorphous silicon, polycrystalline silicon, microcrystalline (also referred to as microcrystal, nanocrystal, or semi-amorphous) silicon, or the like can be used as a transistor. Alternatively, a thin film transistor (TFT) whose semiconductor film is thinned or the like can be used. There are various advantages of using TFTs. For example, since the TFT can be formed at a temperature lower than that of the case of using single crystal silicon, manufacturing cost can be reduced or a manufacturing apparatus can be made larger.

As a transistor, for example, a transistor including a compound semiconductor (e.g., SiGe or GaAs), a metal oxide with semiconductor characteristics (also referred to as an oxide semiconductor), or the like can be used. Note that a transistor including an oxide semiconductor in a channel formation region is sometimes referred to as an OS transistor. Alternatively, a thin film transistor obtained by thinning any of the compound semiconductors or the oxide semiconductors can be used. Such a compound semiconductor or an oxide semiconductor can be used for not only a channel portion of the transistor but also other applications. For example, such a compound semiconductor or an oxide semiconductor can be used for a wiring, a resistor, a pixel electrode, a light-transmitting electrode, or the like. Such an element can be formed at the same time as the transistor; thus, cost can be reduced.

Examples of the above oxide semiconductor include an oxide containing at least one of indium, an element M, and zinc. The element M can be, for example, one or more elements selected from aluminum, gallium, yttrium, copper, vanadium, beryllium, boron, titanium, iron, nickel, germanium, zirconium, molybdenum, lanthanum, cerium, neodymium, hafnium, tantalum, tungsten, magnesium, and the like.

Note that for example, a transistor or the like formed by an inkjet method or a printing method can be used as a transistor. Accordingly, such a transistor can be formed at room temperature or at a low vacuum, or can be formed using a large substrate. Therefore, the transistor can be formed without use of a mask (reticle), so that the layout of the transistor can be easily changed. Alternatively, since the transistor can be formed without using a resist, the material cost is reduced, and the number of steps can be reduced. Furthermore, since a film can be formed where needed, a material is not wasted compared to a manufacturing method by which etching is performed after the film is formed over the entire surface; thus, the cost can be reduced.

Note that a transistor including an organic semiconductor or a carbon nanotube can be used as the transistor, for example. Such a transistor can be formed using a flexible substrate. A device including a transistor which includes an organic semiconductor or a carbon nanotube can be shock-resistant.

In the circuit MP in FIG. 16, a first terminal of the transistor M1 is electrically connected to a wiring VE. A second terminal of the transistor M1 is electrically connected to a first terminal of the transistor M3. A gate of the transistor M1 is electrically connected to a first terminal of the capacitor C1 and a first terminal of the transistor M2. A second terminal of the capacitor C1 is electrically connected to the wiring VE. A second terminal of the transistor M2 is electrically connected to the wiring OL. A gate of the transistor M2 is electrically connected to the wiring WL. A second terminal of the transistor M3 is electrically connected to the wiring OL and a gate of the transistor M3 is electrically connected to the wiring WX1L.

The connection structure of the circuit MCr different from that of the circuit MC will be described. A second terminal of a transistor M3r is electrically connected to not the wiring OL but the wiring OLB. A first terminal of a transistor M1r and a terminal of a capacitor C1r are electrically connected to a wiring VEr.

Note that in the retaining portion HC illustrated in FIG. 16, an electrical connection point of the gate of the transistor M1, the first terminal of the capacitor C1, and the first terminal of the transistor M2 is a node n1.

The retaining portion HC has a function of retaining a potential corresponding to a weight coefficient (first data). The potential can be retained in the retention portion HC included in the circuit MC in FIG. 16 in the following manner: when the transistor M2 and the transistor M3 are turned on, a current with a predetermined value is input from the wiring OL to the capacitor C1 so that a potential corresponding to the current value is written thereto, and then the transistor M2 is turned off. Thus, the potential of the node n1 can be retained as the potential corresponding to the weight coefficient (first data). At this time, a current is input from the wiring OL and a potential having a level corresponding to the amount of the current can be retained in the capacitor C1. Therefore, the input of the first data is less likely to be adversely affected by variations in current characteristics (e.g., threshold voltage) of the transistor M1.

The current input to the wiring OL can be input and generated using a current output digital-to-analog converter.

As the transistor M2, a transistor with a low off-state current is preferably used for long-term retention of the potential of the node n1. As the transistor with a low off-state current, an OS transistor can be used, for example. Since an OS transistor includes an oxide semiconductor with a wide band gap in a channel formation region, the OS transistor can have a reduced off-state current.

Alternatively, a transistor including a back gate may be used as the transistor M2, and an off-state current may be reduced by applying a low-level potential to the back gate to shift the threshold voltage to the positive side.

Thus, an arithmetic circuit with high arithmetic operation accuracy is provided. Furthermore, an arithmetic circuit with high reliability is provided.

Configuration Example 2 of Arithmetic Circuit

An arithmetic circuit MAC1 that performs a product-sum operation is described as another example. The arithmetic circuit MAC1 can be used for the image processing portion 121 described in the above embodiment.

Figure 17:
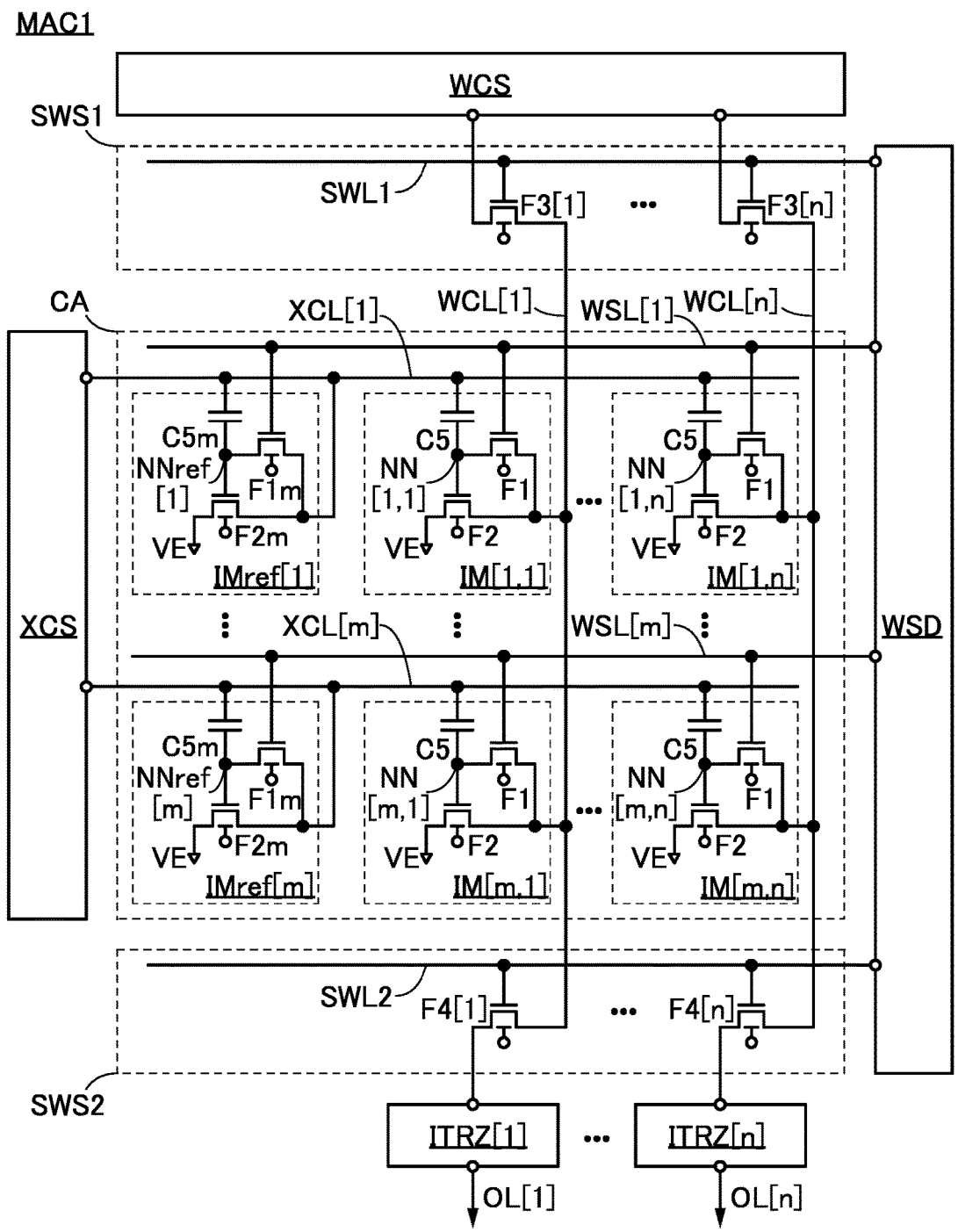
FIG. 17 shows a configuration example of an arithmetic circuit of a neural network.

FIG. 17 shows a configuration example of an arithmetic circuit which performs a product-sum operation of positive or "0" first data and positive or "0" second data. The arithmetic circuit MAC1 illustrated in FIG. 17 is a circuit that performs a product-sum operation of the first data corresponding to a potential retained in each cell and the input second data, and performs an arithmetic operation of an activation function using the result of the product-sum operation. Note that the first data and the second data can be analog data or multilevel data (discrete data), for example.

This arithmetic circuit, which also functions as a memory for retaining the first data, can be referred to as a memory. In particular, in the case where analog data is used as the first data, the arithmetic circuit can be referred to as an analog memory.

The arithmetic circuit MAC1 includes a circuit WCS, a circuit XCS, a circuit WSD, a circuit SWS1, a circuit SWS2, a cell array CA, and converter circuits ITRZ[1] to ITRZ[n].

The cell array CA includes cells IM[1, 1] to IM[m, n] (here, m is an integer greater than or equal to 1 and n is an integer greater than or equal to 1) and cells IMref[1] to IMref[m]. The cells IM[1, 1] to IM[m, n] have a function of retaining a potential corresponding to the current amount corresponding to the first data, and the cells IMref[1] to IMref[m] have a function of supplying the retained potential and a potential corresponding to the second data required for performing a product-sum operation to wirings XCL[1] to XCL[m], respectively.

Although cells are arranged in a matrix of n+1 rows and m columns in the cell array CA in FIG. 17, cells may be arranged in a matrix of two or more rows and one or more columns in the cell array CA.

The cells IM[1, 1] to IM[m, n] each include a transistor F1, a transistor F2, and a capacitor C5, and the cells IMref[1] to IMref[m] each include a transistor F1$m$, a transistor F2$m$, and a capacitor C5$m$, for example.

In particular, the sizes of the transistors F1 (e.g., channel length, channel width, and transistor structure) included in the cells IM[1, 1] to IM[m, n] are preferably equal to each other, and the sizes of the transistors F2 included in the cells IM[1, 1] to IM[m, n] are preferably equal to each other. The sizes of the transistors F1$m$ included in the cells IMref[1] to IMref[m] are preferably equal to each other, and the sizes of the transistors F2$m$ included in the cells IMref[1] to IMref[m] are preferably equal to each other. The size of the transistor F1 is preferably equal to that of the transistor F1$m$, and the size of the transistor F2 is preferably equal to that of the transistor F2$m$.

Unless otherwise specified, the transistor F1 and the transistor F1$m$ in an on state may operate in a linear region in the end. In other words, the gate voltage, the source voltage, and the drain voltage of each of the transistors may be biased appropriately so that the transistors operate in the linear region. Note that one embodiment of the present invention is not limited thereto. For example, the transistor F1 and the transistor F1$m$ in an on state may operate in a saturation region or may operate both in a linear region and a saturation region.

Unless otherwise specified, the transistor F2 and the transistor F2$m$ may operate in a subthreshold region (i.e., a voltage between a gate and a source of the transistor F2 or the transistor F2$m$ may be lower than the threshold voltage, preferably a drain voltage exponentially increases with respect to the voltage between the gate and the source). In other words, the gate voltage, the source voltage, and the drain voltage of each of the transistors may be biased appropriately so that the transistors operate in the subthreshold region. Thus, the transistor F2 and the transistor F2$m$ may operate such that an off-state current flows between the source and a drain.

The transistor F1 and/or the transistor F1$m$ are/is preferably an OS transistor(s), for example. With the use of an OS transistor as the transistor F1 and/or the transistor F1$m$, the leakage current of the transistor F1 and/or the transistor F1$m$ can be suppressed, so that the power consumption of the arithmetic circuit can be reduced. Specifically, in the case where the transistor F1 and/or the transistor F1$m$ are/is in an off state, the amount of a leakage current from a retention node to a write word line can be extremely small; thus, the frequency of refresh operations for the potential at the retention node can be reduced, leading to a reduction in power consumption of the arithmetic circuit. By making a leakage current from the retention node to the write word line extremely low, cells can retain the potential of the retention node for a long time, so that the arithmetic operation accuracy of the arithmetic circuit can be increased.

The use of an OS transistor also as the transistor F2 and/or the transistor F2$m$ enables an operation with a wide range of a current in the subthreshold region, leading to a reduction in the current consumption. The use of an OS transistor also as the transistor F2 and/or the transistor F2$m$ allows the transistor F2 and/or the transistor F2$m$ to be formed concurrently with the transistor F1 and the transistor F1$m$, leading to a reduction in the number of manufacturing steps for the arithmetic circuit, in some cases. The transistor F2 and/or the transistor F2$m$ can be, other than an OS transistor(s), a transistor(s) including silicon in its channel formation region (hereinafter referred to as S1 transistor). As the silicon, amorphous silicon (referred to as hydrogenated amorphous silicon in some cases), microcrystalline silicon, polycrystalline silicon, single crystal silicon, or the like can be used, for example.

When an arithmetic circuit or the like is highly integrated into a chip or the like, the chip may have heat when the circuit operates. This heat makes the temperature of a transistor rise to change the characteristics of the transistor and the field-effect mobility thereof might change or the operation frequency thereof might decrease. Since an OS transistor has a higher heat resistance than a S1 transistor, a change in the field-effect mobility and a decrease in the operation frequency due to a change in temperature are less likely to be caused. Even when an OS transistor has a high temperature, it is likely to keep a property of the drain current increasing exponentially with respect to a gate-source voltage. Thus, with the use of an OS transistor, even in a high temperature environment, a product-sum operation described later can be easily performed. To fabricate an arithmetic circuit highly resistant to heat generated by its operation, an OS transistor is preferably used as its transistor.

In each of the cells IM[1, 1] to IM[m, n], a first terminal of the transistor F1 is electrically connected to the gate of the transistor F2. A first terminal of the transistor F2 is electrically connected to the wiring VE. A first terminal of the capacitor C5 is electrically connected to the gate of the transistor F2.

In each of the cells IMref[1] to IMref[m], a first terminal of the transistor F1$m$ is electrically connected to a gate of the transistor F2$m$. A first terminal of the transistor F2$m$ is electrically connected to the wiring VE. A first terminal of the capacitor C5$m$ is electrically connected to the gate of the transistor F2$m$.

There is no particular limitation on the polarity of transistors included in the arithmetic circuit described in this embodiment. For example, the transistor F1 and the transistor F2 illustrated in FIG. 17 are n-channel transistors; however, some transistors or all transistors may be p-channel transistors.

The above-described examples of changes in the structure and the polarity of the transistor are not limited to the transistor F1 and the transistor F2. For example, the structures and the polarities of the transistor F1$m$ and the transistor F2$m$, transistors F3[1] to F3[$n$] and transistors F4[1] to F4[$n$] which will be described later, a transistor described in other parts of the specification, and a transistor illustrated in other drawings can be changed.

The wiring VE functions as a wiring for supplying a current between the first terminal and a second terminal of the transistor F2 of each of the cell IM[1, 1], the cell IM[m, 1], the cell IM[1, n], and the cell IM[m, n] and a wiring for supplying a current between the first terminal and the second terminal of the transistor F2 of each of the cell IMref[1] and the cell IMref[m]. The wiring VE functions as a wiring for supplying a constant voltage, for example. The constant voltage can be, for example, a low-level potential, a ground potential, or the like.

In the cell IM[1, 1], a second terminal of the transistor F1 is electrically connected to a wiring WCL[1], and a gate of the transistor F1 is electrically connected to a wiring WSL[1]. The second terminal of the transistor F2 is electrically connected to the wiring WCL[1], and a second terminal of the capacitor C5 is electrically connected to the wiring XCL[1]. In FIG. 17, in the cell IM[1, 1], a connection portion of the first terminal of the transistor F1, the gate of the transistor F2, and the first terminal of the capacitor C5 is a node NN[1, 1].

In the cell IM[m, 1], the second terminal of the transistor F1 is electrically connected to the wiring WCL[1], and the gate of the transistor F1 is electrically connected to a wiring WSL[m]. The second terminal of the transistor F2 is electrically connected to the wiring WCL[1], and the second terminal of the capacitor C5 is electrically connected to the wiring XCL[m]. In FIG. 17, in the cell IM[m, 1], a connection portion of the first terminal of the transistor F1, the gate of the transistor F2, and the first terminal of the capacitor C5 is a node NN[m, 1].

In the cell IM[1, n], the second terminal of the transistor F1 is electrically connected to a wiring WCL[n], and the gate of the transistor F1 is electrically connected to the wiring WSL[1]. The second terminal of the transistor F2 is electrically connected to the wiring WCL[n], and the second terminal of the capacitor C5 is electrically connected to the wiring XCL[1]. In FIG. 17, in the cell IM[1, n], a connection portion of the first terminal of the transistor F1, the gate of the transistor F2, and the first terminal of the capacitor C5 is a node NN[1, n].

In the cell IM[m, n], the second terminal of the transistor F1 is electrically connected to the wiring WCL[n], and the gate of the transistor F1 is electrically connected to the wiring WSL[m]. The second terminal of the transistor F2 is electrically connected to the wiring WCL[n], and the second terminal of the capacitor C5 is electrically connected to the wiring XCL[m]. In FIG. 17, in the cell IM[m, n], a connection portion of the first terminal of the transistor F1, the gate of the transistor F2, and the first terminal of the capacitor C5 is a node NN[m, n].

In the cell IMref[1], a second terminal of the transistor F1$m$ is electrically connected to the wiring XCL[1], and a gate of the transistor F1$m$ is electrically connected to the wiring WSL[1]. A second terminal of the transistor F2$m$ is electrically connected to the wiring XCL[1], and the second terminal of the capacitor C5 is electrically connected to the wiring XCL[1]. In FIG. 17, in the cell IMref[1], a connection portion of the first terminal of the transistor F1$m$, the gate of the transistor F2$m$, and the first terminal of the capacitor C5 is a node NNref[1].

In the cell IMref[m], the second terminal of the transistor F1$m$ is electrically connected to the wiring XCL[m], and the gate of the transistor F1$m$ is electrically connected to the wiring WSL[m]. The second terminal of the transistor F2$m$ is electrically connected to the wiring XCL[m], and the second terminal of the capacitor C5 is electrically connected to the wiring XCL[m]. In FIG. 17, in the cell IMref[m], a connection portion of the first terminal of the transistor F1$m$, the gate of the transistor F2$m$, and the first terminal of the capacitor C5 is a node NNref[m].

The node NN[1, 1], the node NN[m, 1], the node NN[1, n], the node NN[m, n], the node NNref[1], and the node NNref[m] described above function as retention nodes of the respective cells.

In the case where the transistor F1 is in an on state in the cells IM[1, 1] to IM[m, n], for example, the transistor F2 is a diode-connected transistor. When a constant voltage supplied by the wiring VE is a ground potential (GND), the transistor F1 is turned on, and a current with a current amount I flows from the wiring WCL to the second terminal of the transistor F2, the potential of the gate of the transistor F2 (node NN) depends on the current amount I. Since the transistor F1 is in an on state, the potential of the second terminal of the transistor F2 is ideally equal to that of the gate of the transistor F2 (node NN). By turning off the transistor F1, the potential of the gate of the transistor F2 (node NN) is retained. Accordingly, the transistor F2 can make a current with the current amount I, which is a current corresponding to the ground potential of the first terminal of the transistor F2 and the potential of the gate of the transistor F2 (node NN), flow between the source and the drain of the transistor F2. In this specification and the like, such an operation is expressed as "the transistor F2 is programmed such that the amount of current flowing between the source and the drain of the transistor F2 is I".

For example, the circuit SWS1 includes the transistors F3[1] to F3[n]. A first terminal of the transistor F3[1] is electrically connected to the wiring WCL[1], a second terminal of the transistor F3[1] is electrically connected to the circuit WCS, and a gate of the transistor F3[1] is electrically connected to a wiring SWL1. A first terminal of the transistor F3[n] is electrically connected to the wiring WCL[n], a second terminal of the transistor F3[n] is electrically connected to the circuit WCS, and a gate of the transistor F3[n] is electrically connected to the wiring SWL1.

Each of the transistors F3[1] to F3[n] is preferably, for example, an OS transistor which can be used as the transistor F1 and/or the transistor F2.

The circuit SWS1 functions as a circuit that establishes or breaks electrical continuity between the circuit WCS and each of the wirings WCL[1] to WCL[n].

For example, the circuit SWS2 includes the transistors F4[1] to F4[n]. A first terminal of the transistor F4[1] is electrically connected to the wiring WCL[1], a second terminal of the transistor F4[1] is electrically connected to an input terminal of the converter circuit ITRZ[1], and a gate of the transistor F4[1] is electrically connected to a wiring SWL2. A first terminal of the transistor F4[n] is electrically connected to the wiring WCL[n], a second terminal of the transistor F4[n] is electrically connected to an input terminal of the converter circuit ITRZ[n], and a gate of the transistor F4[n] is electrically connected to the wiring SWL2.

Each of the transistors F4[1] to F4[n] is preferably, for example, an OS transistor which can be used as the transistor F1 and/or the transistor F2.

The circuit SWS2 functions as a circuit that establishes or breaks electrical continuity between the wiring WCL[1] and the converter circuit ITRZ[1] and between the wiring WCL[n] and the converter circuit ITRZ[n].

The circuit WCS has a function of transmitting data that is to be stored in each cell of the cell array CA.

The circuit XCS is electrically connected to the wirings XCL[1] to XCL[m]. The circuit XCS has a function of supplying a current corresponding to reference data or a current corresponding to the second data to each of the cells IMref[1] to IMref[m] included in the cell array CA.

The circuit WSD is electrically connected to the wirings WSL[1] to WSL[m]. The circuit WSD has a function of selecting a row of the cell array CA to which the first data is written by supplying a predetermined signal to each of the wirings WSL[1] to WSL[m], when the first data is written to the cells IM[1, 1] to IM[m, n].

For example, the circuit WSD is electrically connected to the wiring SWL1 and the wiring SWL2. The circuit WSD has a function of establishing or breaking electrical continuity between the circuit WCS and the cell array CA by supplying a predetermined signal to the wiring SWL1 and a function of establishing or breaking electrical continuity between the cell array CA and each of the converter circuits ITRZ[1] to ITRZ[n] by supplying a predetermined signal to the wiring SWL2.

The converter circuits ITRZ[1] to ITRZ[n] each include the input terminal and an output terminal, for example. For example, the output terminal of the converter circuit ITRZ[1] is electrically connected to the wiring OL[1], and the output terminal of the converter circuit ITRZ[n] is electrically connected to the wiring OL[n].

The converter circuits ITRZ[1] to ITRZ[n] each have a function of converting a current input to the input terminal into a voltage in accordance with the amount of the current and outputting the voltage from the output terminal. Examples of the voltage include an analog voltage and a digital voltage. The converter circuits ITRZ[1] to ITRZ[n] may each include an arithmetic circuit of a function system. In that case, for example, the arithmetic circuit may perform an arithmetic operation of a function using the voltage obtained by the conversion and output the results of the arithmetic operation to the wirings OL[1] to OL[n].

Particularly in the case where an arithmetic operation of the hierarchical neural network is performed, a sigmoid function, a tan h function, a softmax function, a ReLU function, a threshold function, or the like can be used as the above-described function.

As the circuit WCS illustrated in FIG. 17, a current output digital-to-analog converter can be used. As the circuit XCS illustrated in FIG. 17, a current output digital-to-analog converter can be used.

At least part of any of the structure examples, the drawings corresponding thereto, and the like described in this embodiment can be combined with any of the other structure examples, the other drawings corresponding thereto, and the like as appropriate.

At least part of this embodiment can be implemented in combination with any of the other embodiments described in this specification, as appropriate.

Embodiment 4

In this embodiment, a schematic top view and a cross-sectional view of a light-emitting element of a display device and its vicinity, a structure example of a light-emitting element, a structure example of a light-emitting element and a light-receiving element, and a structure example of a display device are described.

<Schematic Top View and Cross-Sectional View of Display Device>

Figure 18A:
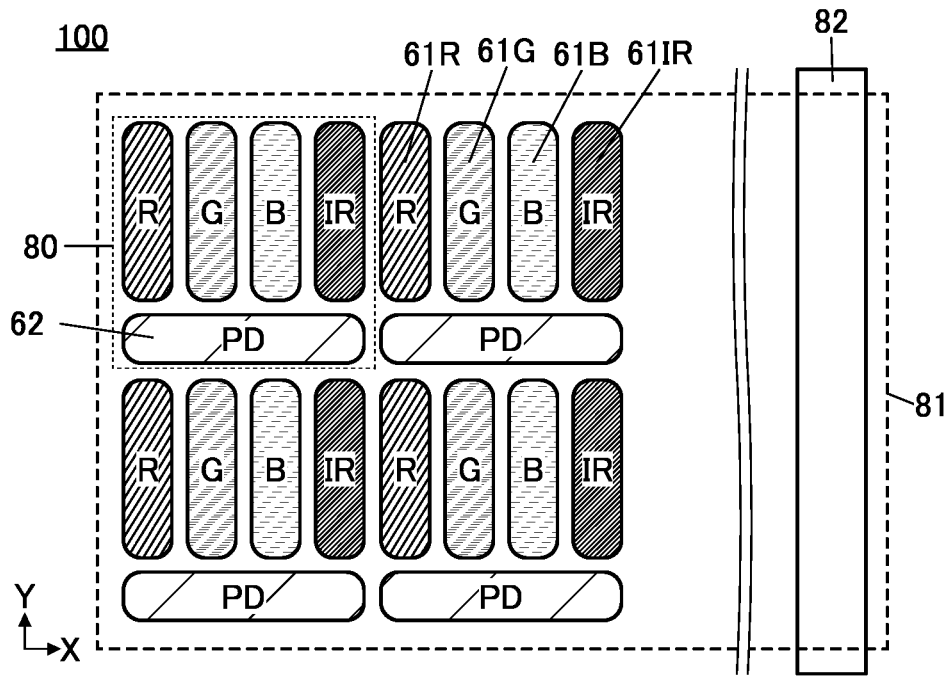
FIGS. 18A and 18B each show a structure example of a display device.

FIG. 18A is a schematic top view (also referred to as a schematic plan view) showing a structure example of the display device 100 of one embodiment of the present invention that is an infrared light source-integrated display device, in which a pixel 80 includes light-emitting elements and a light-receiving element. The display device 100 includes light-emitting elements 61R that emit red light, light-emitting elements 61G that emit green light, light-emitting elements 61B that emit blue light, light-emitting elements 61IR that emit infrared light, and light-receiving elements 62. In the case where an infrared light source is provided in an electronic device, the light-emitting elements 61IR of the display device 100 in this embodiment can be omitted.

In FIG. 18A, light-emitting regions of the light-emitting elements 61 are denoted by R, G, B, and IR to easily differentiate the light-emitting elements 61. In addition, light-receiving regions of the light-emitting elements 62 are denoted by PD.

In the following description common to the light-emitting element 61R, the light-emitting element 61G, the light-emitting element 61B, and the light-emitting element 61IR, the alphabets are omitted from the reference numerals and the term "light-emitting element 61" is used in some cases. Alternatively, the light-emitting element 61 refers to one or more of the light-emitting element 61R, the light-emitting element 61G, the light-emitting element 61B, and the light-emitting element 61IR in some cases.

The display device 100 corresponds to the display device 100 described in the above embodiment. The light-emitting element 61R, the light-emitting element 61G, the light-emitting element 61B, and the light-emitting element 61IR respectively correspond to the light-emitting element 110R, the light-emitting element 110G, the light-emitting element 110B, and the light-emitting element 110IR in Embodiment 1. The light-receiving element 62 corresponds to the light-receiving element 159 described in the above embodiment.

The light-emitting elements 61R, the light-emitting elements 61G, the light-emitting elements 61B, the light-emitting elements 61IR, and the light-receiving elements 62 are arranged in a matrix. Specifically, in a top view, the light-emitting elements 61R, the light-emitting elements 61G, the light-emitting elements 61B, and the light-emitting elements 61IR are arranged along the X direction and the light-receiving elements 62 are arranged on the lower side thereof (in the Y direction) as illustrated in FIG. 18A, for example. FIG. 18A illustrates the structure example where the light-emitting elements 61 that emit light of the same color are arranged along the Y direction. In the display device 100 in FIG. 18A, the pixel 80 can be formed of a sub-pixel including the light-emitting element 61R, a sub-pixel including the light-emitting element 61G, a sub-pixel including the light-emitting element 61B, and a sub-pixel including the light-emitting element 61IR which are arranged along the X direction; and a sub-pixel including the light-receiving element 62 and provided on the lower side of these sub-pixels (in the Y direction), for example. The light-receiving elements 62 each have a function of detecting infrared light.

FIG. 18A shows what is called a stripe arrangement, in which the light-emitting elements of the same color are arranged in one direction. Note that the arrangement of the light-emitting elements is not limited thereto; another arrangement such as a delta, zigzag, or PenTile pattern may also be used.

As each of the light-emitting elements 61R, 61G, 61B, and 61IR, an EL element such as an organic light-emitting diode (OLED) or a quantum-dot light-emitting diode (QLED) is preferably used. Examples of a light-emitting substance included in the EL element include a substance exhibiting fluorescence (a fluorescent material), a substance exhibiting phosphorescence (a phosphorescent material), an inorganic compound (e.g., a quantum dot material), and a substance exhibiting thermally activated delayed fluorescence (a thermally activated delayed fluorescent (TADF) material).

As the light-receiving elements 62, PN photodiodes or PIN photodiodes can be used, for example. The light-receiving elements 62 each function as a photoelectric conversion element that detects light incident on the light-receiving element 62 and generates electric charge. The amount of generated electric charge depends on the amount of incident light.

It is particularly preferable to use organic photodiodes each including a layer containing an organic compound as the light-receiving elements 62. An organic photodiode, which is easily made thin, lightweight, and large in area and has a high degree of freedom for shape and design, can be used in a variety of display devices.

In one embodiment of the present invention, organic EL elements are used as the light-emitting elements 61, and organic photodiodes are used as the light-receiving elements 62. The organic EL elements and the organic photodiodes can be formed over one substrate. Thus, the organic photodiodes can be incorporated in (or "integrated with") a display device including the organic EL elements.

It is known that in the SBS structure in which light-emitting layers of light-emitting elements exhibiting different colors are separately formed, the light-emitting layers are formed by an evaporation method using a shadow mask such as a metal mask or a fine metal mask (FMM). A light-emitting device fabricated in this manner has the MM structure. However, in the MM structure, a deviation from the designed shape and position of an island-shaped light-emitting layer is caused by various influences such as the low accuracy of the metal mask position, the positional deviation between the metal mask and a substrate, a warp of the metal mask, and the vapor-scattering-induced expansion of outline of the deposited film, which makes it difficult to achieve high resolution and a high aperture ratio.

When a light-emitting device with the MML structure in which light-emitting layers are formed without a shadow mask such as a metal mask or an FMM is employed, for example, it is possible to provide a display device having high resolution and a high aperture ratio, which is hard to fabricate when the MM structure is employed. Moreover, when the SBS structure in which light-emitting layers are formed separately is employed, a display device which is capable of displaying extremely clear images and has a high contrast and high display quality can be fabricated.

Here, for simplicity, the case where light-emitting elements for two colors have the MML structure and their light-emitting layers are processed by a photolithography method is described. First, a stack of a first light-emitting film and a first sacrificial film is formed to cover two pixel electrodes. Note that a light-emitting film refers to a film before processing by a photolithography method. Next, a resist mask is formed over the first sacrificial film in a position overlapping with one pixel electrode (a first pixel electrode). Then, the resist mask, part of the first sacrificial film, and part of the first light-emitting film are etched. At this time, the etching is stopped when the other pixel electrode (a second pixel electrode) is exposed. Accordingly, an island-shaped light-emitting layer (also referred to as a first light-emitting layer) is formed over the first pixel electrode, and part of the sacrificial film (also referred to as a first sacrificial layer) is left over the first light-emitting layer.

Next, a stack of a second light-emitting film and a second sacrificial film is formed. Then, resist masks are formed in a position overlapping with the first pixel electrode in a position overlapping with the second pixel electrode. Then, the resist masks, part of the second sacrificial film, and part of the second light-emitting film are etched in a manner similar to the above. As a result, the first light-emitting layer and the first sacrificial layer are provided over the first pixel electrode, and a second light-emitting layer and a second sacrificial layer are provided over the second pixel electrode. In this manner, the first light-emitting layer and the second light-emitting layer can be formed separately. Finally, the first and second sacrificial layers are removed to expose the first and second light-emitting layers, and then a common electrode is formed, so that the light-emitting elements for two colors can be formed separately.

Furthermore, by repeating the above-described steps, light-emitting layers in light-emitting elements for three or more colors can be separately formed. Accordingly, a display device including light-emitting elements for three or more colors can be achieved.

The distance between light-emitting layers for different colors, which is hard to set to less than 10 μm in the MM structure, for example, can be decreased to be less than or equal to 6 μm, less than or equal to 4 μm, less than or equal to 3 μm, less than or equal to 2 μm, or less than or equal to 1 μm in the MML structure. For example, with use of an exposure tool for LSI, the distance can be decreased to be less than or equal to 500 nm, less than or equal to 200 nm, less than or equal to 100 nm, or less than or equal to 50 nm. Accordingly, the area of a non-light-emitting region exiting between two light-emitting elements can be significantly reduced, and the aperture ratio can be close to 100%. For example, the aperture ratio may be higher than or equal to 50%, higher than or equal to 60%, higher than or equal to 70%, higher than or equal to 80%, or higher than or equal to 90%; that is, the aperture ratio lower than 100% can be achieved.

Furthermore, a pattern of the light-emitting layer itself can be made extremely smaller than that in the case of using a metal mask. For example, in the case of using a metal mask for forming light-emitting layers separately, a variation in the thickness of the pattern of the light-emitting layer occurs between the center and the edge of the pattern. This causes a reduction in an effective area that can be used as a light-emitting region with respect to the whole pattern area. By contrast, in the above manufacturing method involving a photography method, a pattern of a light-emitting layer is formed by processing a film deposited to have a uniform thickness, which enables a uniform thickness in the pattern. Thus, even in the fine pattern, almost the whole area can be used as a light-emitting region. Therefore, the above manufacturing method involving a photolithography method enables both high resolution and a high aperture ratio.

As described above, with the above manufacturing method involving a photolithography method, a display device in which minute light-emitting elements are integrated can be obtained, and it is not necessary to conduct a pseudo improvement in resolution with a unique pixel arrangement such as a PenTile pattern. Thus, the display device can achieve resolution higher than or equal to 500 ppi, higher than or equal to 1000 ppi, higher than or equal to 2000 ppi, higher than or equal to 3000 ppi, or higher than or equal to 5000 ppi while having what is called a stripe pattern where R, G, and B are arranged in one direction.

In FIG. 18A, a common electrode 81 that has a region overlapping with the light-emitting elements 61, the light-receiving elements 62, and a connection electrode 82 is shown by the dashed lines. FIG. 18A also shows the connection electrode 82 electrically connected to the common electrode 81.

The connection electrode 82 is positioned outside a display region where the light-emitting elements 61 and the light-receiving elements 62 are arranged, and can be provided along the outer periphery of the display region. For example, the connection electrode 82 may be provided along one side of the outer periphery of the display region or two or more sides of the outer periphery of the display region. That is, the top surface shape of the connection electrode 82 can be a band shape, an L shape, a square bracket shape, a quadrangle, or the like in the case where the top surface shape of the display region is a rectangle.

Here, the connection electrode is described. The connection electrode is preferably formed using a conductive layer that is formed on the same plane as the pixel electrode. In the display device 100, the conductive layer is electrically connected to the common electrode. The connection electrode is positioned outside a pixel portion. In order to prevent the top surface of the connection electrode from being exposed in etching of the first light-emitting film, it is preferable that the first sacrificial layer be also provided over the connection electrode. Also in etching of the second light-emitting film, the second sacrificial layer is preferably provided over the connection electrode.

Figure 18B:
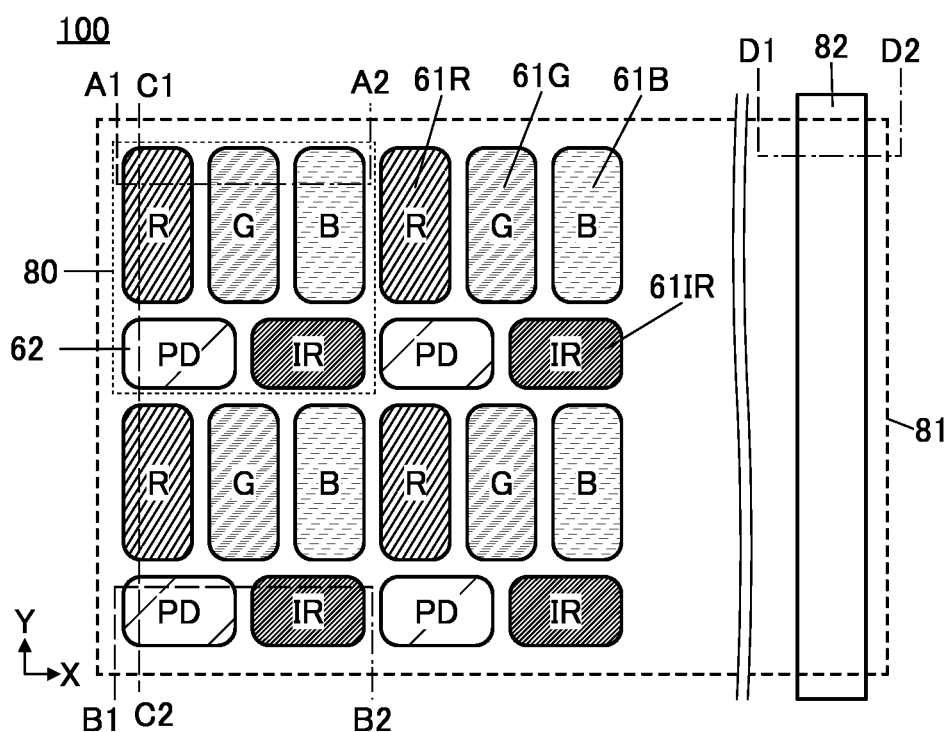

FIG. 18B is a schematic top view illustrating a structure example of the display device 100, which is a modification example of the display device 100 illustrated in FIG. 18A. The display device 100 shown in FIG. 18B is different from that shown in FIG. 18A in that the light-receiving elements 62 and the light-emitting elements 61IR are alternately arranged in the X direction.

In the display device 100 shown in FIG. 18B, the light-emitting element 61R, the light-emitting element 61G, and the light-emitting element 61B are arranged in a row different from a row in which the light-emitting element 61IR is provided. Thus, the light-emitting element 61R, the light-emitting element 61G, and the light-emitting element 61B can have larger widths (larger lengths in the X direction), so that the luminance of the light emitted by the pixel 80 can be high.

Figure 19A:
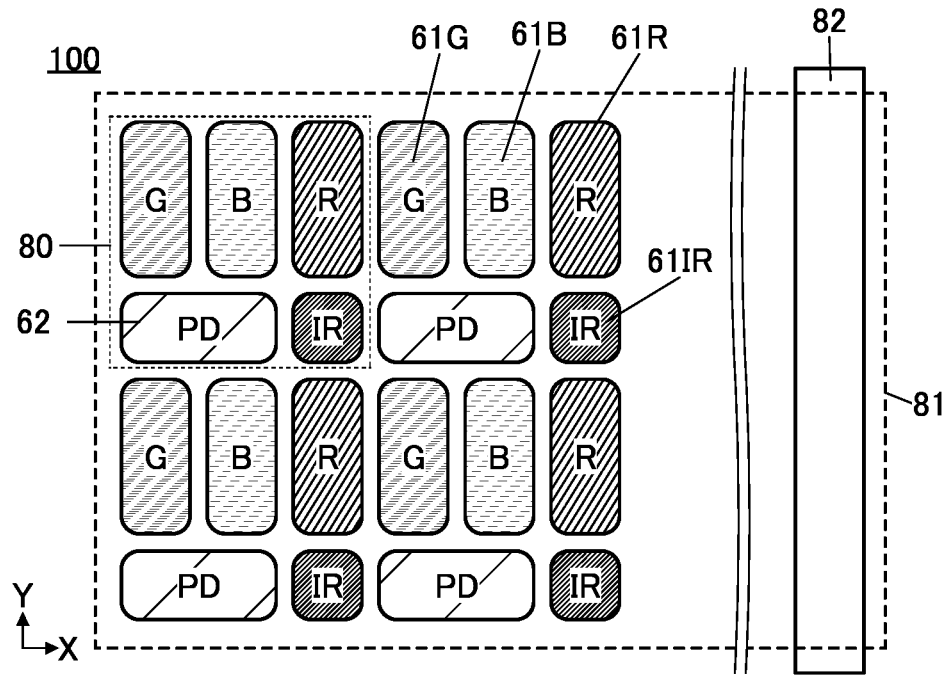
FIGS. 19A and 19B each show a structure example of a display device.

FIG. 19A is a schematic top view illustrating a structure example of the display device 100, which is a modification example of the display device 100 illustrated in FIG. 18B. The display device 100 shown in FIG. 19A is different from that shown in FIG. 18B in that the light-emitting elements 61 are arranged in the X direction in the order of G, B, and R instead of R, G, and B. The display device 100 shown in FIG. 19A is different from that shown in FIG. 18B also in that the light-receiving element 62 is provided on the lower side of the light-emitting elements 61G and 61B and the light-emitting element 61IR is provided on the lower side of the light-emitting element 61R.

The area occupied by the light-receiving element 62 in the display device 100 shown in FIG. 19A is larger than that occupied by the light-receiving element 62 in the display device 100 shown in FIG. 18B. Accordingly, the light detection sensitivity of the light-receiving element 62 can be increased. Therefore, in the case where the display device 100 has an eye tracking function, for example, highly accurate gaze tracking can be performed.

Figure 19B:
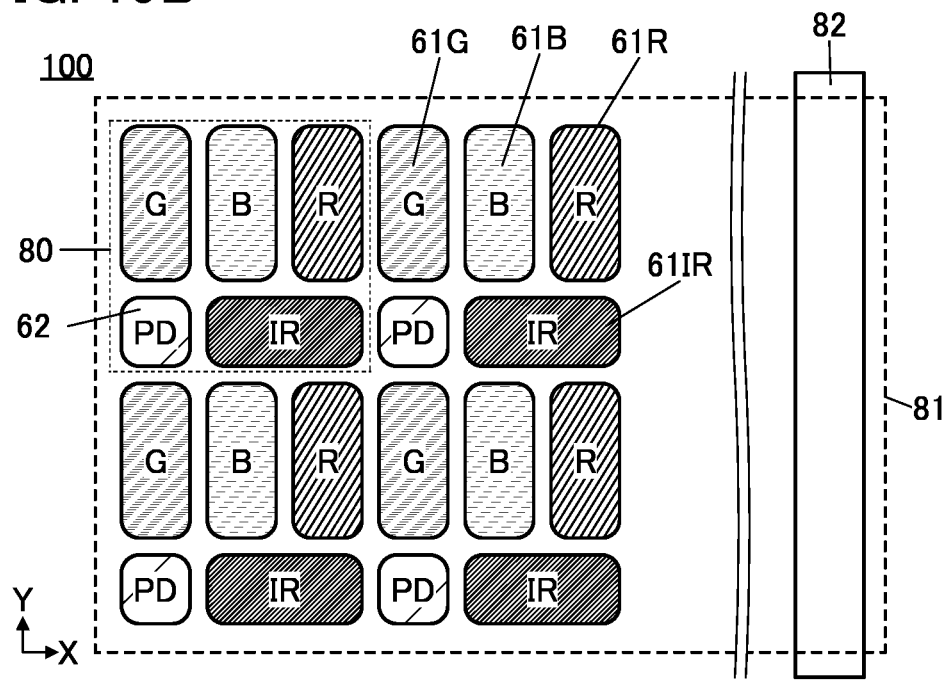

FIG. 19B is a schematic top view illustrating a structure example of the display device 100, which is a modification example of the display device 100 illustrated in FIG. 19A. The display device 100 shown in FIG. 19B is different from that shown in FIG. 19A in that the light-receiving element 62 is provided on the lower side of the light-emitting element 61G and that the light-emitting element 61IR is provided on the lower side of the light-emitting elements 61B and 61R.

The area occupied by the light-receiving element 62 in the display device 100 shown in FIG. 19B is smaller than that occupied by the light-receiving element 62 in the display device 100 shown in FIG. 19A. When the area occupied by the light-receiving element 62 is small, the light-receiving range of each light-receiving element 62 can be narrow. It is thus possible to reduce an overlap between the light-receiving ranges of different light-receiving elements 62, e.g., adjacent light-receiving elements 62. This can inhibit blurring in an image captured with the light-receiving element 62, allowing clear image capturing. Accordingly, in the case where the display device 100 has an eye tracking function, for example, the area occupied by the light-receiving element 62 is preferably reduced to enable capturing of a clear image of an eyeball or the like, which leads to higher accuracy of identification.

Figure 20A:
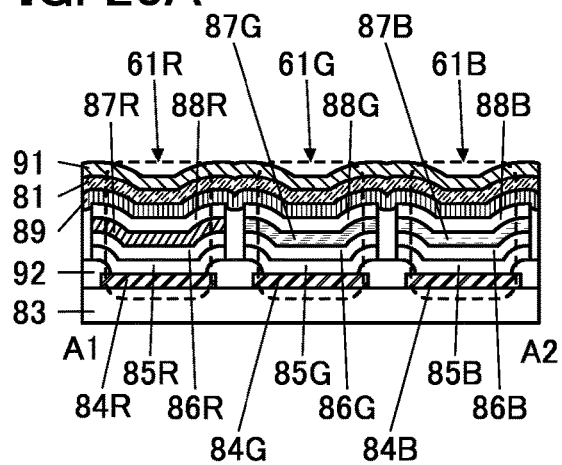
FIGS. 20A to 20E show structure examples of a display device.
Figure 20B:
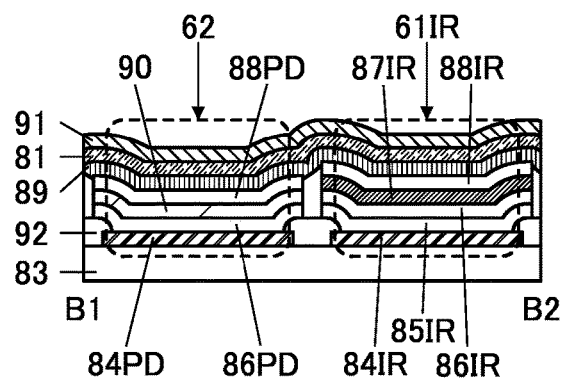
Figure 20C:
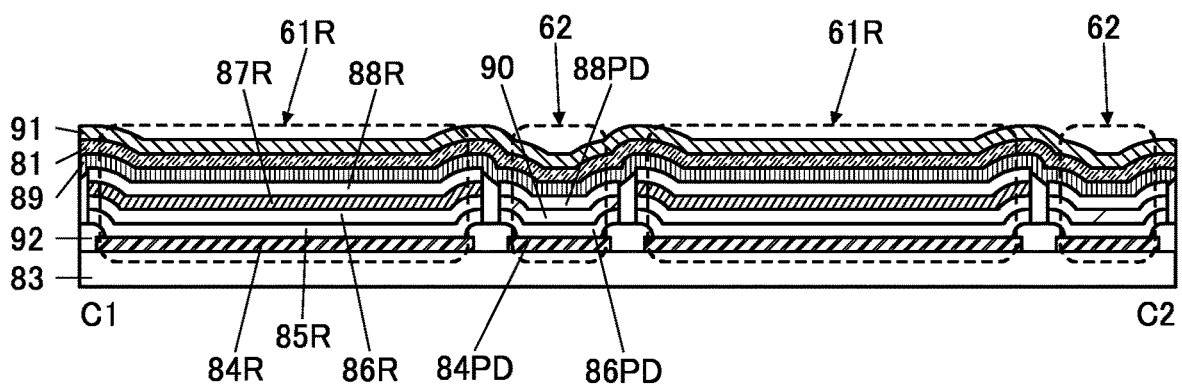
Figure 20D:
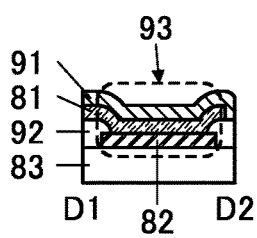

FIG. 20A is a cross-sectional view taken along dashed-dotted line A1-A2 in FIG. 18B, and FIG. 20B is a cross-sectional view taken along dashed-dotted line B1-B2 in FIG. 18B. FIG. 20C is a cross-sectional view taken along dashed-dotted line C1-C2 in FIG. 18B, and FIG. 20D is a cross-sectional view taken along dashed-dotted line D1-D2 in FIG. 18B. In FIG. 20A and the like, the light-emitting element 61R, the light-emitting element 61G, the light-emitting element 61B, the light-emitting element 61IR, and the light-receiving element 62 are provided over a substrate 83.

A substrate that has heat resistance high enough to withstand at least heat treatment performed later can be used as the substrate 83. When an insulating substrate is used, a glass substrate, a quartz substrate, a sapphire substrate, a ceramic substrate, an organic resin substrate, or the like can be used as the substrate 83. For example, a single crystal semiconductor substrate or a polycrystalline semiconductor substrate of silicon, silicon carbide, or the like; a compound semiconductor substrate of silicon germanium or the like; an SOI substrate; or the like can be used. Note that the substrate 83 is preferably a glass substrate having a light-transmitting property, for example.

As the substrate 83, it is particularly preferable to use a semiconductor substrate or an insulating substrate over which a semiconductor circuit including a semiconductor element such as a transistor is formed. The semiconductor circuit preferably forms a pixel circuit, a gate line driver circuit (a gate driver), a source line driver circuit (a source driver), or the like. In addition to the above, an arithmetic circuit, a memory circuit, or the like may be formed.

The substrate 83 corresponds to the substrate 101 in Embodiment 1.

The light-emitting element 61R includes a pixel electrode 84R, a hole-injection layer 85R, a hole-transport layer 86R, a light-emitting layer 87R, an electron-transport layer 88R, a common layer 89, and the common electrode 81. The light-emitting element 61G includes a pixel electrode 84G, a hole-injection layer 85G, a hole-transport layer 86G, a light-emitting layer 87G, an electron-transport layer 88G, the common layer 89, and the common electrode 81. The light-emitting element 61B includes a pixel electrode 84B, a hole-injection layer 85B, a hole-transport layer 86B, a light-emitting layer 87B, an electron-transport layer 88B, the common layer 89, and the common electrode 81.

FIG. 20B shows a cross-sectional structure example of the light-emitting element 61IR and the light-receiving element 62. The light-emitting element 61IR includes a pixel electrode 84IR, a hole-injection layer 85IR, a hole-transport layer 86IR, a light-emitting layer 87IR, an electron-transport layer 88IR, the common layer 89, and the common electrode 81. The light-receiving element 62 includes a pixel electrode 84PD, a hole-transport layer 86PD, a light-receiving layer 90, an electron-transport layer 88PD, the common layer 89, and the common electrode 81.

In the following description common to the pixel electrode 84R, the pixel electrode 84G, the pixel electrode 84B, the pixel electrode 84IR, and the pixel electrode 84PD, the alphabets are omitted from the reference numerals and the term "pixel electrode 84" is used in some cases. Likewise, in the description common to the hole-injection layer 85R, the hole-injection layer 85G, the hole-injection layer 85B, and the hole-injection layer 85IR, the alphabets are omitted from the reference numerals and the term "hole-injection layer 85" is used in some cases. Likewise, in the description common to the hole-transport layer 86R, the hole-transport layer 86G, the hole-transport layer 86B, the hole-transport layer 86IR, and the hole-transport layer 86PD, the alphabets are omitted from the reference numerals and the term "hole-transport layer 86" is used in some cases. Likewise, in the description common to the light-emitting layer 87R, the light-emitting layer 87G, the light-emitting layer 87B, and the light-emitting layer 87IR, the alphabets are omitted from the reference numerals and the term "light-emitting layer 87" is used in some cases. Likewise, in the description common to the electron-transport layer 88R, the electron-transport layer 88G, the electron-transport layer 88B, the electron-transport layer 88IR, and the electron-transport layer 88PD, the alphabets are omitted from the reference numerals and the term "electron-transport layer 88" is used in some cases.

The common layer 89 has a function of an electron-injection layer in the light-emitting element 61. Meanwhile, the common layer 89 has a function of an electron-transport layer in the light-receiving element 62. Therefore, the light-receiving element 62 does not need to include the electron-transport layer 88PD in some cases.

The hole-injection layer 85, the hole-transport layer 86, the electron-transport layer 88, and the common layer 89 can also be referred to as functional layers. In the light-emitting element 61 shown in FIG. 20A and the like, the hole-injection layer 85, the hole-transport layer 86, the light-emitting layer 87, the electron-transport layer 88, and the common layer 89 can be collectively referred to as a light-emitting layer.

The pixel electrode 84, the hole-injection layer 85, the hole-transport layer 86, the light-emitting layer 87, and the electron-transport layer 88 can each be separately provided for each element. The light-emitting elements 61R, 61G, 61B, and 61IR and the light-receiving element 62 include the common layer 89 and the common electrode 81 in common.

The light-emitting element 61 and the light-receiving element 62 may each include a hole-blocking layer and an electron-blocking layer other than the layers illustrated in FIG. 20A and the like. The light-emitting element 61 and the light-receiving element 62 may each include a layer containing a bipolar substance (a substance with a high electron-transport property and a high hole-transport property).

An insulating layer 92 overlaps with end portions of the pixel electrode 84, and there is a gap between the insulating layer 92 and the common layer 89. This can inhibit contact between the common layer 89 and each of a side surface of the light-emitting layer 87, a side surface of the light-receiving layer 90, a side surface of the hole-transport layer 86, and a side surface of the hole-injection layer 85. Thus, a short circuit in the light-emitting element 61 and a short circuit in the light-receiving element 62 can be inhibited.

The shorter the distance between the light-emitting layers 87 is, the more easily the gap is formed, for example. For example, when the distance is less than or equal to 1 µm, preferably less than or equal to 500 nm, further preferably less than or equal to 200 nm, less than or equal to 100 nm, less than or equal to 90 nm, less than or equal to 70 nm, less than or equal to 50 nm, less than or equal to 30 nm, less than or equal to 20 nm, less than or equal to 15 nm, or less than or equal to 10 nm, the gap can be favorably formed.

In FIG. 20A and the like, the light-emitting element 61 includes the pixel electrode 84, the hole-injection layer 85, the hole-transport layer 86, the light-emitting layer 87, the electron-transport layer 88, the common layer 89 (electron-injection layer), and the common electrode 81 in this order from the bottom, and the light-receiving element 62 includes the pixel electrode 84PD, the hole-transport layer 86PD, the light-receiving layer 90, the electron-transport layer 88PD, the common layer 89, and the common electrode 81 in this order from the bottom; however, one embodiment of the present invention is not limited thereto. For example, the light-emitting element 61 may include a pixel electrode, an electron-injection layer, an electron-transport layer, a light-emitting layer, a hole-transport layer, a hole-injection layer, and a common electrode in this order from the bottom, and the light-receiving element 62 may include a pixel electrode, an electron-transport layer, a light-receiving layer, a hole-transport layer, and a common electrode in this order from the bottom. In that case, the hole-injection layer included in the light-emitting element 61 can be a common layer, and the common layer can be provided between the hole-transport layer included in the light-receiving element 62 and the common electrode. In addition, the electron-injection layers can be separated between the light-emitting elements 61.

Note that when the MML structure is used for the light-emitting element 61 and the light-receiving element 62, the light-emitting element 61 and the light-receiving element 62 can have different structures. For example, the light-emitting element 61 may include the pixel electrode 84, the hole-injection layer 85, the hole-transport layer 86, the light-emitting layer 87, the electron-transport layer 88, the common layer 89 (electron-injection layer), and the common electrode 81 in this order from the bottom, and the light-receiving element 62 may include the pixel electrode 84PD, the electron-transport layer 88PD, the light-receiving layer 90, the hole-transport layer 86PD, the common layer 89, and the common electrode 81 in this order from the bottom. When this structure is employed, drive voltage for the light-emitting element 61 and drive voltage for the light-receiving element 62 can be in the same direction. Note that in the light-receiving element 62 having the above structure, a hole-injection layer may be provided between the hole-transport layer 86PD and the common layer 89.

Although the electron-transport layer is considered as being provided over the hole-transport layer in the description below, the following description can also be applied to the case where the electron-transport layer is provided under the hole-transport layer, when "electron" is replaced with "hole" and "hole" is replaced with "electron", for example.

The hole-injection layer injects holes from an anode to the hole-transport layer and contains a material with a high hole-injection property. As the material with a high hole-injection property, an aromatic amine compound and a composite material containing a hole-transport material and an acceptor material (electron-accepting material) can be used, for example.

The hole-transport layer transports holes injected from the anode by the hole-injection layer, to the light-emitting layer. The hole-transport layer contains a hole-transport material. The hole-transport material preferably has a hole mobility of higher than or equal to $1\times10^{-6}$ cm$^2$/Vs. Note that other substances can also be used as long as the substances have a hole-transport property higher than an electron-transport property. As the hole-transport material, materials having a high hole-transport property, such as a π-electron rich heteroaromatic compound (e.g., a carbazole derivative, a thiophene derivative, and a furan derivative) and an aromatic amine (a compound having an aromatic amine skeleton), are preferred.

The electron-transport layer transports electrons injected from the cathode by the electron-injection layer, to the light-emitting layer. The electron-transport layer contains an electron-transport material. The electron-transport material preferably has an electron mobility of higher than or equal to $1\times10^{-6}$ cm$^2$/Vs. Note that other substances can also be used as long as the substances have an electron-transport property higher than a hole-transport property. As the electron-transport material, any of the following materials having a high electron-transport property can be used, for example: a metal complex having a quinoline skeleton, a metal complex having a benzoquinoline skeleton, a metal complex having an oxazole skeleton, a metal complex having a thiazole skeleton, an oxadiazole derivative, a triazole derivative, an imidazole derivative, an oxazole derivative, a thiazole derivative, a phenanthroline derivative, a quinoline derivative having a quinoline ligand, a benzoquinoline derivative, a quinoxaline derivative, a dibenzoquinoxaline derivative, a pyridine derivative, a bipyridine derivative, a pyrimidine derivative, and a π-electron deficient heteroaromatic compound such as a nitrogen-containing heteroaromatic compound.

The electron-injection layer injects electrons from the cathode to the electron-transport layer and contains a material with a high electron-injection property. As the material with a high electron-injection property, an alkali metal, an alkaline earth metal, or a compound thereof can be used. As the material with a high electron-injection property, a composite material containing an electron-transport material and a donor material (electron-donating material) can also be used.

The electron-injection layer can be formed using an alkali metal, an alkaline earth metal, or a compound thereof, such as lithium, cesium, lithium fluoride (LiF), cesium fluoride (CsF), calcium fluoride (CaF$_2$), 8-(quinolinolato)lithium (abbreviation: Liq), 2-(2-pyridyl)phenolato lithium (abbreviation: LiPP), 2-(2-pyridyl)-3-pyridinolato lithium (abbreviation: LiPPy), 4-phenyl-2-(2-pyridyl)phenolato lithium (abbreviation: LiPPP), lithium oxide (LiO$_x$), or cesium carbonate.

Alternatively, an electron-transport material may be used for the electron-injection layer. For example, a compound having an unshared electron pair and an electron deficient heteroaromatic ring can be used as the electron-transport material. Specifically, a compound with at least one of a pyridine ring, a diazine ring (a pyrimidine ring, a pyrazine ring, and a pyridazine ring), and a triazine ring can be used.

Note that the lowest unoccupied molecular orbital (LUMO) of the organic compound including an unshared electron pair is preferably greater than or equal to −3.6 eV and less than or equal to −2.3 eV. In general, the highest occupied molecular orbital (HOMO) level and the LUMO level of the organic compound can be estimated by cyclic voltammetry (CV), photoelectron spectroscopy, optical absorption spectroscopy, inverse photoelectron spectroscopy, or the like.

For example, 4,7-diphenyl-1,10-phenanthroline (abbreviation: BPhen), 2,9-bis(naphthalen-2-yl)-4,7-diphenyl-1,10-phenanthroline (abbreviation: NBPhen), diquinoxalino[2,3-a: 2',3'-c]phenazine (abbreviation: HATNA), 2,4,6-tris[3'-(pyridin-3-yl)biphenyl-3-yl]-1,3,5-triazine (abbreviation: TmPPPyTz), or the like can be used for the organic compound including an unshared electron pair. Note that NBPhen has a higher glass transition temperature (Tg) than BPhen and thus has high heat resistance.

The light-emitting layer contains a light-emitting substance. The light-emitting layer can contain one or more kinds of light-emitting substances. As the light-emitting substance, a substance whose emission color is blue, violet, bluish violet, green, yellowish green, yellow, orange, red, or the like is appropriately used. Alternatively, as the light-emitting substance, a substance that emits near-infrared light can be used.

Examples of the light-emitting substance include a fluorescent material, a phosphorescent material, a TADF material, and a quantum dot material.

Examples of the fluorescent material include a pyrene derivative, an anthracene derivative, a triphenylene derivative, a fluorene derivative, a carbazole derivative, a dibenzothiophene derivative, a dibenzofuran derivative, a dibenzoquinoxaline derivative, a quinoxaline derivative, a pyridine derivative, a pyrimidine derivative, a phenanthrene derivative, and a naphthalene derivative.

Examples of the phosphorescent material include an organometallic complex (particularly an iridium complex) having a 4H-triazole skeleton, a 1H-triazole skeleton, an imidazole skeleton, a pyrimidine skeleton, a pyrazine skeleton, or a pyridine skeleton, an organometallic complex (particularly an iridium complex) having a phenylpyridine derivative including an electron-withdrawing group as a ligand, a platinum complex, and a rare earth metal complex.

The light-emitting layer may contain one kind or two or more kinds of organic compounds (e.g., a host material or an assist material) in addition to the light-emitting substance (guest material). As one kind or two or kinds of organic compounds, one or both of the hole-transport material and the electron-transport material can be used. Alternatively, as one kind or two or kinds of organic compounds, a bipolar material or a TADF material may be used.

The light-emitting layer preferably includes a combination of a hole-transport material and an electron-transport material that easily forms an exciplex and a phosphorescent material, for example. With such a structure, light emission can be efficiently obtained by exciplex-triplet energy transfer (ExTET), which is energy transfer from an exciplex to a light-emitting substance (phosphorescent material). When a combination of materials is selected so as to form an exciplex emitting light with a wavelength that overlaps with the wavelength of a lowest-energy-side absorption band of the light-emitting substance, energy can be transferred smoothly and light emission can be obtained efficiently. With the above structure, high efficiency, low-voltage driving, and a long lifetime of a light-emitting element can be achieved at the same time.

In a combination of materials for forming an exciplex, the highest occupied molecular orbital level (HOMO level) of the hole-transport material is preferably higher than or equal to that of the electron-transport material. The lowest unoccupied molecular orbital level (LUMO level) of the hole-transport material is preferably higher than or equal to that of the electron-transport material. The LUMO levels and the HOMO levels of the materials can be derived from the electrochemical characteristics (the reduction potentials and the oxidation potentials) of the materials that are measured by cyclic voltammetry (CV).

The formation of an exciplex can be confirmed, for example, by a phenomenon in which the emission spectrum of a mixed film in which the hole-transport material and the electron-transport material are mixed is shifted to the longer wavelength side than the emission spectrum of each of the hole-transport material and the electron-transport material (or has another peak on the longer wavelength side) observed by comparison of the emission spectra of the hole-transport material, the electron-transport material, and the mixed film of these materials. Alternatively, the formation of an exciplex can be confirmed by a difference in transient response, such as a phenomenon in which the transient photoluminescence (PL) lifetime of the mixed film has longer lifetime components or has a larger proportion of delayed components than that of each of the hole-transport material and the electron-transport material, observed by comparison of transient PL of the hole-transport material, the electron-transport material, and the mixed film of these materials. The transient PL can be rephrased as transient electroluminescence (EL). That is, the formation of an exciplex can also be confirmed by a difference in transient response observed by comparison of the transient EL of the hole-transport material, the electron-transport material, and the mixed film of the materials.

The light-emitting layer 87R of the light-emitting element 61R includes a light-emitting organic compound that emits light with a peak at least in the red wavelength range. The light-emitting layer 87G of the light-emitting element 61G includes a light-emitting organic compound that emits light with a peak at least in the green wavelength range. The light-emitting layer 87B of the light-emitting element 61B includes a light-emitting organic compound that emits light with a peak at least in the blue wavelength range. The light-emitting layer 871R of the light-emitting element 611R includes a light-emitting organic compound that emits light with a peak at least in the infrared wavelength range. The light-receiving layer 90 of the light-receiving element 62 includes an organic compound having detection sensitivity in the infrared wavelength range, for example.

A conductive film that transmits visible light is used for either the pixel electrode 84 or the common electrode 81, and a reflective conductive film is used for the other. When the pixel electrode 84 has a light-transmitting property and the common electrode 81 has a light-reflecting property, the display device 100 can have a bottom emission structure. When the pixel electrode 84 has a light-reflecting property and the common electrode 81 has a light-transmitting property, the display device 100 can have a top emission structure. When both the pixel electrode 84 and the common electrode 81 transmit light, the display device 100 can have a dual-emission structure.

The light-emitting element 61 preferably has a micro-optical resonator (microcavity) structure. In that case, light emitted from the light-emitting layer 87 can be resonated between the pixel electrode 84 and the common electrode 81, so that light emitted from the light-emitting element 61 can be intensified. In the case where a light-emitting device has the SBS structure, a microcavity structure can be used for the light-emitting device.

In the case where the light-emitting element 61 has a microcavity structure, one of the common electrode 81 and the pixel electrode 84 is preferably an electrode having both a light-transmitting property and a light-reflecting property (transflective electrode), and the other of the common electrode 81 and the pixel electrode 84 is preferably a reflective electrode. Light emitted from the light-emitting layer is repetitively reflected between the transflective electrode and the reflective electrode, whereby light with a desired wavelength can be extracted from the transflective electrode side. Here, as the transflective electrode, a thinned reflective electrode can be used. Note that in the case where a microcavity structure in which the pixel electrode 84 is a transflective electrode is employed, a transparent electrode can be positioned over the transflective electrode and the thickness of the transparent electrode can be varied. Such a transparent electrode is referred to as an optical adjustment layer.

Alternatively, the light-emitting element 611R emitting light with the longest wavelength has the longest distance between the common electrode 81 and the pixel electrode 841R, the light-emitting element 61R emitting light with the second longest wavelength has the second longest distance between the common electrode 81 and the pixel electrode 84R, the light-emitting element 61G emitting light with the third longest wavelength has the third longest distance between the common electrode 81 and the pixel electrode 84G, and the light-emitting element 61B emitting light with the shortest wavelength has the shortest distance between the common electrode 81 and the pixel electrode 84G, whereby the light-emitting elements 61 can have a microcavity structure. Without limitation to this, the thickness of each layer can be adjusted in consideration of the wavelength of light emitted by the light-emitting element, optical characteristics of the layer included in the light-emitting element, electrical characteristics of the light-emitting element, and the like.

The transparent electrode has a visible light transmittance of higher than or equal to 40%. For example, an electrode having a visible light (light with a wavelength of greater than or equal to 400 nm and less than 750 nm) transmittance of higher than or equal to 40% is preferably used as the transparent electrode. The visible light reflectivity of the transflective electrode is higher than or equal to 10% and less than or equal to 95%, preferably higher than or equal to 30% and lower than or equal to 80%. The visible light reflectivity of the reflective electrode is higher than or equal to 40% and lower than or equal to 100%, preferably higher than or equal to 70% and lower than or equal to 100%. These electrodes preferably have a resistivity of lower than or equal to $1 \times 10^{-2}$ Ωcm. Note that in the case where the light-emitting element (IR) that emits near-infrared light is used in the display device, the near-infrared light (light with a wavelength of greater than or equal to 750 nm and less than or equal to 1300 nm) transmittance and reflectivity of these electrodes are preferably in the above numerical ranges.

The insulating layer 92 is provided so as to cover the end portions of the pixel electrode 84R, the end portions of the pixel electrode 84G, the end portions of the pixel electrode 84B, the end portions of the pixel electrode 841R, and the end portions of the pixel electrode 84PD. End portions of the insulating layer 92 are preferably tapered. The insulating layer 92 is not necessarily provided.

For example, the hole-injection layer 85R, the hole-injection layer 85G, the hole-injection layer 85B, the hole-injection layer 851R, and the hole-transport layer 86PD each include a region overlapping with the pixel electrode 84 and a region overlapping with the insulating layer 92. In addition, end portions of the hole-injection layer 85R, end portions of the hole-injection layer 85G, end portions of the hole-injection layer 85B, end portions of the hole-injection layer 851R, and end portions of the hole-transport layer 86PD are each positioned in a region overlapping with the insulating layer 92.

As illustrated in FIG. 20A, a gap is provided between the light-emitting elements 61 that emit light of different colors, for example, between two light-emitting layers 87. In this manner, it is preferable that the light-emitting layers 87R, 87G, and 87B be provided such that they are not in contact with each other, for example. This favorably prevents a crosstalk, which is unintentional light emission by a current flowing via adjacent two light-emitting layers 87. Thus, the contrast of the display device 100 can be increased, so that the display quality of the display device 100 can be improved.

A protective layer 91 is provided over the common electrode 81. The protective layer 91 has a function of preventing diffusion of impurities such as water into each light-emitting element from above.

The protective layer 91 can have, for example, a single-layer structure or a stacked-layer structure at least including an inorganic insulating film. Examples of the inorganic insulating film include an oxide film or a nitride film such as a silicon oxide film, a silicon oxynitride film, a silicon nitride oxide film, a silicon nitride film, an aluminum oxide film, an aluminum oxynitride film, or a hafnium oxide film. Alternatively, a semiconductor material such as indium gallium oxide or indium gallium zinc oxide may be used for the protective layer 91.

In this specification and the like, a silicon oxynitride film refers to a film that contains oxygen at a higher proportion than nitrogen. A silicon nitride oxide film refers to a film that contains nitrogen at a higher proportion than oxygen.

Alternatively, a stack of an inorganic insulating film and an organic insulating film can be used as the protective layer 91. For example, a structure where an organic insulating film is provided between a pair of inorganic insulating films is preferably employed. Furthermore, an organic insulating film preferably functions as a planarization film. This planarizes the top surface of the organic insulating film, resulting in improved coverage with an inorganic insulating film thereover and an enhanced barrier property. The top surface of the protective layer 91 is flat; thus, in the case where a structure (e.g., a color filter, an electrode of a touch sensor, or a lens array) is provided above the protective layer 91, the influence of an uneven shape due to a structure below the protective layer 91 can be reduced.

FIG. 20C illustrates a cross-sectional structure example of the display device 100 in the Y direction, specifically, a cross-sectional structure example of the light-emitting elements 61R and the light-receiving elements 62. The light-emitting elements 61G, the light-emitting elements 61B, and the light-emitting elements 61IR can be arranged in the Y direction like the light-emitting elements 61R.

FIG. 20D illustrates a connection portion 93 where the connection electrode 82 and the common electrode 81 are electrically connected to each other. In the connection portion 93, the common electrode 81 is provided over and in contact with the connection electrode 82, and the protective layer 91 is provided so as to cover the common electrode 81. The insulating layer 92 is provided so as to cover end portions of the connection electrode 82.

Figure 20E:
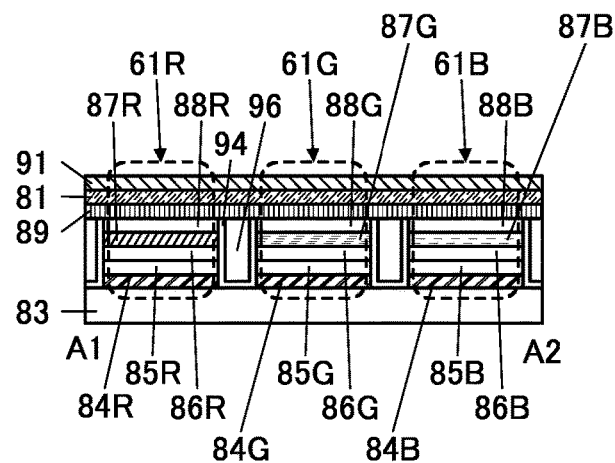

FIGS. 20A to 20C show a structure in which the insulating layer 92 is provided to cover the end portions of the pixel electrode 84R, the end portions of the pixel electrode 84G, the end portions of the pixel electrode 84B, and the end portions of the pixel electrode 84PD; however, one embodiment of the present invention is not limited to this structure. A structure without the insulating layer 92 as shown in FIG. 20E may be employed.

An insulating layer may be provided in the region between adjacent light-emitting elements 61 and the region between the light-emitting element 61 and the light-receiving element 62 which are adjacent to each other. FIG. 20E is a cross-sectional view taken along dashed-dotted line A1-A2 in FIG. 18B. In FIG. 20E, an insulating layer 94 and an insulating layer 96 are provided in such regions.

The insulating layers 94 and the insulating layers 96 cover the side surfaces of the pixel electrode 84R, the pixel electrode 84G, the pixel electrode 84B, the hole-injection layer 85R, the hole-injection layer 85G, the hole-injection layer 85B, the hole-transport layer 86R, the hole-transport layer 86G, the hole-transport layer 86B, the light-emitting layer 87R, the light-emitting layer 87G, the light-emitting layer 87B, the electron-transport layer 88R, the electron-transport layer 88G, and the electron-transport layer 88B. The common layer 89 is provided over the electron-transport layer 88R, the electron-transport layer 88G, the electron-transport layer 88B, the insulating layers 94, and the insulating layers 96. The common electrode 81 is provided over the common layer 89.

The above structure can inhibit contact of the common layer 89 (or the common electrode 81) with the side surface of any of the pixel electrode 84R, the pixel electrode 84G, the pixel electrode 84B, the light-emitting layer 87R, the light-emitting layer 87G, and the light-emitting layer 87B and can inhibit a short circuit between the light-emitting elements.

The insulating layers 94 preferably cover at least the side surfaces of the pixel electrode 84R, the pixel electrode 84G, and the pixel electrode 84B. Moreover, the insulating layers 94 preferably cover the side surfaces of the hole-injection layer 85R, the hole-injection layer 85G, the hole-injection layer 85B, the hole-transport layer 86R, the hole-transport layer 86G, the hole-transport layer 86B, the light-emitting layer 87R, the light-emitting layer 87G, the light-emitting layer 87B, the electron-transport layer 88R, the electron-transport layer 88G, and the electron-transport layer 88B. The insulating layers 94 can be in contact with the side surfaces of the pixel electrode 84R, the pixel electrode 84G, the pixel electrode 84B, the hole-injection layer 85R, the hole-injection layer 85G, the hole-injection layer 85B, the hole-transport layer 86R, the hole-transport layer 86G, the hole-transport layer 86B, the light-emitting layer 87R, the light-emitting layer 87G, the light-emitting layer 87B, the electron-transport layer 88R, the electron-transport layer 88G, and the electron-transport layer 88B.

The insulating layers 96 are provided over the insulating layers 94 to fill depressed portions formed in the insulating layers 94. The insulating layers 96 can overlap with the side surfaces of the pixel electrode 84R, the pixel electrode 84G, the pixel electrode 84B, the hole-injection layer 85R, the hole-injection layer 85G, the hole-injection layer 85B, the hole-transport layer 86R, the hole-transport layer 86G, the hole-transport layer 86B, the light-emitting layer 87R, the light-emitting layer 87G, the light-emitting layer 87B, the electron-transport layer 88R, the electron-transport layer 88G, and the electron-transport layer 88B, with the insulating layers 94 provided between the insulating layers 96 and the side surfaces.

Note that either the insulating layers 94 or the insulating layers 96 are not necessarily provided. In the case where the insulating layers 94 are not provided, the insulating layers 96 can be in contact with the side surfaces of the light-emitting layer 87R, the light-emitting layer 87G, and the light-emitting layer 87B. In addition, the display device may include an insulating layer covering an end portion of the pixel electrode. In this case, the insulating layers 94 and/or the insulating layers 96 may be provided over the insulating layer.

The common layer 89 and the common electrode 81 are provided over the electron-transport layer 88R, the electron-transport layer 88G, the electron-transport layer 88B, the insulating layers 94, and the insulating layers 96. Before the insulating layers 94 and the insulating layers 96 are provided, a step is generated due to a difference between a region where the pixel electrode and the light-emitting layer are provided and a region where neither the pixel electrode nor the light-emitting layer is provided (region between the light-emitting elements). In the display device of one embodiment of the present invention, the step can be planarized with the insulating layers 94 and the insulating layers 96, and the coverage with the common layer 89 and the common electrode 81 can be improved. Thus, connection defects caused by disconnection can be inhibited. Alternatively, an increase in electrical resistance, which is caused by local thinning of the common electrode 81 due to the step, can be inhibited.

To improve the planarity of the formation surface of the common layer 89 and the common electrode 81, the top surfaces of the insulating layers 94 and the top surfaces of the insulating layers 96 are preferably level or substantially level with the top surface of at least one of the electron-transport layer 88R, the electron-transport layer 88G, and the electron-transport layer 88B. Although the top surface of the insulating layer 96 preferably has a flat surface, a projection or a depressed portion may be provided.

The insulating layers 94 have regions in contact with the side surfaces of the light-emitting layer 87R, the light-emitting layer 87G, and the light-emitting layer 87B and function as protective insulating layers for the light-emitting layer 87R, the light-emitting layer 87G, and the light-emitting layer 87B. Providing the insulating layers 94 can inhibit entry of impurities (e.g., oxygen and moisture) through the side surfaces of the light-emitting layer 87R, the light-emitting layer 87G, and the light-emitting layer 87B, whereby the display device can have high reliability.

When the insulating layers 94 have large widths (thicknesses) in the regions in contact with the side surfaces of the light-emitting layer 87R, the light-emitting layer 87G, and the light-emitting layer 87B in a cross-sectional view, the gaps between the light-emitting layer 87R, the light-emitting layer 87G, and the light-emitting layer 87B increase to cause a reduction in the aperture ratio in some cases. When the insulating layers 94 have small widths (thicknesses) in the regions in contact with the side surfaces of the light-emitting layer 87R, the light-emitting layer 87G, and the light-emitting layer 87B in a cross-sectional view, entry of impurities through the side surfaces of the light-emitting layer 87R, the light-emitting layer 87G, and the light-emitting layer 87B cannot be effectively inhibited in some cases. In a cross-sectional view, the widths (thicknesses) of the insulating layers 94 in the regions in contact with the side surfaces of the light-emitting layer 87R, the light-emitting layer 87G, and the light-emitting layer 87B are each preferably greater than or equal to 3 nm and less than or equal to 200 nm, further preferably greater than or equal to 3 nm and less than or equal to 150 nm, still further preferably greater than or equal to 5 nm and less than or equal to 150 nm, still further preferably greater than or equal to 5 nm and less than or equal to 100 nm, still further preferably greater than or equal to 10 nm and less than or equal to 100 nm, yet still further preferably greater than or equal to 10 nm and less than or equal to 50 nm. When the widths (thicknesses) of the insulating layers 94 are within the above range, a highly reliable display device with a high aperture ratio can be obtained.

The insulating layer 94 can be formed using an inorganic material. For the insulating layer 94, an inorganic insulating film such as an oxide insulating film, a nitride insulating film, an oxynitride insulating film, or a nitride oxide insulating film can be used, for example. The insulating layer 94 may have a single-layer structure or a stacked-layer structure. Examples of the oxide insulating film include a silicon oxide film, an aluminum oxide film, a magnesium oxide film, an indium-gallium-zinc oxide film, a gallium oxide film, a germanium oxide film, an yttrium oxide film, a zirconium oxide film, a lanthanum oxide film, a neodymium oxide film, a hafnium oxide film, and a tantalum oxide film. Examples of the nitride insulating film include a silicon nitride film and an aluminum nitride film. Examples of the oxynitride insulating film include a silicon oxynitride film and an aluminum oxynitride film. Examples of the nitride oxide insulating film include a silicon nitride oxide film and an aluminum nitride oxide film. In particular, aluminum oxide is preferably used because it has high selectivity with respect to the light-emitting layer in etching and has a function of protecting the light-emitting layer when the insulating layer 96 is formed in a later step. An inorganic insulating film such as an aluminum oxide film, a hafnium oxide film, or a silicon oxide film is formed by an ALD method as the insulating layer 94, whereby the insulating layer 94 can have few pinholes and an excellent function of protecting the light-emitting layer.

Note that in this specification and the like, oxynitride refers to a material that contains oxygen at a higher proportion than nitrogen, and nitride oxide refers to a material that contains nitrogen at a higher proportion than oxygen. For example, silicon oxynitride refers to a material which contains oxygen at a higher proportion than nitrogen, and silicon nitride oxide refers to a material which contains nitrogen at a higher proportion than oxygen.

The insulating layer 94 can be formed by a sputtering method, a CVD method, a PLD method, an ALD method, or the like. The insulating layer 94 is preferably formed by an ALD method achieving good coverage.

The insulating layer 96 over the insulating layer 94 has a function of reducing the depressed portion in the insulating layer 94 formed between adjacent light-emitting devices. In other words, the insulating layer 96 brings about an effect of improving the planarity of a surface where the common electrode 81 is formed. As the insulating layer 96, an insulating layer containing an organic material can be favorably used. Examples of a material used for the insulating layer 96 include an acrylic resin, a polyimide resin, an epoxy resin, an imide resin, a polyamide resin, a polyimide-amide resin, a silicone resin, a siloxane resin, a benzocyclobutene-based resin, a phenol resin, and precursors of these resins. Examples of an organic material used for the insulating layer 96 include polyvinyl alcohol (PVA), polyvinyl butyral, polyvinylpyrrolidone, polyethylene glycol, polyglycerin, pullulan, water-soluble cellulose, and an alcohol-soluble polyamide resin. Alternatively, a photosensitive resin (also referred to as an organic resin) can be used as the insulating layer 96. A photoresist may be used for the photosensitive resin. As the photosensitive resin, a positive photosensitive material or a negative photosensitive material can be used.

The difference between the level of the top surface of the insulating layer 96 and the level of the top surface of any of the light-emitting layer 87R, the light-emitting layer 87G, and the light-emitting layer 87B is preferably less than or equal to 0.5 times the thickness of the insulating layer 96, further preferably less than or equal to 0.3 times the thickness of the insulating layer 96, for example. The insulating layer 96 may be provided such that the level of the top surface of any of the light-emitting layer 87R, the light-emitting layer 87G, and the light-emitting layer 87B is higher than the level of the top surface of the insulating layer 96, for example. Alternatively, for example, the insulating layer 96 may be provided such that the level of the top surface of the insulating layer 96 is higher than the level of the top surface of any of the light-emitting layer 87R, the light-emitting layer 87G, and the light-emitting layer 87B.

In the display device 100, the pixel 80 is formed of the sub-pixel including the light-emitting element 61R, the sub-pixel including the light-emitting element 61G, the sub-pixel including the light-emitting element 61B, the sub-pixel including the light-emitting element 61IR, and the sub-pixel including the light-receiving element 62; however, one embodiment of the present invention is not limited to this structure. FIGS. 21A and 21B, FIGS. 22A and 22B, and FIGS. 23A and 23B show display devices that are different from the display device 100 shown in FIG. 18A and the like.

Figure 21A:
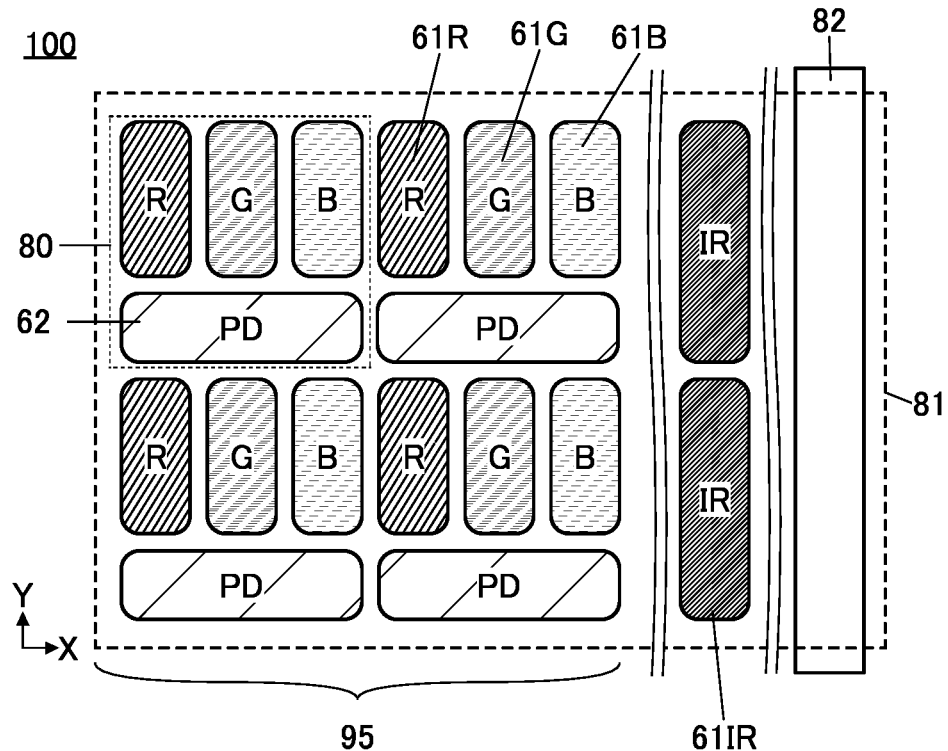
FIGS. 21A and 21B each show a structure example of a display device.
Figure 21B:
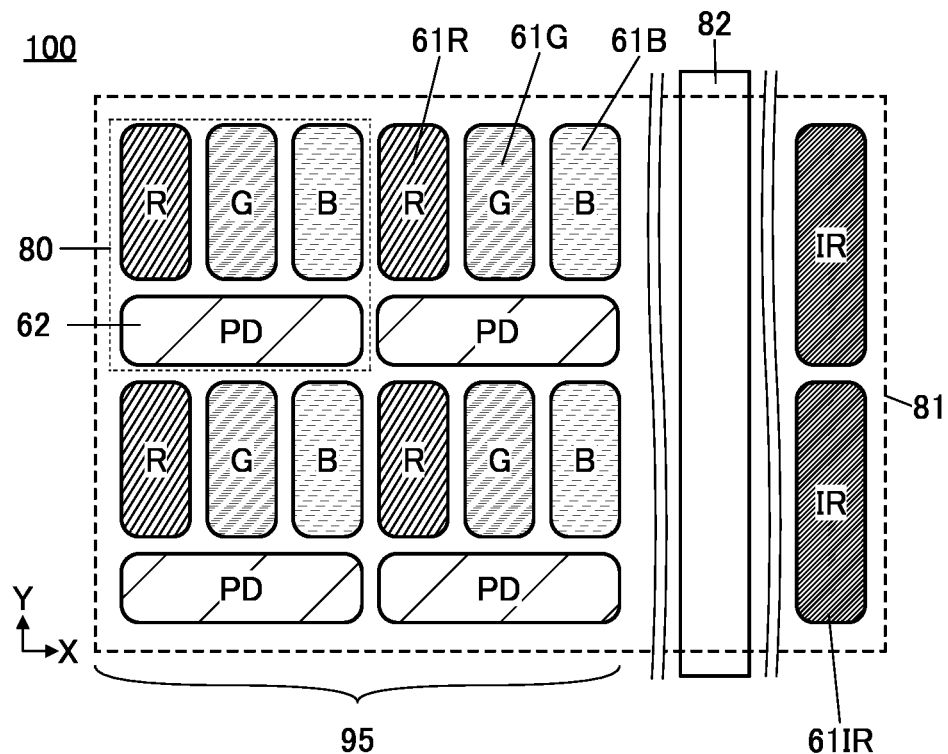

The display device 100 shown in FIG. 21A is different from that shown in FIG. 18A in that the pixel 80 is formed of the light-emitting element 61R, the light-emitting element 61G, the light-emitting element 61B, and the light-receiving element 62. In this case, the light-emitting element 61IR is preferably provided between a display region 95 and the connection electrode 82. Alternatively, the light-emitting element 61IR may be provided outside the display region 95 and the connection electrode 82 as shown in FIG. 21B. In this case, the light-receiving element 62 can be formed to have a larger area, whereby the light detection sensitivity of the light-receiving element 62 can be enhanced.

In the display device 100 shown in FIG. 21A, a plurality of light-emitting elements 61IR can be provided along the outer periphery of the display region 95. For example, the plurality of light-emitting elements 61IR may be provided along one side of the outer periphery of the display region 95 or two or more sides of the outer periphery of the display region 95. That is, in the case where the display region 95 has a rectangular top surface, the light-emitting elements 61IR in a top view can be arranged in a band shape, an L shape, a square bracket shape, a quadrangular shape, or the like.

In the display device 100 shown in FIG. 21B, the plurality of light-emitting elements 61IR can be provided along the outer periphery of the connection electrode 82. For example, the plurality of light-emitting elements 61IR may be provided along one side of the outer periphery of the connection electrode 82 or two or more sides of the outer periphery of the connection electrode 82. That is, in the case where the connection electrode 82 has a rectangular top surface, the light-emitting elements 61IR in a top view can be arranged in a band shape, an L shape, a square bracket shape, a quadrangular shape, or the like.

Although FIGS. 21A and 21B show examples in which the width of the light-emitting element 61IR in the Y direction is substantially the same as the width of the pixel 80 in the Y direction, one embodiment of the present invention is not limited to these examples. The width of the light-emitting element 61IR in the Y direction may be larger or smaller than the width of the pixel 80 in the Y direction. Although FIGS. 21A and 21B show examples in which the number of the light-emitting elements 61IR is the same as that of the pixels 80 in the Y direction, one embodiment of the present invention is not limited to the examples. The number of the light-emitting elements 61IR in the Y direction may be different from that of the pixels 80 in the Y direction and may be one or more. Although FIGS. 21A and 21B show examples in which the number of the light-emitting elements 61IR in the X direction is one, one embodiment of the present invention is not limited to these examples. The number of the light-emitting elements 61IR in the X direction may be two or more.

Figure 22A:
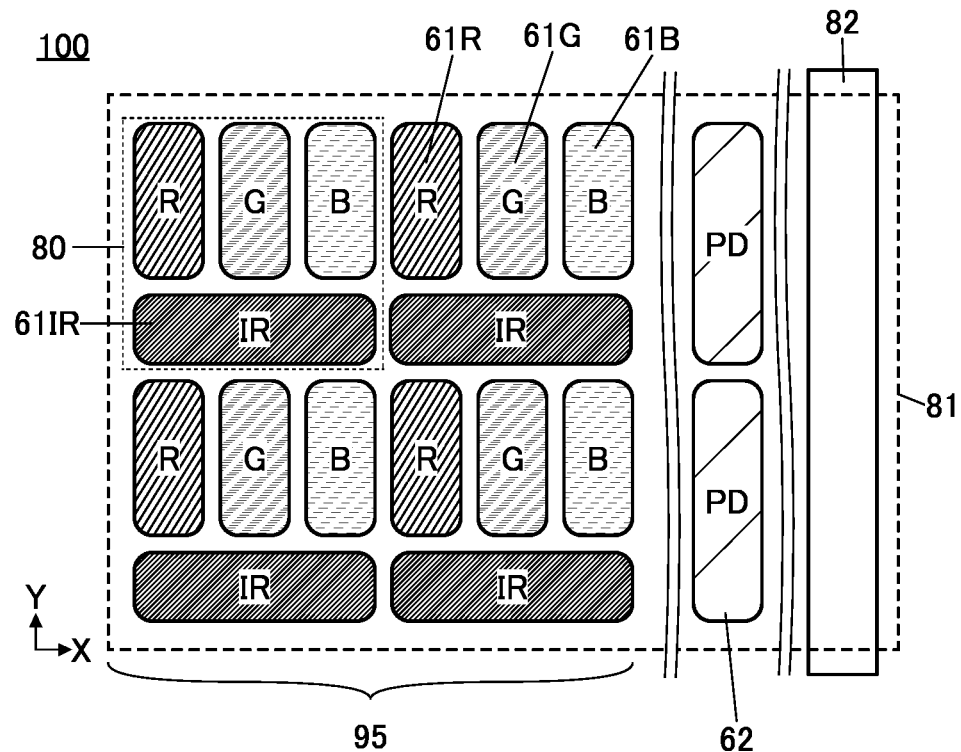
FIGS. 22A and 22B each show a structure example of a display device.
Figure 22B:
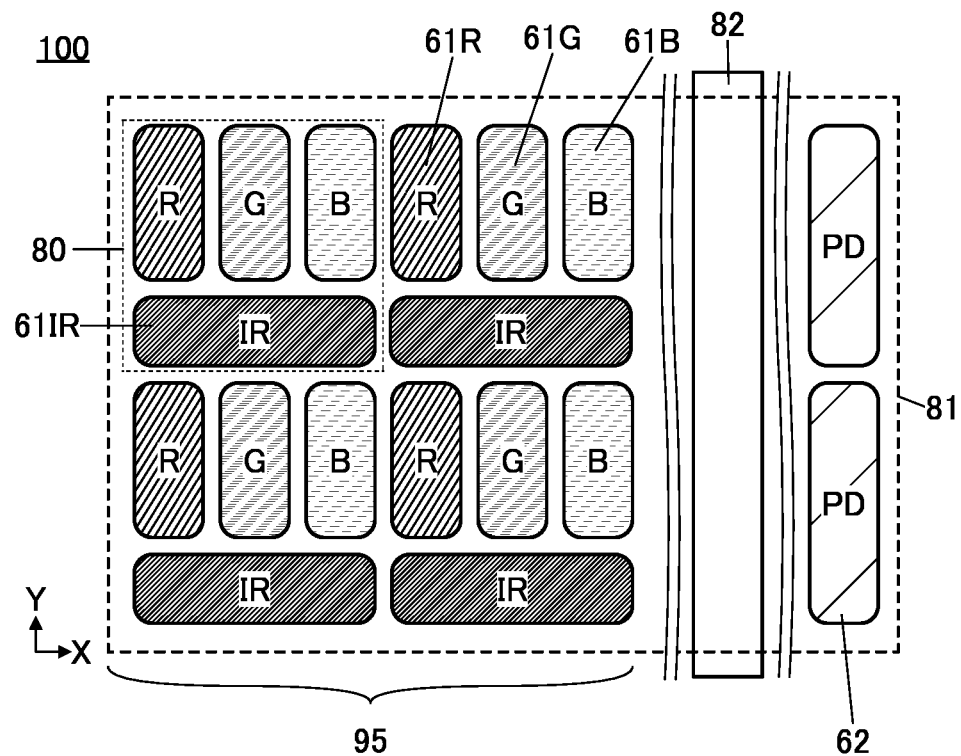

The display device 100 shown in FIG. 22A is different from that shown in FIG. 18A in that the pixel 80 is formed of the light-emitting element 61R, the light-emitting element 61G, the light-emitting element 61B, and the light-receiving element 61IR. In this case, the light-receiving element 62 is preferably provided between the display region 95 and the connection electrode 82. Alternatively, the light-receiving element 62 may be provided outside the display region 95 and the connection electrode 82 as shown in FIG. 22B. In this case, the light-receiving element 62 can be formed to have a larger area, whereby the light detection sensitivity of the light-receiving element 62 can be enhanced.

In the display device 100 shown in FIG. 22A, a plurality of light-receiving elements 62 can be provided along the outer periphery of the display region 95. For example, the plurality of light-receiving elements 62 may be provided along one side of the outer periphery of the display region 95 or two or more sides of the outer periphery of the display region 95. That is, in the case where the display region 95 has a rectangular top surface, the light-receiving elements 62 in a top view can be arranged in a band shape, an L shape, a square bracket shape, a quadrangular shape, or the like.

In the display device 100 shown in FIG. 22B, the plurality of light-receiving elements 62 can be provided along the outer periphery of the connection electrode 82. For example, the plurality of light-receiving elements 62 may be provided along one side of the outer periphery of the connection electrode 82 or two or more sides of the outer periphery of the connection electrode 82. That is, in the case where the connection electrode 82 has a rectangular top surface, the light-receiving elements 62 in a top view can be arranged in a band shape, an L shape, a square bracket shape, a quadrangular shape, or the like.

Although FIGS. 22A and 22B show examples in which the width of the light-receiving element 62 in the Y direction is substantially the same as the width of the pixel 80 in the Y direction, one embodiment of the present invention is not limited to these examples. The width of the light-receiving element 62 in the Y direction may be larger or smaller than the width of the pixel 80 in the Y direction. Although FIGS. 22A and 22B show examples in which the number of the light-receiving elements 62 is the same as that of the pixels 80 in the Y direction, one embodiment of the present invention is not limited to the examples. The number of the light-receiving elements 62 in the Y direction may be different from that of the pixels 80 in the Y direction and may be one or more. Although FIGS. 22A and 22B show examples in which the number of the light-receiving elements 62 in the X direction is one, one embodiment of the present invention is not limited to these examples. The number of the light-receiving elements 62 in the X direction may be two or more.

Figure 23A:
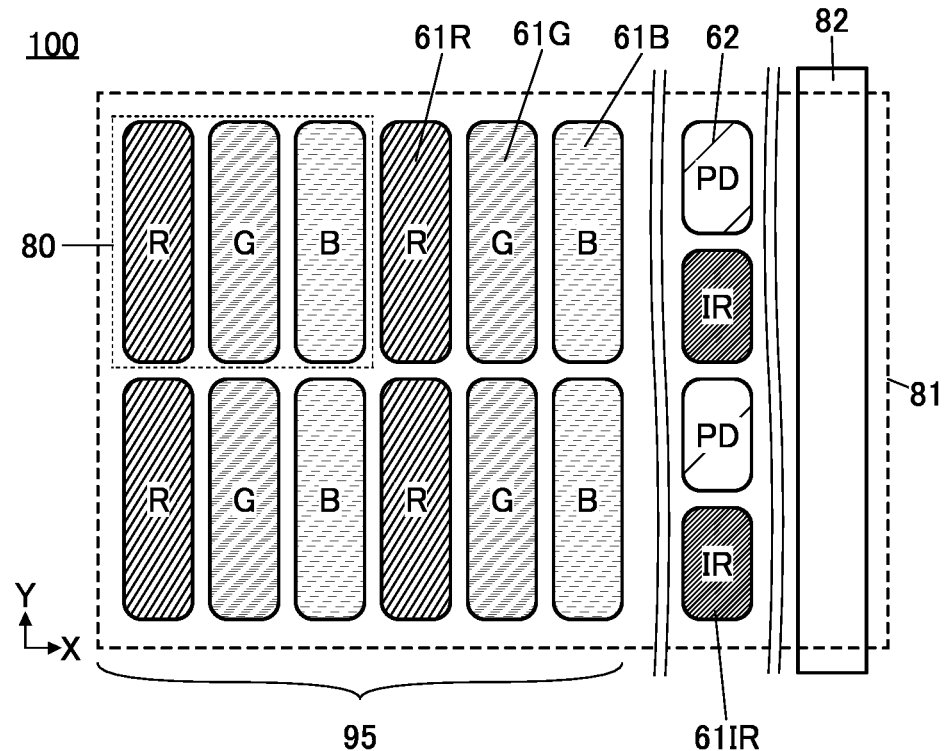
FIGS. 23A and 23B each illustrate a structure example of a display device.
Figure 23B:
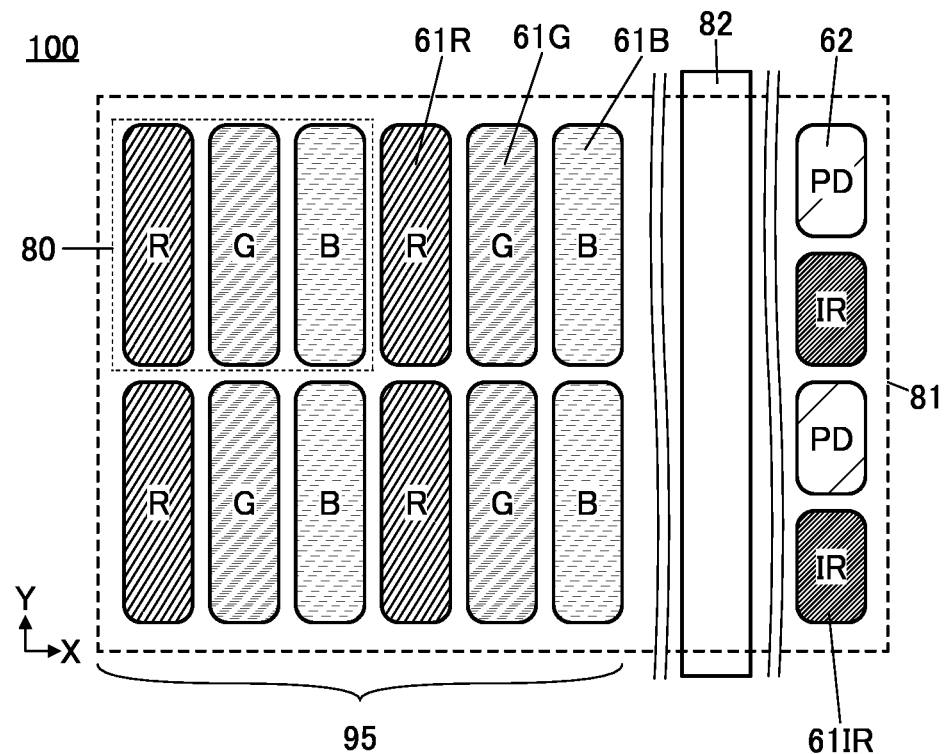

The display device 100 shown in FIG. 23A is different from that shown in FIG. 18A in that the pixel 80 is formed of the light-emitting element 61R, the light-emitting element 61G, and the light-emitting element 61B. In this case, the light-emitting element 61IR and the light-receiving element 62 are preferably provided between the display region 95 and the connection electrode 82. Alternatively, the light-emitting element 61IR and the light-receiving element 62 may be provided outside the display region 95 and the connection electrode 82 as shown in FIG. 23B. In this case, the length of each of the light-emitting element 61R, the light-emitting element 61G, and the light-emitting element 61B in the Y direction can be large, whereby the luminance of light emitted by the pixel 80 can be increased.

In the display device 100 shown in FIG. 23A, the plurality of light-emitting elements 611R and the plurality of light-receiving elements 62 can be provided along the outer periphery of the display region 95. For example, the plurality of light-emitting elements 611R and the plurality of light-receiving elements 62 may be provided along one side of the outer periphery of the display region 95 or two or more sides of the outer periphery of the display region 95. That is, in the case where the display region 95 has a rectangular top surface, the light-emitting elements 611R in a top view and the light-receiving elements 62 in a top view can each be arranged in a band shape, an L shape, a square bracket shape, a quadrangular shape, or the like. The positions in which the light-emitting elements 61IR are arranged may be different from the positions in which the light-receiving elements 62 are arranged. For example, the light-emitting elements 61IR in a top view may be arranged along two opposite sides of the display region 95 and the light-receiving elements 62 in a top view may be arranged along the other two sides.

In the display device 100 shown in FIG. 23B, the plurality of light-emitting elements 611R and the plurality of light-receiving elements 62 can be provided along the outer periphery of the connection electrode 82. For example, the plurality of light-emitting elements 611R and the plurality of light-receiving elements 62 may be provided along one side of the outer periphery of the connection electrode 82 or two or more sides of the outer periphery of the connection electrode 82. That is, in the case where the connection electrode 82 has a rectangular top surface, the light-emitting elements 611R in a top view and the light-receiving elements 62 in a top view can each be arranged in a band shape, an L shape, a square bracket shape, a quadrangular shape, or the like. The positions in which the light-emitting elements 611R are arranged may be different from the positions in which the light-receiving elements 62 are arranged. For example, the light-emitting elements 611R in a top view may be arranged along two opposite sides of the connection electrode 82 and the light-receiving elements 62 in a top view may be arranged along the other two sides.

Although FIGS. 23A and 23B show examples in which the sum of the width of the light-emitting element 611R in the Y direction and the width of the light-receiving element 62 in the Y direction is substantially the same as the width of the pixel 80 in the Y direction, one embodiment of the present invention is not limited to these examples. The width of each of the light-emitting element 611R and the light-receiving element 62 in the Y direction may be larger or smaller than the width of the pixel 80 in the Y direction. Although FIGS. 23A and 23B show examples in which the number of the light-emitting elements 611R, that of the light-receiving elements 62, and that of the pixels 80 are the same in the Y direction, one embodiment of the present invention is not limited to the examples. The number of the light-emitting elements 611R and that of the light-receiving elements 62 in the Y direction may be different from that of the pixels 80 in the Y direction and may be one or more. In addition, the number of the light-emitting elements 611R and that of the light-receiving elements 62 in the Y direction may be different from each other. Although FIGS. 23A and 23B show examples in which the number of the light-emitting elements 611R in the X direction is one and the number of the light-receiving elements 62 in the X direction is one, one embodiment of the present invention is not limited to these examples. The number of the light-emitting elements 61IR and the number of the light-receiving elements 62 in the X direction may each be two or more.

<Structure Example of Light-Emitting Element>

Figure 24A:
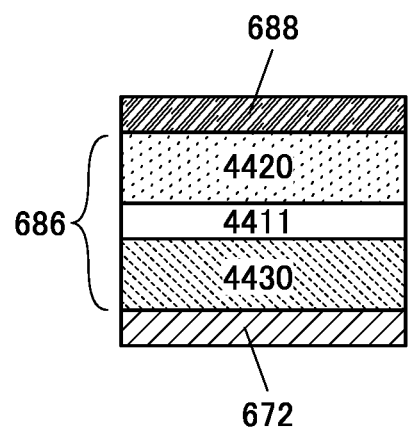
FIGS. 24A to 24D each show a structure example of a light-emitting element.

The light-emitting element illustrated in FIG. 24A includes a functional layer 686 between a pair of electrodes (an electrode 672 and an electrode 688). The functional layer 686 can be formed of a plurality of layers such as a layer 4420, a light-emitting layer 4411, and a layer 4430. The layer 4420 can include, for example, a layer containing a substance with a high electron-injection property (electron-injection layer) and a layer containing a substance with a high electron-transport property (electron-transport layer). The light-emitting layer 4411 contains a light-emitting compound, for example. The layer 4430 can include, for example, a layer containing a substance with a high hole-injection property (hole-injection layer) and a layer containing a substance with a high hole-transport property (hole-transport layer).

The structure including the layer 4420, the light-emitting layer 4411, and the layer 4430, which is provided between the pair of electrodes, can function as a single light-emitting unit, and the structure in FIG. 24A is referred to as a single structure in this specification.

Figure 24B:
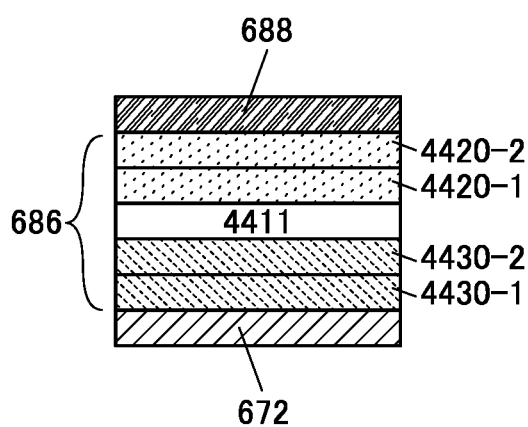

FIG. 24B is a modification example of the functional layer 686 included in the light-emitting element illustrated in FIG. 24A. Specifically, the light-emitting element illustrated in FIG. 24B includes a layer 4430-1 over the electrode 672, a layer 4430-2 over the layer 4430-1, the light-emitting layer 4411 over the layer 4430-2, a layer 4420-1 over the light-emitting layer 4411, a layer 4420-2 over the layer 4420-1, and the electrode 688 over the layer 4420-2. For example, in the case where the electrode 672 is an anode and the electrode 688 is a cathode, the layer 4430-1 functions as a hole-injection layer, the layer 4430-2 functions as a hole-transport layer, the layer 4420-1 functions as an electron-transport layer, and the layer 4420-2 functions as an electron-injection layer. Alternatively, in the case where the electrode 672 is as a cathode and the electrode 688 is an anode, the layer 4430-1 functions as an electron-injection layer, the layer 4430-2 functions as an electron-transport layer, the layer 4420-1 functions as a hole-transport layer, and the layer 4420-2 functions as a hole-injection layer. With such a layered structure, carriers can be efficiently injected into the light-emitting layer 4411, so that the efficiency of carrier recombination in the light-emitting layer 4411 can be increased.

Figure 24C:
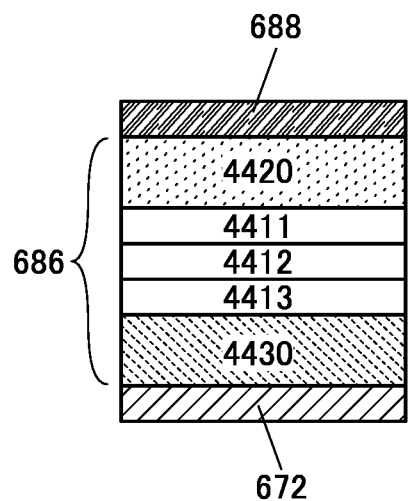

The structure in which a plurality of light-emitting layers (light-emitting layers 4411, 4412, and 4413) is provided between the layer 4420 and the layer 4430 as illustrated in FIG. 24C is another modification example of the single structure.

Figure 24D:
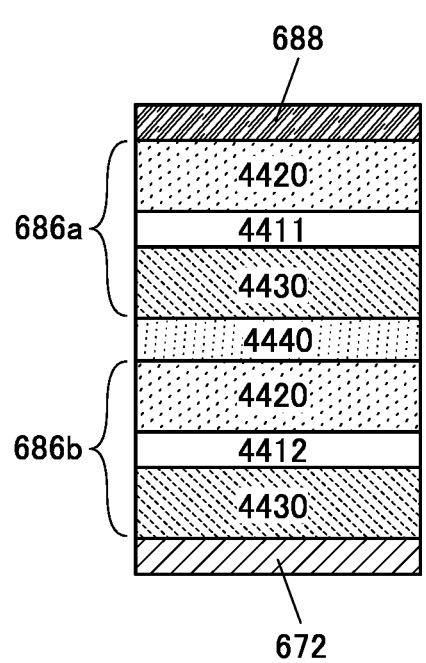

The structure in which a plurality of light-emitting units (functional layers 686a and 686b) are connected in series with an intermediate layer (charge-generation layer) 4440 therebetween as illustrated in FIG. 24D is referred to as a tandem structure in this specification. The tandem structure may be referred to as a stack structure. The tandem structure enables a light-emitting element capable of high luminance light emission.

In FIGS. 24C and 24D, the layer 4420 and the layer 4430 may each have a stacked-layer structure of two or more layers as in FIG. 24B.

A structure in which light-emitting layers (e.g., red (R)-, green (G)-, and blue (B)-light-emitting layers) of light-emitting elements are separately formed is referred to as the SBS structure.

In the case where the single structure and the tandem structure described above and the SBS structure are compared with each other, the SBS structure, the tandem structure, and the single structure have lower consumption in this order. To reduce power consumption, the SBS structure is preferably employed. Meanwhile, the single structure and the tandem structure are preferable in terms of lower manufacturing cost or higher manufacturing yield because the manufacturing processes for the single structure and the tandem structure are simpler than that for the SBS structure.

The emission color of the light-emitting element can be red, green, blue, cyan, magenta, yellow, white, or the like depending on the material of the light-emitting layer 4411. When the light-emitting element has a microcavity structure, the color purity can be further increased.

In a light-emitting element that emits white light, a light-emitting layer preferably contains two or more kinds of light-emitting substances. To obtain white light emission, the two or more kinds of light-emitting substances are selected so as to emit light of complementary colors. For example, the emission colors of first and second light-emitting layers are complementary, so that the light-emitting element can emit white light as a whole. This can be applied to a light-emitting element including three or more light-emitting layers.

A light-emitting layer preferably contains two or more selected from light-emitting substances that emit light of red (R), green (G), blue (B), yellow (Y), orange (O), and the like. Alternatively, a light-emitting layer preferably contains two or more light-emitting substances each of which emits light containing two or more of spectral components of R, G, and B.

<Structure Example of Light-Emitting Element and Light-Receiving Element>

The display device of one embodiment of the present invention is a top-emission display device where light is emitted in the direction opposite to a substrate over which light-emitting elements are formed. In this embodiment, a top-emission display device provided with light-emitting elements and a light-receiving element will be described as an example.

In this specification and the like, unless otherwise specified, in describing a common part of a plurality of components (e.g., light-emitting elements and light-emitting layers) included in a structure, alphabets are omitted. For example, when a common part of a light-emitting layer 383R, a light-emitting layer 383G, and the like is described, the term "light-emitting layer 383" is used in some cases.

Figure 25:
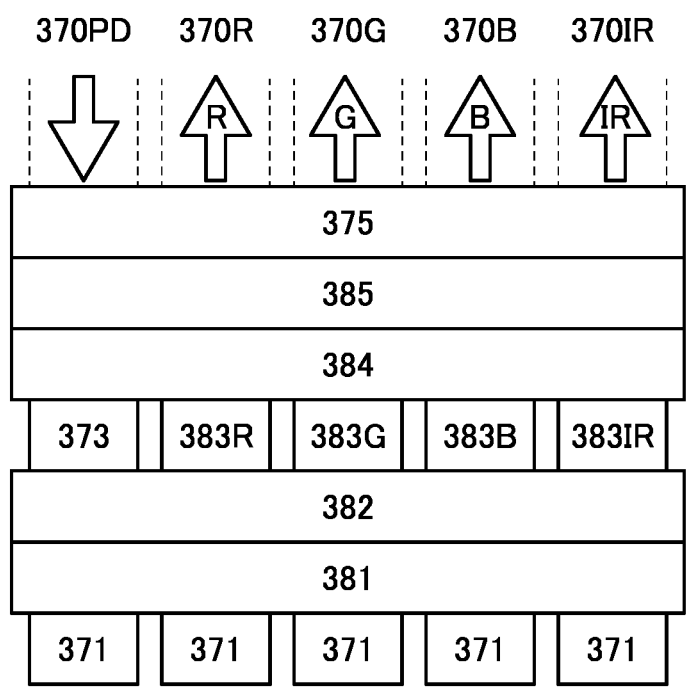
FIG. 25 shows a structure example of a display device.

A display device 380A illustrated in FIG. 25 includes a light-receiving element 370PD, a light-emitting element 370R which emits red (R) light, a light-emitting element 370G which emits green (G) light, a light-emitting element 370B which emits blue (B) light, and a light-emitting element 370IR which emits infrared light (IR).

Each of the light-emitting elements includes a pixel electrode 371, a hole-injection layer 381, a hole-transport layer 382, a light-emitting layer, an electron-transport layer 384, an electron-injection layer 385, and a common electrode 375 which are stacked in this order. The light-emitting element 370R includes a light-emitting layer 383R, the light-emitting element 370G includes a light-emitting layer 383G, the light-emitting element 370B includes a light-emitting layer 383B, and the light-emitting element 370IR includes a light-emitting layer 383IR. The light-emitting layer 383R includes a light-emitting substance which emits red light, the light-emitting layer 383G includes a light-emitting substance which emits green light, the light-emitting layer 383B includes a light-emitting substance which emits blue light, and the light-emitting layer 383IR includes a light-emitting substance which emits infrared light.

The light-emitting elements are electroluminescent elements which emit light to the common electrode 375 side on voltage application between the pixel electrode 371 and the common electrode 375.

The light-receiving element 370PD includes the pixel electrode 371, the hole-injection layer 381, the hole-transport layer 382, an active layer 373, the electron-transport layer 384, the electron-injection layer 385, and the common electrode 375 which are stacked in this order.

The light-receiving element 370PD is a photoelectric conversion element that receives light incident from the outside of the display device 380A and converts the light into an electrical signal.

This embodiment is described assuming that the pixel electrodes 371 function as anodes and the common electrode 375 functions as a cathode in the light-emitting elements and the light-receiving element. In other words, the light-receiving element is driven by application of reverse bias between the pixel electrode 371 and the common electrode 375, whereby light incident on the light-receiving element can be detected and electric charge can be generated and extracted as a current.

In the display device of this embodiment, an organic compound is used for the active layer 373 of the light-receiving element 370PD. The light-receiving element 370PD can share the layers other than the active layer 373 with the light-emitting elements. Therefore, the light-receiving element 370PD can be formed concurrently with the formation of the light-emitting elements only by adding a step of forming the active layer 373 in the manufacturing process of the light-emitting elements. The light-emitting elements and the light-receiving element 370PD can be formed over one substrate. Accordingly, the light-receiving element 370PD can be incorporated into the display device without a significant increase in the number of manufacturing steps.

In the display device 380A, for example, the light-receiving element 370PD and the light-emitting elements have a common structure except that the active layer 373 of the light-receiving element 370PD and the light-emitting layer 383 of the light-emitting elements are separately formed. The structures of the light-receiving element 370PD and the light-emitting elements are not limited thereto. The light-receiving element 370PD and the light-emitting elements may have separately formed layers in addition to the active layer 373 and the light-emitting layer 383. The light-receiving element 370PD and the light-emitting elements preferably include at least one layer used in common (common layer). Thus, the light-receiving element 370PD can be incorporated into the display device without a significant increase in the number of manufacturing steps.

A conductive film that transmits visible light is used as the electrode through which light is extracted, which is either the pixel electrode 371 or the common electrode 375. A conductive film that reflects visible light is preferably used as the electrode through which light is not extracted.

The light-emitting elements included in the display device of this embodiment preferably employ a micro-optical resonator (microcavity) structure. Therefore, one of the pair of electrodes of the light-emitting elements is preferably an electrode having properties of transmitting and reflecting visible light (transflective electrode), and the other is preferably an electrode having a property of reflecting visible light (reflective electrode). When the light-emitting elements have a microcavity structure, light obtained from the light-emitting layers can be resonated between the electrodes, whereby light emitted from the light-emitting elements can be intensified.

The light-emitting element includes at least the light-emitting layer 383. In addition to the light-emitting layer 383, the light-emitting element may further include a layer containing any of a substance with a high hole-injection property, a substance with a high hole-transport property, a hole-blocking material, a substance with a high electron-transport property, a substance with a high electron-injection property, an electron-blocking material, a substance with a bipolar property (a substance with high electron- and hole-transport properties), and the like.

For example, the light-emitting elements and the light-receiving element can share at least one of the hole-injection layer, the hole-transport layer, the electron-transport layer, and the electron-injection layer. At least one of the hole-injection layer, the hole-transport layer, the electron-transport layer, and the electron-injection layer can be separately formed for the light-emitting elements and the light-receiving element.

In the light-receiving element, the hole-transport layer transports holes generated in the active layer on the basis of incident light, to the anode. In the light-receiving element, the electron-transport layer transports electrons generated in the active layer on the basis of incident light, to the cathode.

Note that the above description can be referred to for the hole-injection layer, the hole-transport layer, the electron-transport layer, the electron-injection layer, and the light-emitting layer.

The active layer 373 includes a semiconductor. Examples of the semiconductor include an inorganic semiconductor such as silicon and an organic semiconductor including an organic compound. This embodiment shows an example in which an organic semiconductor is used as the semiconductor included in the active layer 373. The use of an organic semiconductor is preferable because the light-emitting layer 383 and the active layer 373 can be formed by the same method (e.g., a vacuum evaporation method) and thus the same manufacturing apparatus can be used.

Examples of an n-type semiconductor material included in the active layer 373 include electron-accepting organic semiconductor materials such as fullerene (e.g., $C_{60}$ and $C_{70}$) and fullerene derivatives. Fullerene has a soccer ball-like shape, which is energetically stable. Both the HOMO level and the LUMO level of fullerene are deep (low). Having a deep LUMO level, fullerene has an extremely high electron-accepting property (acceptor property). When π-electron conjugated (resonance) spreads in a plane as in benzene, the electron-donating property (donor property) usually increases. Although π-electron conjugated widely spreads in fullerene having a spherical shape, its electron-accepting property is high. The high electron-accepting property efficiently causes rapid charge separation and is useful for the light-receiving element. Both $C_{60}$ and $C_{70}$ have a wide absorption band in the visible light region, and $C_{70}$ is especially preferable because of having a larger π-electron conjugated system and a wider absorption band in the long wavelength region than $C_{60}$. Other examples of fullerene derivatives include [6,6]-phenyl-$C_{71}$-butyric acid methyl ester (abbreviation: $PC_{70}BM$), [6,6]-phenyl-$C_{61}$-butyric acid methyl ester (abbreviation: $PC_{60}BM$), and 1',1'',4',4''-tetrahydro-di[1,4]methanonaphthaleno[1,2:2',3',56,60:2'',3''][5,6]fullerene-$C_{60}$ (abbreviation: ICBA).

Other examples of an n-type semiconductor material include a metal complex having a quinoline skeleton, a metal complex having a benzoquinoline skeleton, a metal complex having an oxazole skeleton, a metal complex having a thiazole skeleton, an oxadiazole derivative, a triazole derivative, an imidazole derivative, an oxazole derivative, a thiazole derivative, a phenanthroline derivative, a quinoline derivative, a benzoquinoline derivative, a quinoxaline derivative, a dibenzoquinoxaline derivative, a pyridine derivative, a bipyridine derivative, a pyrimidine derivative, a naphthalene derivative, an anthracene derivative, a coumarin derivative, a rhodamine derivative, a triazine derivative, and a quinone derivative.

Examples of a p-type semiconductor material contained in the active layer 373 include electron-donating organic semiconductor materials such as copper(II) phthalocyanine (CuPc), tetraphenyldibenzoperiflanthene (DBP), zinc phthalocyanine (ZnPc), tin phthalocyanine (SnPc), and quinacridone.

Examples of a p-type semiconductor material include a carbazole derivative, a thiophene derivative, a furan derivative, and a compound having an aromatic amine skeleton. Other examples of the p-type semiconductor material include a naphthalene derivative, an anthracene derivative, a pyrene derivative, a triphenylene derivative, a fluorene derivative, a pyrrole derivative, a benzofuran derivative, a benzothiophene derivative, an indole derivative, a dibenzofuran derivative, a dibenzothiophene derivative, an indolocarbazole derivative, a porphyrin derivative, a phthalocyanine derivative, a naphthalocyanine derivative, a quinacridone derivative, a polyphenylene vinylene derivative, a polyparaphenylene derivative, a polyfluorene derivative, a polyvinylcarbazole derivative, and a polythiophene derivative.

The HOMO level of the electron-donating organic semiconductor material is preferably shallower (higher) than the HOMO level of the electron-accepting organic semiconductor material. The LUMO level of the electron-donating organic semiconductor material is preferably shallower (higher) than the LUMO level of the electron-accepting organic semiconductor material.

Fullerene having a spherical shape is preferably used as the electron-accepting organic semiconductor material, and an organic semiconductor material having a substantially planar shape is preferably used as the electron-donating organic semiconductor material. Molecules of similar shapes tend to aggregate, and aggregated molecules of similar kinds, which have molecular orbital energy levels close to each other, can increase the carrier-transport property.

For example, the active layer 373 is preferably formed by co-evaporation of an n-type semiconductor and a p-type semiconductor. Alternatively, the active layer 373 may be formed by stacking an n-type semiconductor and a p-type semiconductor.

Either a low molecular compound or a high molecular compound can be used for the light-emitting elements and the light-receiving element, and an inorganic compound may also be included. Each of the layers included in the light-emitting elements and the light-receiving element can be formed by any of the following methods: an evaporation method (including a vacuum evaporation method), a transfer method, a printing method, an inkjet method, a coating method, and the like.

As the hole-transport material, a high molecular compound such as poly(3,4-ethylenedioxythiophene)/poly(styrenesulfonic acid) (PEDOT/PSS), or an inorganic compound such as a molybdenum oxide or copper iodide (CuI) can be used, for example. As the electron-transport material, an inorganic compound such as zinc oxide (ZnO) can be used.

For the active layer 373, a high molecular compound such as poly[[4,8-bis[5-(2-ethylhexyl)-2-thienyl]benzo[1,2-b:4,5-b']dithiophene-2,6-diyl]-2,5-thiophenediyl[5,7-bis(2-ethylhexyl)-4,8-dioxo-4H,8H-benzo[1,2-c:4,5-c']dithiophene-1,3-diyl]] polymer (abbreviation: PBDB-T) or a PBDB-T derivative, which functions as a donor, can be used. For example, a method in which an acceptor material is dispersed to PBDB-T or a PBDB-T derivative can be used.

The active layer 373 may contain a mixture of three or more kinds of materials. For example, a third material may be mixed with an n-type semiconductor material and a p-type semiconductor material in order to extend the wavelength range. The third material may be a low molecular compound or a high molecular compound.

<Structure Example of Display Device>

Figure 26:
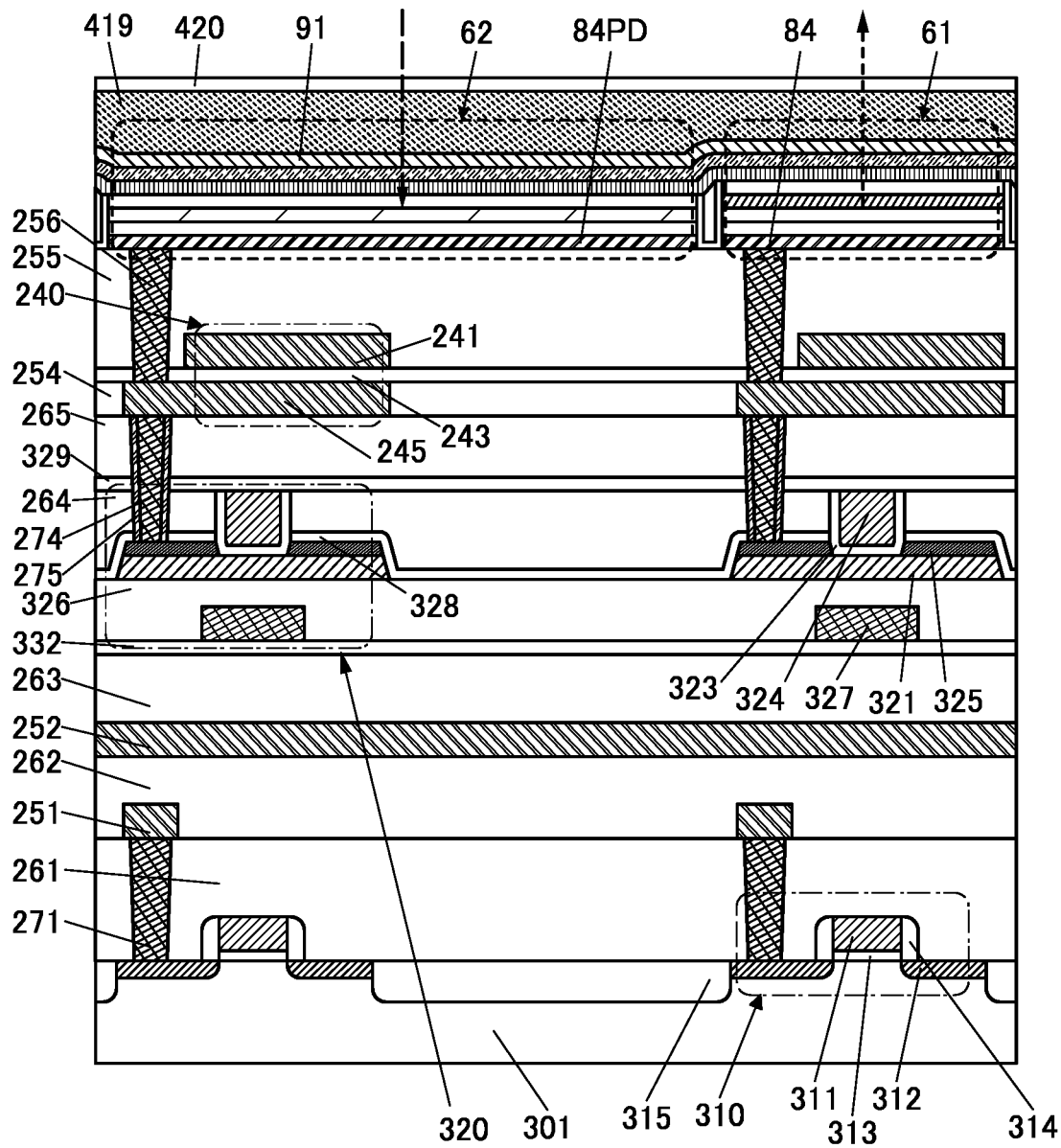
FIG. 26 shows a structure example of a display device.

FIG. 26 is a cross-sectional view illustrating a structure example of the display device 100. The display device 100 has a structure in which a transistor 310 whose channel is formed in a substrate 301 and a transistor 320 including a metal oxide in a semiconductor layer where a channel is formed are stacked. The display device 100 further includes the light-emitting element 61 and the light-receiving element 62 over the transistor 320. The light-emitting element 61 is capable of emitting light in the direction denoted with the dashed line, and the light-receiving element 62 is capable of receiving light in the direction denoted with the dashed-dotted line. Although not shown, the display device 100 preferably includes the light-emitting element (IR) that is formed in the same steps as the light-emitting element 61.

An insulating layer 261 is provided so as to cover the transistor 310, and a conductive layer 251 is provided over the insulating layer 261. The insulating layer 262 is provided so as to cover the conductive layer 251, and a conductive layer 252 is provided over the insulating layer 262. The conductive layer 251 and the conductive layer 252 each function as a wiring. An insulating layer 263 and an insulating layer 332 are provided so as to cover the conductive layer 252, and the transistor 320 is provided over the insulating layer 332. An insulating layer 265 is provided so as to cover the transistor 320, and a capacitor 240 is provided over the insulating layer 265. The capacitor 240 and the transistor 320 are electrically connected to each other through a plug 274. For the plug 274, two or more conductive layers may be used.

The transistor 320 can be used as a transistor included in a pixel circuit or a transistor included in a memory cell. The transistor 310 can be used as a transistor included in a memory cell, a transistor included in a driver circuit for driving the pixel circuit, or a transistor included in an arithmetic circuit. The transistor 310 and the transistor 320 can also be used as transistors included in a variety of circuits such as an arithmetic circuit and a memory circuit.

The transistor 310 includes a channel formation region in the substrate 301. As the substrate 301, a semiconductor substrate such as a single crystal silicon substrate can be used, for example. The transistor 310 includes part of the substrate 301, a conductive layer 311, a low-resistance region 312, an insulating layer 313, and an insulating layer 314. The conductive layer 311 functions as a gate electrode. The insulating layer 313 is positioned between the substrate 301 and the conductive layer 311 and functions as a gate insulating layer. The low-resistance region 312 is a region where the substrate 301 is doped with an impurity, and functions as a source or a drain. The insulating layer 314 is provided so as to cover a side surface of the conductive layer 311 and functions as an insulating layer.

An element isolation layer 315 is provided between two adjacent transistors 310 so as to be embedded in the substrate 301.

Note that a Si transistor may be used as the transistor 310.

The transistor 320 is an OS transistor, which contains an oxide semiconductor in the semiconductor layer where the channel is formed.

The transistor 320 includes a semiconductor layer 321, an insulating layer 323, a conductive layer 324, a pair of conductive layers 325, an insulating layer 326, and a conductive layer 327.

The insulating layer 332 functions as a barrier layer that prevents diffusion of an impurity such as water or hydrogen from the substrate 301 side into the transistor 320 and release of oxygen from the semiconductor layer 321 to the insulating layer 332 side. As the insulating layer 332, for example, a film into which hydrogen or oxygen is less likely to diffuse than into a silicon oxide film can be used. Examples of such a film include an aluminum oxide film, a hafnium oxide film, and a silicon nitride film.

The conductive layer 327 is provided over the insulating layer 332, and the insulating layer 326 is provided so as to cover the conductive layer 327. The conductive layer 327 functions as a first gate electrode of the transistor 320, and part of the insulating layer 326 functions as a first gate insulating layer. An oxide insulating film such as a silicon oxide film is preferably used as at least part of the insulating layer 326 that is in contact with the semiconductor layer 321. The top surface of the insulating layer 326 is preferably planarized.

It is preferable that the conductive layer 327 be a single conductive layer or two or more conductive layers stacked. In the case where the conductive layer 327 is two or more conductive layers stacked, of the two conductive layers, the conductive layer in contact with the insulating layer 326 is preferably formed using a conductive material having a function of inhibiting diffusion of oxygen or an impurity such as water or hydrogen. Examples of such a conductive material include titanium, titanium nitride, tantalum, tantalum nitride, ruthenium, and ruthenium oxide. The above structure can inhibit diffusion of an impurity such as water or hydrogen into the semiconductor layer 321.

It is preferable that the insulating layer 326 be a single inorganic insulating film or two or more inorganic insulating films stacked. In the case where the insulating layer 326 is two or more inorganic insulating films stacked, one of the inorganic insulating films included in the insulating layer 326 preferably functions as a barrier layer preventing diffusion of an impurity such as water or hydrogen from the substrate 301 side into the transistor 320.

The semiconductor layer 321 is provided over the insulating layer 326. The semiconductor layer 321 preferably contains an oxide semiconductor. As the oxide semiconductor, a metal oxide containing at least one of indium, the element M, and zinc is preferably used. The element M can be, for example, one or more elements selected from aluminum, gallium, yttrium, copper, vanadium, beryllium, boron, titanium, iron, nickel, germanium, zirconium, molybdenum, lanthanum, cerium, neodymium, hafnium, tantalum, tungsten, magnesium, and the like. An OS transistor including such a metal oxide in a channel formation region has a characteristic of an extremely low off-state current. Thus, it is preferable that such an OS transistor be used as a transistor provided in a pixel circuit, in which case analog data written to the pixel circuit can be retained for a long time. Similarly, it is preferable that such an OS transistor be used as a transistor provided in a memory cell, in which case analog data written to the memory cell can be retained for a long time.

The pair of conductive layers 325 is provided over and in contact with the semiconductor layer 321, and functions as a source electrode and a drain electrode.

An insulating layer 328 is provided so as to cover the top and side surfaces of the pair of conductive layers 325, the side surface of the semiconductor layer 321, and the like, and an insulating layer 264 is provided over the insulating layer 328. The insulating layer 328 functions as a barrier layer that prevents diffusion of an impurity such as water or hydrogen from the insulating layer 264 and the like into the semiconductor layer 321 and release of oxygen from the semiconductor layer 321. For the insulating layer 328, an insulating film similar to that used for the insulating layer 332 can be used.

An opening reaching the semiconductor layer 321 is provided in the insulating layers 328 and 264. The insulating layer 323 that is in contact with the side surfaces of the insulating layers 264 and 328, the side surface of the conductive layer 325, and the top surface of the semiconductor layer 321 and the conductive layer 324 are embedded in the opening. The conductive layer 324 functions as a second gate electrode, and the insulating layer 323 functions as a second gate insulating layer.

As the insulating layer 323, for example, an inorganic insulating film such as a silicon oxide film or a silicon oxynitride film can be used. Note that the insulating layer 323 is not necessarily a single inorganic insulating film but may be two or more inorganic insulating films stacked. For example, an aluminum oxide film, a hafnium oxide film, a silicon nitride film, or the like may be provided in the form of a single layer or stacked layers on the side in contact with the conductive layer 324. In this case, oxidation of the conductive layer 324 can be inhibited. Furthermore, for example, an aluminum oxide film or a hafnium oxide film may be provided on the side in contact with the insulating layer 264, the insulating layer 328, and the conductive layer 325. In this case, it is possible to inhibit release of oxygen from the semiconductor layer 321, excessive supply of oxygen to the semiconductor layer 321, oxidation of the conductive layer 325, and the like.

The top surface of the conductive layer 324, the top surface of the insulating layer 323, and the top surface of the insulating layer 264 are planarized so that they are substantially level with each other, and an insulating layer 329 and the insulating layer 265 are provided so as to cover these layers.

Note that the conductive layer 327 and the conductive layer 324 preferably overlap with each other with an insulator positioned therebetween, in a region beyond the side surface of the semiconductor layer 321 in the channel width direction. With this structure, the channel formation region in the semiconductor layer 321 can be electrically surrounded by the electric fields of the conductive layer 327 functioning as the first gate electrode and the conductive layer 324 functioning as the second gate electrode. In this specification, a transistor structure in which the channel formation region is electrically surrounded by the electric fields of the first gate electrode and the second gate electrode is referred to as a surrounded channel (S-channel) structure.

In this specification and the like, the S-channel structure refers to a transistor structure in which a channel formation region is electrically surrounded by the electric fields of a pair of gate electrodes. The S-channel structure disclosed in this specification and the like is different from a fin-type structure and a planar structure. With the S-channel structure, resistance to a short-channel effect can be enhanced, that is, a transistor in which a short-channel effect is less likely to occur can be provided.

When the transistor 320 has normally-off characteristics and the above S-channel structure, the channel formation region can be electrically surrounded. Thus, the transistor 320 can be regarded as having a gate all around (GAA) structure or a lateral gate all around (LGAA) structure. In the transistor 320 having any of the S-channel structure, GAA structure, and LGAA structure, the channel formation region that is usually provided at the interface between the semiconductor layer 321 and the gate insulating film or in the vicinity of the interface spreads throughout the entire bulk of the semiconductor layer 321. Consequently, the density of current flowing in the transistor can be improved, so that the on-state current or the field-effect mobility of the transistor can be increased.

The insulating layers 264 and 265 each function as an interlayer insulating layer. The insulating layer 329 functions as a barrier layer that prevents diffusion of an impurity such as water or hydrogen from the insulating layer 265 and the like into the transistor 320. For the insulating layer 329, an insulating film similar to those used for the insulating layers 328 and 332 can be used.

The plug 274 electrically connected to one of the pair of conductive layers 325 is provided so as to be embedded in the insulating layers 265, 329, and 264. The plug 274 is formed using a single conductive layer or a stacked structure of two or more conductive layers. In the case where the plug 274 is two conductive layers stacked, of the two conductive layers, the conductive layer that covers the side surface of the opening in the insulating layer 265, the insulating layer 329, the insulating layer 264, and the insulating layer 328 and part of the top surface of the conductive layer 325 is preferably formed using a conductive material into which hydrogen and oxygen do not easily diffuse. This structure inhibits an impurity such as water or hydrogen from entering the semiconductor layer 321 from the insulating layer 264 and the like through the plug 274. Furthermore, the structure inhibits oxygen contained in the insulating layer 264 from being absorbed by the plug 274.

An insulating layer 275 is provided in contact with the side surface of the plug 274. That is, a structure may be employed in which the insulating layer 275 is provided in contact with the inner wall of the opening in the insulating layer 265, the insulating layer 329, and the insulating layer 264 and the plug 274 is provided in contact with the side surface of the insulating layer 275 and part of the top surface of the conductive layer 325. Note that the insulating layer 275 is not necessarily provided.

The capacitor 240 includes a conductive layer 241, a conductive layer 245, and an insulating layer 243 between the conductive layers 241 and 245. The conductive layer 241 functions as one electrode of the capacitor 240, the conductive layer 245 functions as the other electrode of the capacitor 240, and the insulating layer 243 functions as a dielectric of the capacitor 240.

The conductive layer 245 is provided over the insulating layer 265 and is embedded in the insulating layer 254. The conductive layer 245 is electrically connected to one of a source and a drain of the transistor 320 through the plug 274 embedded in the insulating layer 265. The insulating layer 243 is provided so as to cover the conductive layer 245. The conductive layer 245 is provided in a region overlapping with the conductive layer 241 with the insulating layer 243 therebetween.

An insulating layer 255 is provided so as to cover the capacitor 240, and the light-emitting element 61, the light-receiving element 62, and the like are provided over the insulating layer 255. The protective layer 91 is provided over the light-emitting element 61 and the light-receiving element 62, and a substrate 420 is bonded to the top surface of the protective layer 91 with a resin layer 419. The resin layer 419 and the substrate 420 can each be formed using a material having a light-transmitting property with respect to visible light, infrared light, and the like.

Each of the pixel electrode 84 of the light-emitting element 61 and the pixel electrode 84PD of the light-receiving element 62 is electrically connected to one of the source and the drain of the transistor 320 through a plug 256 and the plug 274. The transistor 320 can be electrically connected to the light-emitting element 61 through the plug 256.

With such a structure, OS transistors included in a pixel circuit and a memory cell as well as the driver circuit, an arithmetic circuit, and the like can be provided directly under the light-receiving element and the light-emitting element; thus, the size of a display device with higher performance can be reduced.

In the display device 100 with the structure shown in FIG. 26, the transistor 310 and the transistor 320 are stacked. The structure of the display device 100 is not limited to the above, and the display device 100 may have a structure including the transistor 310 but not including the transistor 320; a structure not including the transistor 310 but including the transistor 320; or a structure in which a plurality of transistors 320 are stacked.

In the case where a silicon substrate is used as the substrate 301, a photodiode with a photoelectric conversion layer that is formed on the silicon substrate may be provided, and the photodiode can be used as the light-receiving element 159 described in Embodiment 1. In other words, the light-receiving element 159 described in Embodiment 1 may be formed on a silicon substrate. In this case, the transistor 310 is not necessarily formed.

At least part of any of the structure examples, the drawings corresponding thereto, and the like described in this embodiment can be combined with any of the other structure examples, the other drawings corresponding thereto, and the like as appropriate.

At least part of this embodiment can be implemented in combination with any of the other embodiments described in this specification, as appropriate.

This application is based on Japanese Patent Application Serial No. 2021-077330 filed with Japan Patent Office on Apr. 30, 2021, the entire contents of which are hereby incorporated by reference.

What is claimed is:

1. An electronic device with an eye tracking function, comprising:
   a first display device;
   an infrared light source; and
   an optical system,
   wherein a pixel in the first display device comprises a display element and a light-receiving element,
   wherein the infrared light source is configured to emit infrared light,
   wherein the light-receiving element is configured to detect the infrared light reflected by an eyeball,
   wherein the optical system comprises:
      a first optical element and a second optical element positioned on an optical path through which visible light from the first display device is sequentially transmitted to reach the eyeball; and
      a third optical element and a fourth optical element which are positioned on an optical path through which the reflected infrared light enters the light-receiving element and not positioned on the optical path of the visible light from the first display device, and
   wherein each of the first to fourth optical elements is an IR cut filter.

2. An electronic device with an eye tracking function, comprising:
   a first display device;
   a second display device;
   an infrared light source; and
   an optical system,
   wherein a pixel in the first display device comprises a display element and a light-receiving element,
   wherein the infrared light source is configured to emit infrared light,
   wherein the light-receiving element is configured to detect the infrared light reflected by one of a right eyeball and a left eyeball,
   wherein the optical system comprises:
      a first optical element and a second optical element positioned on an optical path through which visible light from the first display device is sequentially transmitted to reach the one of the right eyeball and the left eyeball; and
      a third optical element and a fourth optical element which are positioned on an optical path through which the reflected infrared light enters the light-receiving element and not positioned on the optical path of the visible light from the first display device,
   wherein the third and fourth optical elements are positioned on an optical path through which another visible light from the second display device enters the other of the right eyeball and the left eyeball, and
   wherein each of the first to fourth optical elements is an IR cut filter.

3. An electronic device with an eye tracking function, comprising:
   a first display device;
   a second display device;
   an infrared light source;
   an optical system; and
   a driving mechanism,
   wherein a pixel in the first display device comprises a display element and a light-receiving element,
   wherein the infrared light source is configured to emit infrared light,
   wherein the light-receiving element is configured to detect the infrared light reflected by one of a right eyeball and a left eyeball,
   wherein the optical system comprises:
      a first optical element and a second optical element positioned on an optical path through which visible light from the first display device is sequentially transmitted to reach the one of the right eyeball and the left eyeball; and
      a third optical element and a fourth optical element which are positioned on an optical path through which the reflected infrared light enters the light-receiving element and not positioned on the optical path of the visible light from the first display device, wherein the driving mechanism is configured to move or rotate at least one of the first to fourth optical elements, and wherein each of the first to fourth optical elements is an IR cut filter.

4. The electronic device according to claim 1, wherein the first display device comprises an image processing portion, and wherein the image processing portion is configured to identify a position of gaze in accordance with data obtained by the light-receiving element.

5. The electronic device according to claim 1, further comprising a control portion, wherein the control portion is configured to perform image processing.

6. The electronic device according to claim 1, further comprising a control portion, wherein the control portion is configured to perform image processing, and wherein the image processing comprises processing for enhancing an image in a region comprising gaze.

7. The electronic device according to claim 1, wherein the infrared light source comprises a light-emitting element configured to emit the infrared light, and wherein the light-emitting element configured to emit the infrared light is in the first display device.

8. The electronic device according to claim 2, wherein the first display device comprises an image processing portion, and wherein the image processing portion is configured to identify a position of gaze in accordance with data obtained by the light-receiving element.

9. The electronic device according to claim 2, further comprising a control portion, wherein the control portion is configured to perform image processing.

10. The electronic device according to claim 2, further comprising a control portion, wherein the control portion is configured to perform image processing, and wherein the image processing comprises processing for enhancing an image in a region comprising gaze.

11. The electronic device according to claim 2, wherein the infrared light source comprises a light-emitting element configured to emit the infrared light, and wherein the light-emitting element configured to emit the infrared light is in the first display device.

12. The electronic device according to claim 3, wherein the first display device comprises an image processing portion, and wherein the image processing portion is configured to identify a position of gaze in accordance with data obtained by the light-receiving element.

13. The electronic device according to claim 3, further comprising a control portion, wherein the control portion is configured to perform image processing.

14. The electronic device according to claim 3, further comprising a control portion, wherein the control portion is configured to perform image processing, and wherein the image processing comprises processing for enhancing an image in a region comprising gaze.

15. The electronic device according to claim 3, wherein the infrared light source comprises a light-emitting element configured to emit the infrared light, and wherein the light-emitting element configured to emit the infrared light is in the first display device.

16. The electronic device according to claim 1, wherein the light-receiving element is an organic photodiode.

17. The electronic device according to claim 1, wherein the optical system further comprises a fifth optical element between the first optical element and the second optical element, and wherein the visible light from the first display device is sequentially transmitted through the first optical element, the fifth optical element, and the second optical element to reach the eyeball.

\* \* \* \* \*